(12) United States Patent
Klawuhn et al.

(10) Patent No.: US 12,203,805 B2
(45) Date of Patent: *Jan. 21, 2025

(54) COMBI-SENSOR SYSTEMS

(71) Applicant: View, Inc., Milpitas, CA (US)

(72) Inventors: Erich R. Klawuhn, Santa Barbara, CA (US); Douglas S. Silkwood, Santa Clara, CA (US); Jason Zedlitz, Rancho Cordova, CA (US); Stephen C. Brown, San Mateo, CA (US); Dhairya Shrivastava, Los Altos, CA (US)

(73) Assignee: View, Inc., San Jose, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 17/660,555

(22) Filed: Apr. 25, 2022

(65) Prior Publication Data

US 2022/0244098 A1 Aug. 4, 2022

Related U.S. Application Data

(63) Continuation of application No. 16/949,493, filed on Oct. 30, 2020, now Pat. No. 11,346,710, which is a (Continued)

(51) Int. Cl.
*G01J 1/02* (2006.01)
*E06B 9/24* (2006.01)
(Continued)

(52) U.S. Cl.
CPC .............. *G01J 1/0219* (2013.01); *E06B 9/24* (2013.01); *G01J 1/0242* (2013.01); (Continued)

(58) Field of Classification Search
CPC ...... G01J 1/0219; G01J 1/0242; G01J 1/4228; G01J 2001/426; E06B 9/24; (Continued)

(56) References Cited

U.S. PATENT DOCUMENTS 3,675,023 A 7/1972 Kunke et al.
3,963,347 A 6/1976 Segre et al.
(Continued)

FOREIGN PATENT DOCUMENTS

CH 707305 A1 6/2014
CN 200966026 Y 10/2007
(Continued)

OTHER PUBLICATIONS

AU Examination Report dated Jul. 9, 2021 in AU Application No. 2020250299.
(Continued)

*Primary Examiner* — Jamil Ahmed
(74) *Attorney, Agent, or Firm* — Weaver Austin Villeneuve & Sampson LLP; Brian D. Griedel

(57) ABSTRACT

Certain aspects pertain to a combination sensor comprising a set of physical sensors facing different directions proximate a structure, and configured to measure solar radiation in different directions. The combination sensor also comprises a virtual facade-aligned sensor configured to determine a combi-sensor value at a facade of the structure based on solar radiation readings from the set of physical sensors.

21 Claims, 47 Drawing Sheets

Related U.S. Application Data continuation of application No. 16/946,168, filed on Jun. 8, 2020, now Pat. No. 10,895,498, which is a continuation of application No. 16/695,057, filed on Nov. 25, 2019, now Pat. No. 10,732,028, which is a continuation of application No. 15/514,480, filed as application No. PCT/US2015/052822 on Sep. 29, 2015, now Pat. No. 10,539,456.

(60) Provisional application No. 62/057,104, filed on Sep. 29, 2014.

(51) Int. Cl.
  *G01J 1/42* (2006.01)
  *G01W 1/12* (2006.01)
  *E06B 9/68* (2006.01)

(52) U.S. Cl.
  CPC .............. *G01J 1/4228* (2013.01); *G01W 1/12* (2013.01); *E06B 2009/2464* (2013.01); *E06B 2009/6818* (2013.01); *E06B 2009/6827* (2013.01); *G01J 2001/4266* (2013.01)

(58) Field of Classification Search
  CPC ..... E06B 2009/2464; E06B 2009/6818; E06B 2009/6827; G01W 1/12
  See application file for complete search history.

(56) References Cited

U.S. PATENT DOCUMENTS

| | | | |
|---|---|---|---|
| 4,171,911 A | 10/1979 | Aberle et al. | |
| 4,217,629 A | 8/1980 | Russell | |
| D256,787 S | 9/1980 | Petersen | |
| D258,871 S | 4/1981 | Rajotte, Jr. et al. | |
| 4,355,896 A | 10/1982 | Frosch et al. | |
| 4,491,727 A | 1/1985 | Appelbaum et al. | |
| D278,132 S | 3/1985 | Powell | |
| 4,628,206 A | 12/1986 | Astheimer | |
| 4,690,553 A | 9/1987 | Fukamizu et al. | |
| 4,742,236 A | 5/1988 | Kawakami et al. | |
| 5,217,296 A | 6/1993 | Tanner et al. | |
| 5,379,215 A | 1/1995 | Kruhoeffer et al. | |
| 5,489,777 A | 2/1996 | Stedman et al. | |
| 5,583,972 A | 12/1996 | Miller | |
| 5,606,393 A | 2/1997 | Schoenherr et al. | |
| 5,621,526 A | 4/1997 | Kuze | |
| 5,656,807 A | 8/1997 | Packard | |
| 5,670,774 A | 9/1997 | Hill | |
| 5,838,432 A | 11/1998 | Tokuhashi et al. | |
| 6,104,513 A | 8/2000 | Bloom | |
| 6,125,327 A | 9/2000 | Kalenian | |
| 6,163,756 A | 12/2000 | Baron et al. | |
| D439,532 S | 3/2001 | Off et al. | |
| 6,266,063 B1 | 7/2001 | Baron et al. | |
| 6,269,763 B1 | 8/2001 | Woodland | |
| 6,409,198 B1 | 6/2002 | Weimer et al. | |
| 6,417,500 B1 | 7/2002 | Wood | |
| 6,466,312 B1 | 10/2002 | Li | |
| 7,049,602 B2 | 5/2006 | Tokhtuev et al. | |
| 7,079,944 B2 | 7/2006 | Litchfield et al. | |
| 7,105,800 B1 | 9/2006 | Staerzl | |
| 7,472,590 B2 | 1/2009 | Solheim et al. | |
| 7,562,928 B1 | 7/2009 | Morazan | |
| 7,587,289 B1 | 9/2009 | Sivertsen | |
| 7,714,290 B2 | 5/2010 | Kudoh | |
| 7,873,490 B2 | 1/2011 | MacDonald | |
| 8,102,586 B2 | 1/2012 | Albahri | |
| 8,254,013 B2 | 8/2012 | Mehtani et al. | |
| 8,270,059 B2 | 9/2012 | Friedman et al. | |
| 8,300,298 B2 | 10/2012 | Wang et al. | |
| 8,432,603 B2 | 4/2013 | Wang et al. | |
| 8,456,729 B2 | 6/2013 | Brown et al. | |
| 8,582,193 B2 | 11/2013 | Wang et al. | |
| 8,681,073 B1 | 3/2014 | Robbins et al. | |
| 8,705,162 B2 | 4/2014 | Brown et al. | |
| 8,754,983 B2 | 6/2014 | Sutton | |
| 8,764,950 B2 | 7/2014 | Wang et al. | |
| 8,764,951 B2 | 7/2014 | Wang et al. | |
| D712,759 S | 9/2014 | Forsberg et al. | |
| 8,836,263 B2 | 9/2014 | Berman et al. | |
| D723,600 S | 3/2015 | Nauli et al. | |
| D725,284 S | 3/2015 | Karlsson et al. | |
| D727,467 S | 4/2015 | Batiste | |
| 9,164,002 B2 | 10/2015 | Anderson | |
| D747,988 S | 1/2016 | Matsumiya et al. | |
| D748,508 S | 2/2016 | Park et al. | |
| 9,261,751 B2 | 2/2016 | Pradhan et al. | |
| D761,135 S | 7/2016 | Allen, Sr. et al. | |
| 9,406,028 B2 | 8/2016 | Humann | |
| 9,506,802 B2 | 11/2016 | Chu et al. | |
| D780,612 S | 3/2017 | Alexander et al. | |
| 9,638,978 B2 | 5/2017 | Brown et al. | |
| 9,664,974 B2 | 5/2017 | Kozlowski et al. | |
| 9,746,181 B2 | 8/2017 | Mori | |
| D816,518 S | 5/2018 | Brown et al. | |
| 10,063,815 B1 | 8/2018 | Spivey et al. | |
| 10,234,596 B2 | 3/2019 | Frank et al. | |
| 10,241,095 B2 | 3/2019 | Coates | |
| 10,533,892 B2 | 1/2020 | Brown et al. | |
| 10,539,456 B2 | 1/2020 | Klawuhn et al. | |
| 10,690,540 B2 | 6/2020 | Brown et al. | |
| 10,732,028 B2 | 8/2020 | Klawuhn et al. | |
| 10,802,372 B2 | 10/2020 | Brown | |
| 10,895,498 B2 | 1/2021 | Klawuhn et al. | |
| 11,221,434 B2 | 1/2022 | Frank et al. | |
| 11,255,722 B2 | 2/2022 | Zedlitz et al. | |
| 11,280,671 B2 | 3/2022 | Brown et al. | |
| 11,346,710 B2 | 5/2022 | Klawuhn et al. | |
| 11,566,938 B2 | 1/2023 | Brown et al. | |
| 11,674,843 B2 | 6/2023 | Zedlitz et al. | |
| 11,781,903 B2 | 10/2023 | Brown et al. | |
| 2002/0075472 A1 | 6/2002 | Holton | |
| 2003/0076480 A1 | 4/2003 | Burbulla | |
| 2004/0043760 A1 | 3/2004 | Rosenfeld et al. | |
| 2004/0047518 A1 | 3/2004 | Tiana | |
| 2004/0108191 A1 | 6/2004 | Su et al. | |
| 2004/0135989 A1 | 7/2004 | Klebe | |
| 2006/0038983 A1 | 2/2006 | Bickel et al. | |
| 2006/0207730 A1 | 9/2006 | Berman et al. | |
| 2006/0238860 A1 | 10/2006 | Baun et al. | |
| 2007/0012349 A1 | 1/2007 | Gaudiana et al. | |
| 2007/0145252 A1 | 6/2007 | Litchfield et al. | |
| 2007/0177384 A1 | 8/2007 | Sibalich et al. | |
| 2007/0221338 A1 | 9/2007 | Meewis et al. | |
| 2008/0012755 A1 | 1/2008 | Venkatachalam et al. | |
| 2008/0128586 A1 | 6/2008 | Johnson et al. | |
| 2008/0173818 A1 | 7/2008 | Staerzl | |
| 2008/0174455 A1 | 7/2008 | Staerzl | |
| 2009/0027759 A1 | 1/2009 | Albahri | |
| 2009/0079349 A1 | 3/2009 | Sibalich et al. | |
| 2009/0254222 A1* | 10/2009 | Berman | E06B 9/322 160/1 |
| 2009/0281820 A1 | 11/2009 | Sarkar et al. | |
| 2009/0316671 A1 | 12/2009 | Rolf et al. | |
| 2009/0326709 A1 | 12/2009 | Hooper et al. | |
| 2010/0100324 A1 | 4/2010 | Caminiti et al. | |
| 2010/0235206 A1 | 9/2010 | Miller et al. | |
| 2011/0295575 A1 | 12/2011 | Levine et al. | |
| 2011/0308318 A1 | 12/2011 | Magnussen | |
| 2012/0006110 A1 | 1/2012 | Niemann et al. | |
| 2012/0007507 A1 | 1/2012 | Niemann et al. | |
| 2012/0042868 A1 | 2/2012 | Huang | |
| 2012/0070071 A1 | 3/2012 | Rankin et al. | |
| 2012/0089257 A1 | 4/2012 | Holger | |
| 2012/0133315 A1 | 5/2012 | Berman et al. | |
| 2012/0239209 A1* | 9/2012 | Brown | G02F 1/13318 359/275 |
| 2012/0323382 A1 | 12/2012 | Kamel et al. | |
| 2013/0021659 A1 | 1/2013 | Friedman et al. | |
| 2013/0057937 A1 | 3/2013 | Berman et al. | |
| 2013/0063065 A1 | 3/2013 | Berman et al. | |
| 2013/0139804 A1 | 6/2013 | Goldberg | |

(56) References Cited

U.S. PATENT DOCUMENTS

| | | |
|---|---|---|
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2014/0055014 A1 | 2/2014 | Pan |
| 2014/0067733 A1 | 3/2014 | Humann |
| 2014/0083413 A1 | 3/2014 | Bibi et al. |
| 2014/0117852 A1 | 5/2014 | Zhai et al. |
| 2014/0145002 A1 | 5/2014 | Caldeira et al. |
| 2014/0156079 A1 | 6/2014 | Courtney et al. |
| 2014/0236323 A1 | 8/2014 | Brown et al. |
| 2014/0262057 A1 | 9/2014 | Chambers et al. |
| 2014/0268287 A1 | 9/2014 | Brown et al. |
| 2014/0300945 A1 | 10/2014 | Parker |
| 2015/0070190 A1 | 3/2015 | Wai Fong et al. |
| 2015/0161515 A1 | 6/2015 | Matsuoka |
| 2015/0177415 A1 | 6/2015 | Bing |
| 2015/0316473 A1 | 11/2015 | Kester et al. |
| 2016/0040478 A1 | 2/2016 | Lundy et al. |
| 2016/0054633 A1 | 2/2016 | Brown et al. |
| 2016/0090098 A1 | 3/2016 | Kim et al. |
| 2016/0127642 A1 | 5/2016 | Schechner et al. |
| 2016/0203403 A1 | 7/2016 | Nagel et al. |
| 2016/0277688 A1 | 9/2016 | Gaskamp et al. |
| 2016/0283774 A1 | 9/2016 | Buchanan et al. |
| 2017/0031056 A1 | 2/2017 | Vega-Avila et al. |
| 2017/0097259 A1 | 4/2017 | Brown et al. |
| 2017/0122802 A1 | 5/2017 | Brown et al. |
| 2017/0125875 A1 | 5/2017 | Courtney et al. |
| 2017/0276542 A1 | 9/2017 | Klawuhn et al. |
| 2017/0293049 A1 | 10/2017 | Frank et al. |
| 2019/0171081 A1 | 6/2019 | Zedlitz et al. |
| 2019/0235129 A1 | 8/2019 | Frank et al. |
| 2019/0250029 A1 | 8/2019 | Zedlitz et al. |
| 2020/0063490 A1 | 2/2020 | Hebeisen et al. |
| 2020/0200595 A1 | 6/2020 | Klawuhn et al. |
| 2020/0209057 A1 | 7/2020 | Brown et al. |
| 2020/0278245 A1 | 9/2020 | Brown et al. |
| 2020/0363261 A1 | 11/2020 | Klawuhn et al. |
| 2021/0080319 A1 | 3/2021 | Brown et al. |
| 2021/0108960 A1 | 4/2021 | Klawuhn et al. |
| 2021/0190991 A1 | 6/2021 | Frank et al. |
| 2022/0026267 A1 | 1/2022 | Brown et al. |
| 2022/0113184 A1 | 4/2022 | Zedlitz et al. |
| 2022/0163385 A1 | 5/2022 | Brown et al. |
| 2023/0127664 A1 | 4/2023 | Brown et al. |
| 2023/0341259 A1 | 10/2023 | Zedlitz et al. |

FOREIGN PATENT DOCUMENTS

| | | |
|---|---|---|
| CN | 201104273 Y | 8/2008 |
| CN | 101702036 A | 5/2010 |
| CN | 101969207 A | 2/2011 |
| CN | 102183237 A | 9/2011 |
| CN | 102183237 B | 8/2012 |
| CN | 104181612 A | 12/2014 |
| CN | 104321497 A | 1/2015 |
| CN | 204155059 U | 2/2015 |
| CN | 204422071 U | 6/2015 |
| CN | 106575064 A | 4/2017 |
| CN | 106796305 A | 5/2017 |
| CN | 110214293 A | 9/2019 |
| EP | 0067706 B1 | 2/1991 |
| EP | 1012633 B1 | 3/2002 |
| EP | 2357544 A2 | 8/2011 |
| EP | 2518254 A1 | 10/2012 |
| EP | 2787162 A1 | 10/2014 |
| ES | 2308936 A1 | 12/2008 |
| FR | 3026496 A1 | 4/2016 |
| JP | 2004170350 A | 6/2004 |
| JP | 2014062801 A | 4/2014 |
| JP | 2015045129 A | 3/2015 |
| TW | 201117405 A | 5/2011 |
| TW | 201217999 A | 5/2012 |
| TW | 201220111 A | 5/2012 |
| TW | 201403034 A | 1/2014 |
| TW | 201435314 A | 9/2014 |
| TW | 201511240 A | 3/2015 |
| TW | 201723441 A | 7/2017 |
| WO | WO-9913359 A1 | 3/1999 |
| WO | WO-2005052524 A1 | 6/2005 |
| WO | WO-2011124720 A2 | 10/2011 |
| WO | WO-2013105244 A1 | 7/2013 |
| WO | WO-2013181408 A2 | 12/2013 |
| WO | WO-2014121863 A1 | 8/2014 |
| WO | WO-2015095615 A1 | 6/2015 |
| WO | WO-2015171886 A1 | 11/2015 |
| WO | WO-2016004109 A1 | 1/2016 |
| WO | WO-2017007942 A1 | 1/2017 |
| WO | WO-2017062592 A1 | 4/2017 |
| WO | WO-2017189437 A1 | 11/2017 |
| WO | WO-2017210346 A1 | 12/2017 |
| WO | WO-2018067996 A1 | 4/2018 |
| WO | WO-2019183232 A1 | 9/2019 |
| WO | WO-2021080879 A1 | 4/2021 |

OTHER PUBLICATIONS

AU Office Action dated Nov. 19, 2021, in Application No. AU2020250299.
Australian Examination Report dated Aug. 20, 2020 in AU Application No. 2016334038.
Australian Examination Report dated May 31, 2019 in AU Application No. 2016334038.
Boltwood Cloud Sensor II by Diffraction Limited, 2016, [online], [retrieved Dec. 15, 2016]. Retrieved from the internet URL http://diffractionlimited.com/product/boltwood-cloud-sensor-ii/.
CA Office Action dated Dec. 7, 2021, in Application No. CA2963096.
Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].
Canadian Office Action dated Apr. 11, 2017 in CA Design Application No. 170770
Canadian Office Action dated Nov. 15, 2017 in CA Design Application No. 170770.
C-Bus Multi-Sensors, posted on clipsal.com. [online] <url: https:= ""<a="" href="http://www.clipsal.com/Trade/Products/Integrated-Systems/C-Bus-Control-and-Management-System/C-Bus-1">www.clipsal.com/Trade/Products/Integrated-Systems/C-Bus-Control-and-Management-System/C-Bus-1 nput -Units/Sensors-and- Detectors#. WOfl Lvkrlm E.</url:>.
Chinese Office Action dated Apr. 27, 2017 in CN Design Application No. 201630492174.4.
Chinese Office Action dated Apr. 3, 2018 in CN Application No. 201580059148.5.
Chinese Office Action dated Aug. 1, 2019 in CN Application No. 201580059148.5.
Chinese Office Action dated Aug. 17, 2020 in CN Application No. 201680062708.7 with Translation.
Chinese Office Action dated Dec. 1, 2020 in CN Application No. 201580059148.5, with English Translation.
Chinese Office Action dated Dec. 10, 2020 in CN Application No. 201580052861.7 with Translation.
Chinese Office Action dated Feb. 2, 2019 in CN Application No. 201580059148.5.
Chinese Office Action dated Jan. 12, 2021 in CN Application No. 201780065447.9 with Translation.
Chinese Office Action dated Mar. 25, 2019 in CN Application No. 201580052861.7.
Chinese Office Action dated May 6, 2020 in CN Application No. 201580059148.5.
Chinese Office Action dated Nov. 20, 2019 in CN Application No. 201680062708.7 with Translation.
Clay, R.W., et al., "A cloud monitoring system for remote sites," Publications of the Astronomical Society of Australia, vol. 15, No. 3, Jan. 1998, pp. 332-335.
CN Notice of allowance dated Oct. 11, 2021, in application No. CN20158059148.5.

(56) References Cited

OTHER PUBLICATIONS

CN Office Action dated Feb. 25, 2022 in Application No. CN201980029927.9 with English translation.
CN Office Action dated Apr. 13, 2020 in Chinese Application No. 201580052861.7, with Translation.
CN Office Action dated Aug. 4, 2021, in CN Application No. 201780039437.8 with English translation.
CN Office Action dated Feb. 23, 2021 in Chinese Application No. 201680062708.7,with Translation.
CN Office Action dated Nov. 3, 2021, in Application No. 201780065447.9 with English translation.
CN Rejection Decision dated Mar. 19, 2021 in Chinese Application No. 201580059148.5, without English Translation.
Duchon, Claude E et al., "Estimating Cloud Type from Pyranometer Observations," Journal of Applied Meteorology, vol. 38, Jan. 1999, pp. 132-141.
English translation of CN201104273 description form worldwide. espacenet.com.
English translation of JP2004170350 description form worldwide. espacenet.com.
EP Office Action dated Mar. 4, 2022, in Application No. EP17859286.1.
EP Office Action dated Feb. 3, 2021 in European Application No. 15848030.1.
EP Office Action dated Oct. 1, 2021, in application No. EP17807428.2.
European Examination Report dated Jul. 11, 2019 in EP Application No. 16854302.3.
European Office Action dated Aug. 27, 2019 in EP Application No. 15848030.1.
European Office Action dated Feb. 21, 2019 in EP Application No. 15845648.3.
European (Partial) Search Report dated Dec. 17, 2019 in EP Application No. 17807428.2.
Ex Parte Quayle Action, dated Feb. 2, 2021, in U.S. Appl. No. 16/335,222.
Examination Report No. 1, dated May 7, 2020, for Australian Patent Application No. 2015324000 3 pages.
Extended European Search Report dated Apr. 26, 2018 in EP Application No. 15845648.3.
Extended European Search Report dated Jul. 16, 2021 in EP Application No. 21150305.7.
Extended European Search Report dated May 3, 2018 in EP Application No. 15848030.1.
Gen5 Z-Wave Plus 6-in-1 Multisensor, posted on thesmartesthouse.com, Earliest review on Aug. 27, 2015. [online] <url:<a href="https://www.thesmartesthouse.com/products/aeotec-by-aeon-labs-z-wave-5-in-1-multisensor#shopify-product-reviews">https://www.thesmartesthouse.com/products/aeotec-by-aeon-labs-z-wave-5-in-1-multisensor#shopify-product-reviews</url:.<a>.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
"Halio Rooftop Sensor Kit (Model SR500)," Product Data Sheet, Kinestral Technologies, 2020, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
Humann, C., "Glare Control", VELUX Build for Life Conference, presented Nov. 18, 2021. Retrieved from the internet from https://vimeo.com/647274396.
Idso, Sherwood B., "Humidity measurement by infrared thermometry," Remote Sensing of Environment, vol. 12, 1982, pp. 87-91.
IN First Examination Report dated Jul. 7, 2021 in Indian Patent Application No. 201917013204.
IN First Examination Report dated Mar. 15, 2021 in Indian Patent Application No. 201837010260.
IN office action dated Dec. 23, 2021, in application No. 202138004652.
IN Office Action dated Mar. 30, 2022 in Application No. IN202138040983.
Indian First Examination Report dated Sep. 17, 2020 in Indian Patent Application No. 201737011527.
International Preliminary Report on Patentability dated Apr. 13, 2017 in PCT/US2015/052822.
International Preliminary Report on Patentability dated Apr. 13, 2017 in PCT/US2015/053041.
International Preliminary Report on Patentability dated Apr. 18, 2019 in PCT/US17/55631.
International Preliminary Report on Patentability dated Apr. 19, 2018 in PCT/US2016/055709 International Preliminary Report on Patentability dated Apr. 19, 2018 in PCT/US2016/055709.
International Preliminary Report on Patentability dated Dec. 13, 2018 in PCT/US17/35290.
International Preliminary Report on Patentability dated Sep. 22, 2020 in PCT/US19/23186.
International Search Report and Written Opinion dated Dec. 15, 2016 in PCT/US2016/055709.
International Search Report and Written Opinion dated Dec. 18, 2015 in PCT/US2015/053041.
International Search Report and Written Opinion dated Jan. 14, 2016 in PCT/US2015/052822.
International Search Report and Written Opinion dated Jan. 25, 2018 in PCT/US17/55631.
International Search Report and Written Opinion dated Sep. 8, 2017, issued in PCT/US17/35290.
International Search Report and Written Opinion (ISA:EPO) dated Feb. 22, 2021 in PCT/US2020/056164.
International Search Report and Written Opinion (ISA:EPO) dated Jul. 5, 2019 in PCT/US19/23186.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
KR Office Action dated Dec. 23, 2021, in application No. 1020197011968 with English Translation.
KR Office Action dated Feb. 18, 2022, in Application No. KR1020177011520 with English Translation.
"Sky temperature" in Designing Buildings Wiki, Apr. 26, 2015, https://www.designingbuildings.co.uk/wiki/Sky_temperature [retrieved Jul. 19, 2019].
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Melexis "MLX90614 family Datasheet" (3901090614, Rev. 004), Jul. 30, 2008, 42 pp.
Merriam-Webster, Inc., "Pyrometer," Merriam-Webster's Collegiate Dictionary 10th Edition, Springfield, MA, 2001, p. 950 (4 pp.).
Mims III, Forrest M., et al., "Measuring total column water vapor by pointing an infrared thermometer at the sky," Bulletin of the American Meteorological Society, Oct. 2011, pp. 1311-1320.
Morris, V.R et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
National Aeronautics & Space Administration, "Cloud Radar System (CRS)," (known as of Sep. 3, 2014), published date of Jun. 16, 2014, [http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
Notice of Allowance dated Nov. 29, 2021 in U.S. Appl. No. 16/696,887.

(56) References Cited

OTHER PUBLICATIONS

Notice of Allowance dated Oct. 14, 2021 in U.S. Appl. No. 16/871,976.
Notice of Allowance dated Oct. 27, 2021 in U.S. Appl. No. 16/335,222.
Notice of Allowance dated Sep. 17, 2021 in U.S. Appl. No. 16/262,775.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment dated Feb. 20, 2018 in U.S. Appl. No. 15/287,646.
Preliminary Amendment dated Mar. 12, 2020, in U.S. Appl. No. 16/695,057.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Office Action & Search Report dated Apr. 1, 2019 in RU Application No. 2017114996.
Science and Technology Facilities Council. "Cloud Radar: Predicting The Weather More Accurately." ScienceDaily, Oct. 1, 2008. [www.sciencedaily.com/releases/2008/09/080924085200.htm].
Sloan, Raymond, et al., "Infrared Emission Spectrum of the Atmosphere," Journal of the Optical Society of America, vol. 45, No. 6, Jun. 1955, pp. 455-460.
Smith, et al. "Measuring Cloud Cover and Brightness Temperature with a Ground Based Thermal Infrared Camera", (Feb. 2008), American Meteorological Society, vol. 47, pp. 683-693.
Subramaniam, S., "Daylighting Simulations with Radiance using Matrix-based Methods", Lawrence Berkeley National Laboratory, Oct. 3, 2017, 145 pages.
SurroundVideo Series, "Pioneering Multi-Sensor IP Megapixel Cameras," [webpage] 10 pp. [retrieved Jul. 24, 2015] <url:<a href="http://web.archive.org/web/20150724235343/http://www.arecontvision.com/landing-pages/surround-video/overview.php">http://web.archive.org/web/20150724235343/http://www.arecontvision.com/landing-pages/surround-video/overview.php</url:.<a>.
Taiwan Office Action dated Jul. 2, 2020 in Taiwan Patent Application No. 105132457 with Translation.
Taiwan Office Action dated May 13, 2021 in Taiwan Patent Application No. 106134521 with English Translation.
Taiwanese Decision of Rejection dated Nov. 1, 2019 in TW Application No. 104131932.
Taiwanese Office Action dated Jun. 28, 2019 in TW Application No. 104131932.
Thompson, Marcus, "Boltwood cloud sensor," Cloudynights.com, Nov. 25, 2005, 6 pp. [online], [retrieved Dec. 15, 2016]. Retrieved from the internet URL http://www.cloudynights.com/page/articles/cat/user-reviews/photography/photography-accessories/boltwood-cloud-sensor-r1222.
TW Notice of Allowance, dated Jan. 25, 2021 in Taiwanese Application No. 104131932 No translation.
TW Notice of Allowance dated Jun. 29, 2021 in Taiwan Patent Application No. 110115755, with English translation.
TW Notice of Allowance dated Mar. 4, 2021 in Taiwan Patent Application No. 105132457, No translation.
US Corrected Notice of Allowability dated Dec. 9, 2021 in U.S. Appl. No. 16/262,775.
U.S. Corrected Notice of Allowability dated Jan. 12, 2022, in U.S. Appl. No. 16/335,222.
US Corrected Notice of Allowability dated Nov. 24, 2021, in U.S. Appl. No. 16/335,222.
US Corrected Notice of Allowance dated Aug. 19, 2021 in U.S. Appl. No. 16/871,976.
U.S. Corrected Notice of Allowance dated Feb. 10, 2022 in U.S. Appl. No. 16/949,493.
U.S. Corrected Notice of Allowance dated Feb. 22, 2022 in U.S. Appl. No. 16/696,887.
US Final Office Action dated Apr. 8, 2022, in U.S. Appl. No. 17/027,601.
US Final Office Action dated Feb. 21, 2019 in U.S. Appl. No. 15/287,646.
US Final Office Action dated Jan. 17, 2019 in U.S. Appl. No. 14/998,019.
US Final Office Action dated Sep. 26, 2018 in U.S. Appl. No. 15/514,480.
U.S. Non Final Office Action dated Jan. 21, 2022, in U.S. Appl. No. 16/303,384.
U.S. Non-Final Office Action dated Oct. 18, 2021 in U.S. Appl. No. 16/949,493.
US Non-Final Office Action dated Sep. 13, 2021, in U.S. Appl. No. 17/027,601.
US Notice of Allowance dated Apr. 14, 2021 in U.S. Appl. No. 16/335,222.
US Notice of Allowance dated Apr. 29, 2020 in U.S. Appl. No. 14/998,019.
US Notice of Allowance dated Aug. 3, 2021 in U.S. Appl. No. 16/335,222.
US Notice of Allowance dated Aug. 12, 2021 in U.S. Appl. No. 16/335,222.
US Notice of Allowance dated Dec. 12, 2017 in Design U.S. Appl. No. 29/560,076.
US Notice of Allowance dated Jan. 23, 2020 in U.S. Appl. No. 14/998,019.
US Notice of Allowance dated Jan. 24, 2019 in U.S. Appl. No. 15/514,480.
U.S. Notice of Allowance dated Jan. 28, 2022 in U.S. Appl. No. 16/949,493.
US Notice of Allowance dated Jul. 15, 2021 in U.S. Appl. No. 16/871,976.
US Notice of Allowance dated Jun. 1, 2020 in U.S. Appl. No. 16/695,057.
US Notice of Allowance dated May 23, 2019 in U.S. Appl. No. 15/514,480.
US Notice of Allowance dated Nov. 1, 2018 in U.S. Appl. No. 15/513,535.
US Notice of Allowance dated Oct. 15, 2020 in U.S. Appl. No. 16/946,168.
US Notice of Allowance dated Sep. 27, 2021 in U.S. Appl. No. 16/262,775.
US Notice of Allowance dated Sep. 6, 2019 in U.S. Appl. No. 15/514,480.
US Notice of Allowance dated Sep. 9, 2019 in U.S. Appl. No. 15/287,646.
US Office Action dated Apr. 14, 2021 in U.S. Appl. No. 16/262,775.
US Office Action dated Aug. 2, 2017 in U.S. Appl. No. 14/998,019.
US Office Action dated Aug. 9, 2018 in U.S. Appl. No. 15/287,646.
US Office Action dated Dec. 10, 2020 in U.S. Appl. No. 16/871,976.
US Office Action dated Dec. 9, 2020 in U.S. Appl. No. 16/696,887.
US Office Action dated Feb. 20, 2020 in U.S. Appl. No. 16/262,775.
US Office Action dated Jan. 22, 2018 in U.S. Appl. No. 15/514,480.
US Office Action dated Jul. 13, 2021 in U.S. Appl. No. 16/696,887.
US Office Action dated Jun. 11, 2020 in U.S. Appl. No. 16/303,384.
US Office Action dated Jun. 14, 2019 in U.S. Appl. No. 14/998,019.
US Office Action dated Jun. 29, 2018 in U.S. Appl. No. 15/513,535.
US Office Action dated Jun. 8, 2018 in U.S. Appl. No. 14/998,019.
US Office Action dated Mar. 3, 2021 in U.S. Appl. No. 16/303,384.
US Office Action dated May 5, 2017 in Design U.S. Appl. No. 29/560,076.
US Office Action dated Sep. 29, 2020 in U.S. Appl. No. 16/262,775.
U.S. Appl. No. 17/651,013, inventors Brown et al., filed Feb. 14, 2022.
Werner, Christian, "Automatic cloud cover indicator system," Journal of Applied Meteorology, vol. 12, Dec. 1973, pp. 1394-1400.
AU Office action dated Sep. 29, 2022, in AU Application No. AU2021205049.
CA Office Action dated Aug. 14, 2024 in CA Application No. 3000852.
CA Office Action dated Dec. 5, 2022 in Application No. CA3000852.
CA Office Action dated Feb. 7, 2024 in CA Application No. 3039606.

(56) References Cited

OTHER PUBLICATIONS

CA Office Action dated Feb. 23, 2024 in CA Application No. 3155214.
CA Office Action dated Jun. 22, 2023, in Application No. CA2963096.
CA Office Action dated Jun. 23, 2023, in Application No. CA3025827.
CA Office Action dated Oct. 16, 2023 in CA Application No. CA3000852.
CA Office Action dated Sep. 29, 2022, in Application No. CA2963096.
CN Office Action dated Sep. 28, 2022 in Application No. CN201980029927.9 with English translation.
CN Office Action dated Apr. 27, 2022, in Application No. CN201780039437.8 with English translation.
CN Office Action dated Aug. 8, 2024 in CN Application No. 202080075246.9, with English Translation.
CN Office Action dated Jan. 15, 2024 in CN Application No. 202080075246.9 withEnglish Translation.
CN Office Action dated Sep. 5, 2022, in Application No. CN201780039437.8 with English translation.
CN Office Action dated Sep. 26, 2023, in Application No. CN202210751723.X withEnglish Translation.
EP office action dated Apr. 14, 2023, in application No. EP17859286.1.
EP Office Action dated Jun. 7, 2024 in EP Application No. 16854302.3.
European Office Action dated Feb. 23, 2023 in Application No.EP17807428.2.
European Office Action dated Oct. 16, 2023 in Application No. EP21150305.7.
European Office Action dated Sep. 29, 2022 in Application No. EP16854302.3.
IN Office Action dated Aug. 5, 2022 In Application No. 202037045202.
IN Office Action dated Sep. 23, 2022, in Application No. IN202235032356.
KR Office Action dated Dec. 31, 2023 in KR Application No. 10-2018-7011531, withEnglish Translation.
PCT International Preliminary Report on Patentability dated May 5, 2022 issued in PCT/US2020/056164.
TW Office Action dated Apr. 11, 2022, in Application No. TW106134521 with English Translation.
TW Office Action dated Aug. 30, 2022, in Application No. TW108109593 with English translation.
TW Office Action dated Aug. 30, 2022 In Application No. TW110115143 with English translation.
TW Office Action dated Jun. 29, 2023 in Application No. TW112115942 with EnglishTranslation.
TW Office Action dated Mar. 18, 2022, in Application No. TW111101273 with English translation.
TW Office Action dated Oct. 19, 2023, in application No. TW111133111 with English translation.
TW Office Action dated Sep. 5, 2023 In Application No. TW110115143 with English translation
TW Office Action dated Sep. 13, 2022, in Application No. TW106134521 with English Translation.
U.S. Corrected Notice of Allowance dated Feb. 16, 2023 in U.S. Appl. No. 17/304,832.
U.S. Corrected Notice of Allowance dated Jan. 5, 2023 in U.S. Appl. No. 17/027,601.
U.S. Corrected Notice of Allowance dated May 4, 2022, in U.S. Appl. No. 16/949,493.
U.S. Corrected Notice of Allowance dated May 18, 2022, in U.S. Appl. No. 16/303,384.
U.S. Corrected Notice of Allowance dated Sep. 26, 2022 in U.S. Appl. No. 17/027,601.
U.S. Final Office Action dated Feb. 14, 2024 in U.S. Appl. No. 17/651,013.
U.S. Final office Action dated Jan. 4, 2023 in U.S. Appl. No. 17/249,595.
U.S. Final office Action dated Jul. 27, 2023 in U.S. Appl. No. 16/303,384.
U.S. Non-Final office Action dated Jul. 21, 2022 in U.S. Appl. No. 17/249,595.
U.S. Non-Final Office Action dated Apr. 10, 2024 in U.S. Appl. No. 17/651,013.
U.S. Non-Final Office Action dated Apr. 12, 2023 in U.S. Appl. No. 17/450,091.
U.S. Non-Final Office Action dated Apr. 13, 2023 in U.S. Appl. No. 18/066,799.
U.S. Non-Final Office Action dated Dec. 6, 2022 in U.S. Appl. No. 16/303,384.
U.S. Non-Final Office Action dated Dec. 22, 2023 in U.S. Appl. No. 18/308,658.
U.S. Non-Final Office Action dated Jul. 20, 2023, in U.S. Appl. No. 17/651,013.
U.S. Non-Final Office Action dated Oct. 13, 2022, in U.S. Appl. No. 17/304,832.
U.S. Notice of Allowance dated Aug. 24, 2022 in U.S. Appl. No. 16/303,384.
U.S. Notice of Allowance dated Sep. 12, 2022 in U.S. Appl. No. 17/027,601.
U.S. Notice of Allowance dated Feb. 1, 2023 in U.S. Appl. No. 17/304,832.
U.S. Notice of Allowance dated Jun. 27, 2023 in U.S. Appl. No. 18/066,799.
U.S. Notice of Allowance dated May 4, 2022 in U.S. Appl. No. 16/303,384.
U.S. Notice of Allowance dated May 4, 2023 in U.S. Appl. No. 17/304,832.
U.S. Notice of Allowance dated May 8, 2024 in U.S. Appl. No. 17/651,013.
U.S. Notice of Allowance dated Sep. 5, 2023, in U.S. Appl. No. 17/249,595.
U.S. Appl. No. 18/359,842, inventors Brown et al., filed Jul. 26, 2023.
U.S. Appl. No. 18/797,098, inventors Brown S.C, et al., filed Aug. 7, 2024.
U.S. Restriction requirement dated Mar. 14, 2023 in U.S. Appl. No. 17/651,013.

* cited by examiner

Southern Hemisphere

Northern Hemisphere

A - Direct Sunlight Penetration
B - Clear Sky Prediction
C - Real-time Irradiance accounting for obstructed and reflected

Occupancy Lookup Table

Tint level (SHGC value)

| Penetration Depth / Space Type | Desk 1 | Desk 2 | Lobby |
|---|---|---|---|
| 2 feet | 10 (0.60) | 0 (0.80) | 0 (0.80) |
| 4 feet | 20 (0.40) | 5 (0.70) | 0 (0.80) |
| 6 feet | 30 (0.20) | 10 (0.60) | 5 (0.70) |
| 8 feet | 35 (0.10) | 20 (0.40) | 10 (0.60) |
| 10 feet | 35 (0.10) | 35 (0.10) | 10 (0.60) |
| 12 feet | 35 (0.10) | 35 (0.10) | 15 (0.50) |

*FIG. 20*

A - Direct Sunlight Penetration
B - Clear Sky Prediction
C - Real-time Irradiance accounting for obstructed and reflected

COMBI-SENSOR SYSTEMS

CROSS-REFERENCE TO RELATED APPLICATION

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The present disclosure relates to multiple sensor inputs and data handling related to same, in particular combi-sensor systems and methods of determining combi-sensor values.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

In certain aspects, a combi-sensor system may be used to improve control of building systems in a structure having fewer physical sensors than azimuthal facade positions. For example, a combi-sensor system may determine a combi-sensor value for a virtual sensor facing outward from a facade (or facet thereof) lacking its own physical sensor. The combi-sensor system can determine this combi-sensor value for this virtual sensor based on readings taken by two or more physical sensors facing different directions installed at the building.

According to certain aspects, a combi-sensor system uses either a combination technique or an interpolation technique to determine the combi-sensor value. The first technique combines readings from two or more physical sensors to determine an aggregate value that applies to all facade orientations at that time. The readings can be combined by: 1) taking the maximum value of the physical sensor readings, 2) taking the average value of the physical sensor readings, or 3) taking a sum of the physical sensor readings. The second technique interpolates readings from two or more physical sensors to a virtual facade-aligned sensor using a vector algorithm. Combi-sensor systems may use any combination of the aforementioned three combination methods.

A combi-sensor system generally comprises two or more physical sensors facing distinctly different directions (e.g., having azimuthal angles that vary by more than about 80 degrees, by more than about 70 degrees, by more than about 60 degrees, by more than about 50 degrees, etc.). For example, a combi-sensor system may include three physical sensors facing distinctly different directions. As another example, a combi-sensor system may include four physical sensors facing distinctly different directions. Since these physical sensors face different directions, they measure solar irradiance values from these distinctly different directions. The solar radiation values are typically recorded over time, for example, on a periodic basis over a day. The solar radiation profiles of the physical sensor values recorded over time sometimes have a shape similar to bell-shaped Gaussian-type curves. When solar radiation profiles from physical sensors facing distinctly different azimuthal angles are overlaid, the curves are somewhat similar in shape to each other and/or shifted time-wise from each other. The maximums, averages or sums of the profiles may be used to determine values from facades or directions where there are no physical sensors. In this way, the complexity of having many sensors facing in many directions is avoided. Simpler physical systems are realized, i.e. less physical sensors, while retaining the input as if one had many more physical sensors.

In some examples of combi-sensor systems described herein, the physical sensors are facing directions that are approximately orthogonal to each other. For example, a combi-sensor system may comprise four physical sensors facing approximately orthogonal directions (e.g., approximately in the directions of North (N), South (S), East (E) and West (W)). In other examples, the combi-sensor system includes three physical sensors installed on a building. In some cases, a comb-sensor system comprises three physical sensors that are facing approximately orthogonal directions. In certain examples where the building is located in a northern latitude, the three orthogonally-directed physical sensors face approximately W, E, and S. In certain examples where the building is located at a southern latitude, the three orthogonally-directed physical sensors face approximately W, E, and N.

In certain embodiments, a combi-sensor value may be used as input to control a building system. For example, a combi-sensor value may be used as input to a control system that determines tinting decisions for electrochromic (EC) window(s) or in a building and controls power to the window(s) to implement the tinting decisions. An example of such a control system is described in Section X. This control system uses operations of what are described as "Modules A, B, and C" of Intelligence™ EC control software to determine the tint decisions (Intelligence™ is commercially available from View, Inc. of Milpitas, California). In one embodiment, this control system uses Module A to determine a tint level that provides occupant comfort from glare to a workspace from sunlight penetrating a room and uses Module B to increase the tint level based on clear sky predictions of solar irradiance at that time of the day.

Module C may then use irradiance readings taken by one or more sensors (either physical or virtual) to override the tint level from Modules A and B, or not.

For example, a combi-sensor value may be used as input to Module C. Module C may override the tint level from Modules A and B to make the tint level lighter based on the combi-sensor value. That is, if the combi-sensor value is higher than the clear sky irradiance level used in Modules A and B, then Module C will not override Modules A and B and will ignore the higher combi-sensor irradiance value. If the combi-sensor value is lower than the clear sky irradiance level used in Modules A and B, then Module C will override Modules A and B. For illustration purposes, many embodiments are described herein with reference to input to the Modules of this particular control system, it would be understood however that the combi-sensor system can be used to generate combi-sensor value(s) as input for other control systems that rely on irradiance measurements as well, for example other smart window control algorithms or control algorithms for other systems such as HVAC, building management systems (BMS), solar tracking systems, etc. Embodiments disclosed are useful for determining solar irradiance on surfaces that do not have a physical sensor associated with the surface by using a "virtual sensor" that derives output from readings from physical sensors in other locations. In one embodiment a combi-sensor system includes hardware and software, while other aspects are embodied in software and/or methods alone, i.e. without physical components.

In certain embodiments, a combi-sensor system comprises a set of at least three azimuthally distinct physical sensors (i.e. directed to different azimuth angles). In some aspects, a combi-sensor system comprises four azimuthally distinct physical sensors. In some aspects, a combi-sensor system comprises three azimuthally distinct physical sensors. In some cases, these azimuthally distinct physical sensors are oriented in approximately orthogonal directions. The physical sensors are typically, though not necessarily, located on facades of a building. The combi-sensor system uses these physical sensors to determine solar irradiation for other facades not having physical sensors thereon. In one embodiment, the combi-sensor system comprises three orthogonally-directed physical sensors directed to North, 90 degrees from North and 270 degrees from North. In one embodiment, the combi-sensor system comprises three orthogonally-directed physical sensors directed to 90 degrees from North, 180 degrees from North, and 270 degrees from North. Combi-sensor systems may include more sensors, e.g. between two and twenty sensors, or between two and fifteen sensors, or between two and ten sensors, or between two and five sensors, depending on for example, how many facets and/or levels a structure has, the level of granularity and precision one requires the output to be, and the like.

Certain aspects pertain to a combination sensor comprising a set of physical sensors facing different directions proximate a structure (e.g., a building). The physical sensors are configured to measure solar radiation in different directions. The combination sensor further comprising a virtual facade-aligned sensor configured to determine a combi-sensor value at a facade of the structure based on solar radiation readings from the set of physical sensors.

Certain aspects pertain to methods comprising determining solar radiation readings taken by a set of physical sensors and determining a combi-sensor value of a virtual facade-aligned sensor based on the solar radiation readings taken by the set of physical sensors. In some cases, the set of physical sensors are facing different directions proximate a structure (e.g., a building) and are configured to measure solar radiation in different directions.

These and other features and embodiments will be described in more detail below with reference to the drawings.

BRIEF DESCRIPTION OF THE FIGURES

FIG. 20 is an example of an occupancy lookup table according to disclosed embodiments.

DETAILED DESCRIPTION

I. Introduction

Buildings and other structures sometimes have sensors installed to measure solar radiation such as photosensors, photometers, radiometers, ultraviolet sensors and the like. The measurements taken by these sensors can be used as input to control building systems (e.g., HVAC, electrochromic window systems, for example, to maintain a comfortable environment for its occupants or maximize power generation, and solar tracking, for example, to maintain a comfortable environment for its occupants or maximize power generation, etc. For structures having smart windows that tint on demand, for example, ideally, a structure would have a separate sensor installed on each wall at each floor (i.e. there is at least one sensor facing the direction of every facet of the structure). The number and locations of sensors installed on a structure, however, are usually limited. For example, the number and location of sensors visible from outside the building may be restricted for aesthetic reasons. Also, it may not be practical to have a sensor on every facet of a multi-faceted structure. Moreover, sensors installed on a structure can be become inoperable or malfunction making sensor data unavailable. Also, a sensor could become misaligned from the planned direction. Using data from a sensor that is substantially misaligned from the facet direction could result in improper or fluctuating control of the building systems that may be noticeable and/or uncomfortable to occupants of the building. For these reasons, sensor data is generally not available for every facet of the structure.

Figure 1A:
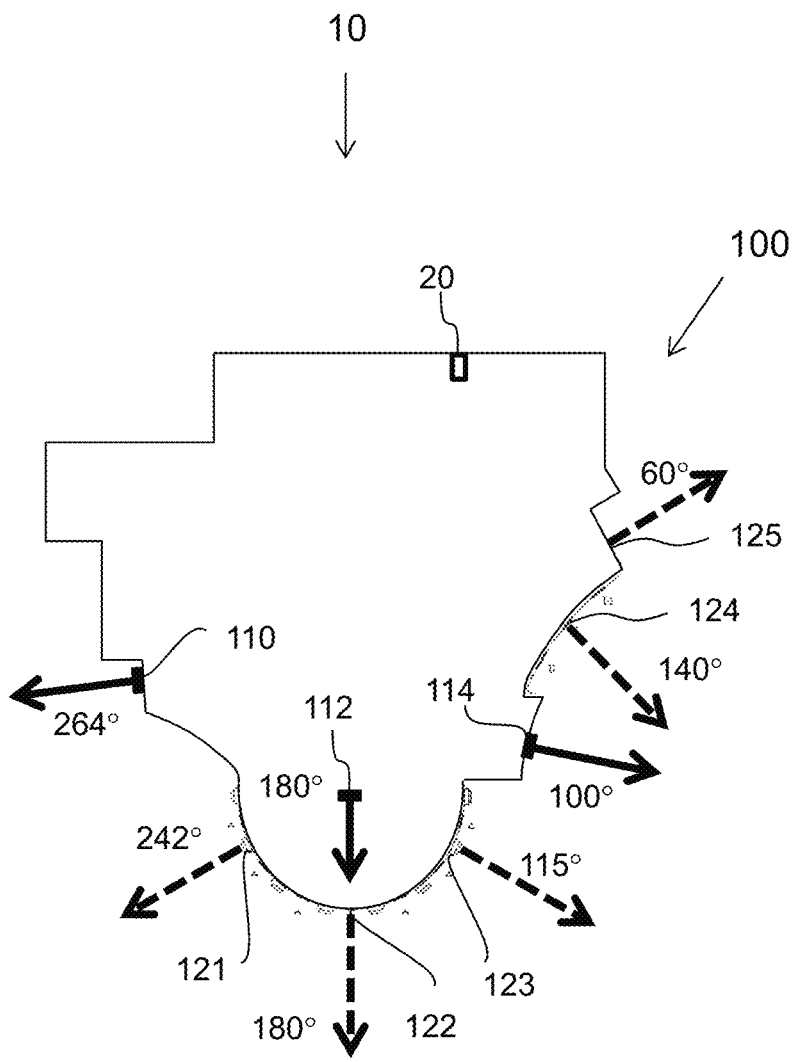
FIG. 1A is a schematic drawing of a plan view of a structure which includes a multi-faceted rotunda, according to an embodiment.
Figure 1A:
Figure 1B:
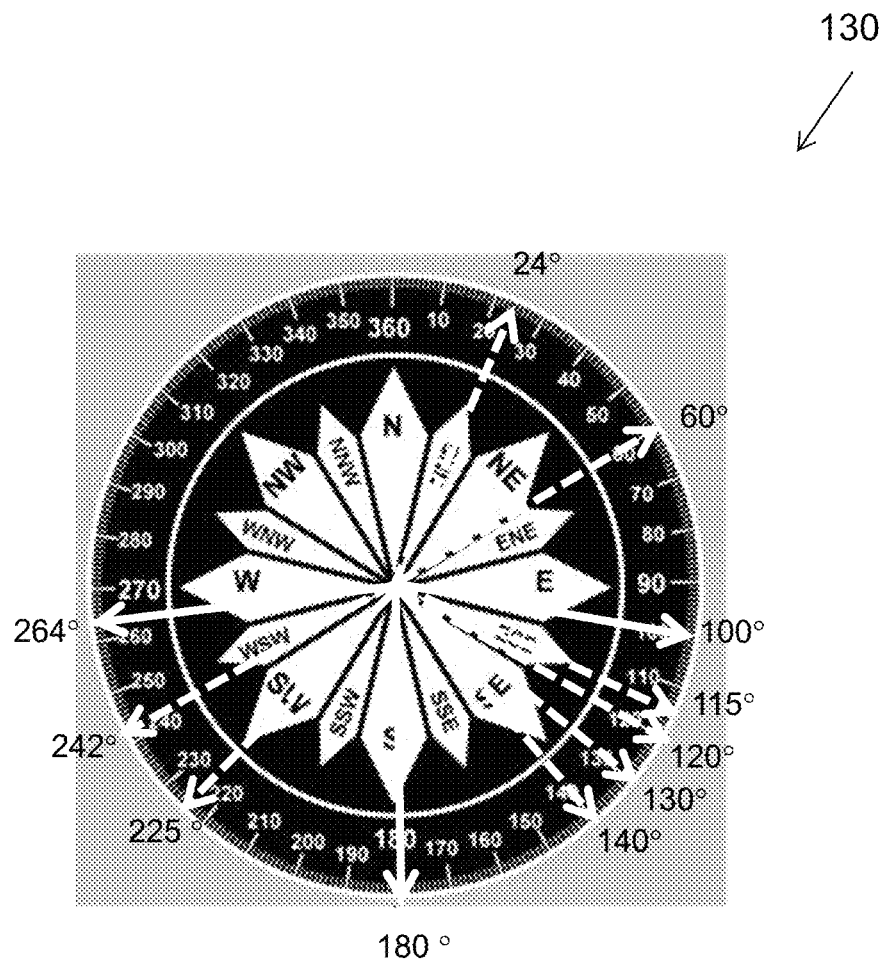
FIG. 1B is a drawing of a compass including the directions of some of the facets of the multi-faceted rotunda structure shown in FIG. 1A, according to an embodiment.

FIGS. 1A-1B are illustrations associated with an example of a building 10 with a multi-faceted rotunda 100, according to embodiments. FIG. 1A is a schematic drawing of a plan view of the multi-faceted rotunda 100. A directional arrow is shown pointing due North. The multi-faceted rotunda 100 comprises three physical sensors 110, 112, and 114 (e.g., photosensors) installed at directions denoted by solid arrows. The three sensors may be, for example, at the roofline of structure 100 to provide reliable readings and not be blocked by physical obstructions from neighboring structures. The first physical sensor 2110 faces the direction of 264 degrees from North, which is approximately West-facing. The second physical sensor 112 faces the direction of 180 degrees from North, which is South-facing. The third physical sensor 114 faces the direction of 100 degrees from North, which is nearly East facing. The directions of the three physical sensors 110, 112, and 114 are or are about West-facing, South-facing, and East facing, respectively. The first and third physical sensors 110 and 114 are installed on facets with windows. Many of the facets of the structure 100 are not aligned with the direction of one of the physical sensors 110, 112, and 114. For example, physical sensors are not installed on other facets 121, 122, 123, 124, and 125 of the building that also have windows. Facet 122 is facing the direction (denoted by dotted arrow) of 180 degrees from North, which is aligned with the direction of the second (South facing) physical sensor 112. The other facets 121, 123, 124, and 125, however, face directions of 242°, 115°, 140°, and 60° respectively (denoted by dotted arrows) that are not aligned with any of the directions of the three physical sensors 110, 112, and 114 installed on the multi-faceted rotunda structure 100. A wall switch 120 is located on an inner wall of the multi-faceted rotunda structure 100. Although many embodiments are described herein with respect to windows, one skilled in the art would understand that doors and other orifices of the structure would also apply.

FIG. 1B is a drawing of a compass 130 including the directions of some of the facets of the multi-faceted rotunda structure 100 shown in FIG. 1A. The compass 130 includes solid arrows denoting the directions of the facets with physical sensors 110, 112 and 114 i.e. 264°, 180° and 100°, respectively. Compass 130 also includes dotted arrows denoting directions of facets facing directions that are not in alignment with any of the directions of the three physical sensors 110, 112 and 114. For example, compass 130 includes dotted arrows denoting the directions of the facets 121, 123, 124 and 125 (242°, 115°, 140° and 60°) that are not in alignment with any of the directions of the three physical sensors 110, 112, and 114. The compass 130 also includes dotted arrows denoting other directions (225°, 130°, 120° and 24°) of facets not aligned in alignment with any of the directions of the three physical sensors 110, 112, and 114. Although not shown by directional arrows, other facets are not aligned to the directions of the three physical sensors 110, 112, and 114.

Figure 2A:
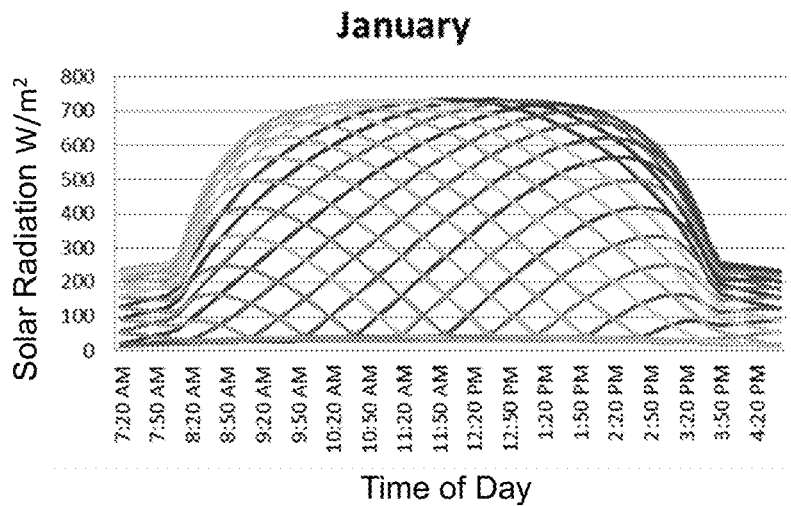
FIGS. 2A-2C are three graphs with solar radiation profiles for azimuth angles varying from 0-350 degrees at 10 degree increments during a day in January, April, and July respectively, according to an embodiment.
Figure 2B:
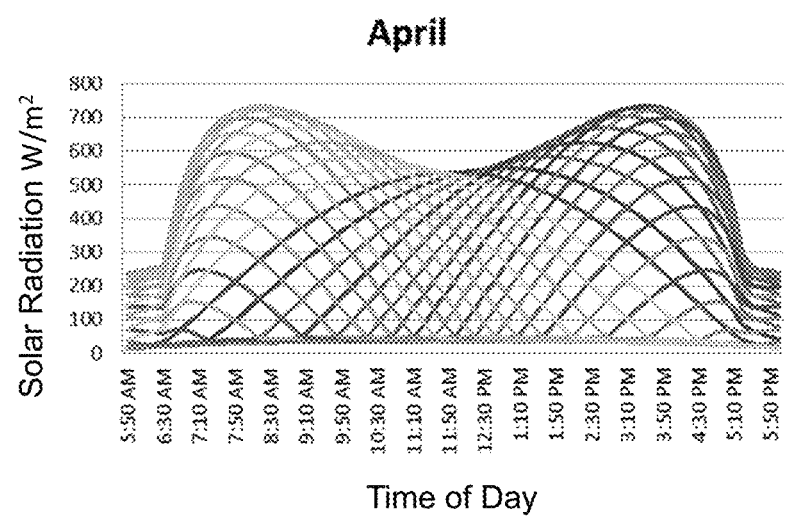
Figure 2C:
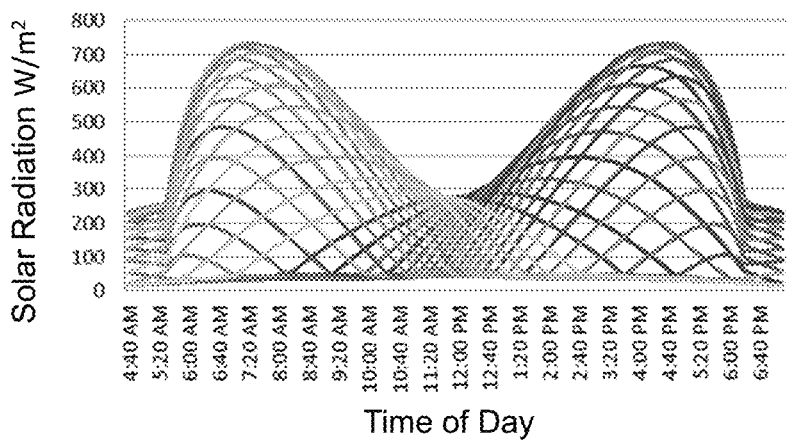

FIGS. 2A-2C depict three graphs of multiple solar radiation profiles (solar radiation in $W/m^2$ v. time) for solar radiation values during a day in January, April, and July respectively, according to an embodiment. Each graph includes multiple solar radiation profiles for azimuth angles varying by 10 degrees from 0-350 degrees. The solar radiation profiles are associated with the geographical location (i.e. longitude and latitude) of building with the rotunda structure 100 shown in FIG. 1A. Each solar radiation profile is the solar radiation profiles is the solar radiation over time between sunrise and sunset during a day at that time of the year.

Figure 3A:
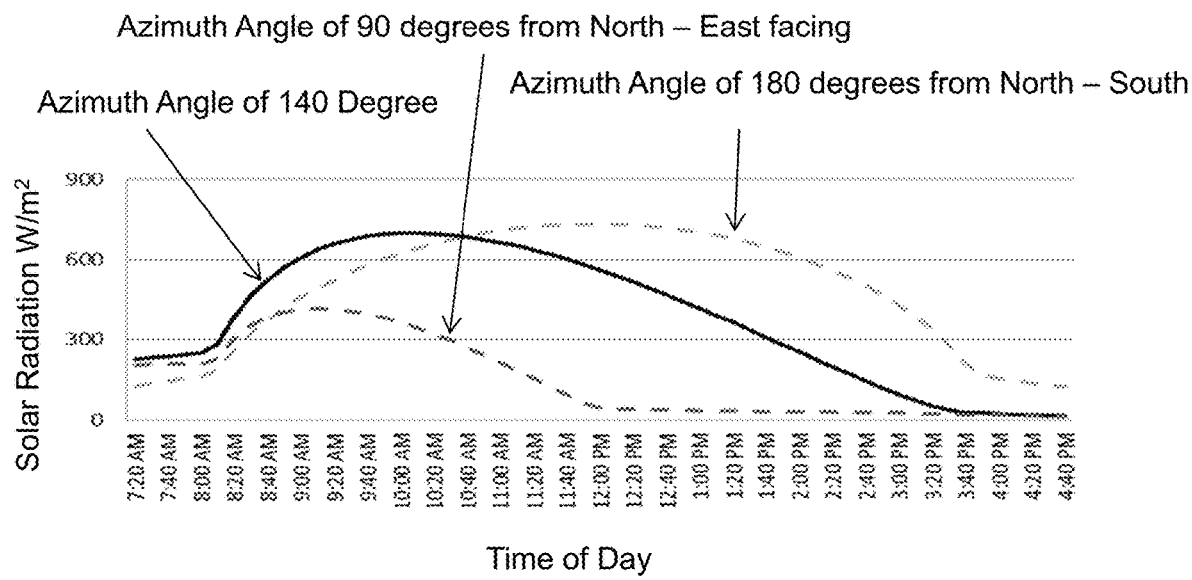
FIGS. 3A-3B are two graphs with solar radiation profiles for azimuth angles of 140 degrees from North, 90 degrees from North or East-facing, 180 degrees from North or South-facing, according to an embodiment.
Figure 3B:
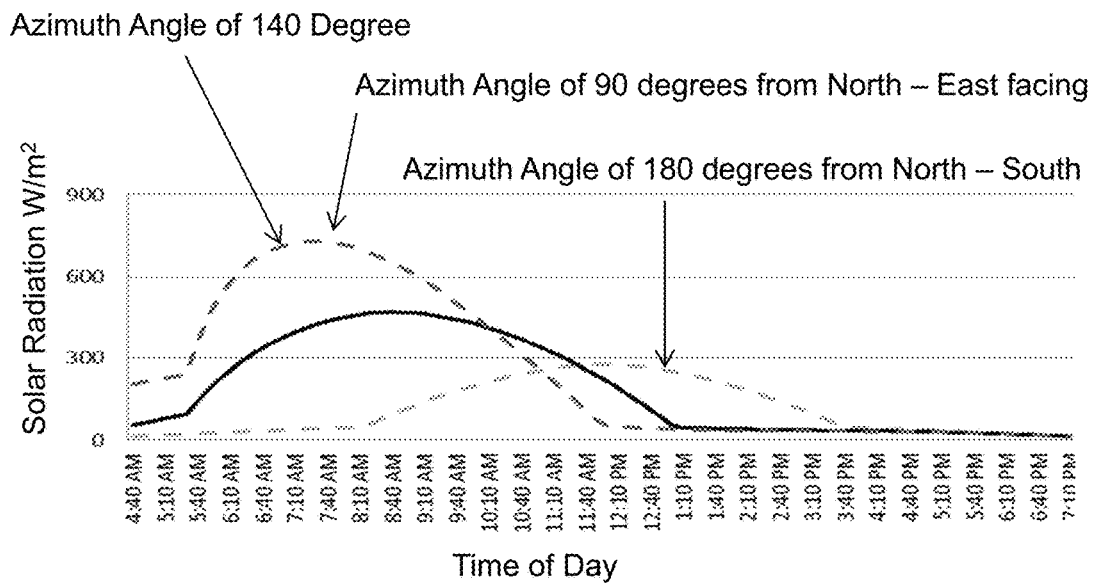

FIGS. 3A-3B depict two graphs of solar radiation profiles for the azimuth angles of 140 degrees from North, 90 degrees from North or East-facing, 180 degrees from North or South-facing. The solar radiation profiles are associated with the geographical location of building 10 with the rotunda 100 shown in FIG. 1A. The solar radiation profiles in FIG. 3A is over a day in January. The solar radiation profiles in FIG. 3B is over a day in July. As shown in FIG. 3A, the solar radiation profile (solid line) at the azimuth angle of 140 degrees from North is more similar to the South-facing profile (dotted line) than the East-facing profile in January. As shown in FIG. 3B, the solar radiation profile (solid line) at the azimuth angle of 140 degrees from North is more similar to the East-facing profile (dotted line) than the South-facing profile in July.

As mentioned above, physical sensors can be misaligned from the direction to which they are intended to be configured (e.g., installed) to measure solar radiation. This misalignment can result in the sensors taking solar radiation measurements (also called "lux" in some instances herein) that do not correspond to the amount of solar radiation that impinges the façade from that direction. The measurements correspond to the misaligned direction. This misalignment can result in the sensor providing inaccurate data as input to the control system such as a window controller electronically tinting windows or shading systems on that façade. Combi-sensor systems can account for misalignment and provide accurate sensor data, as well as allow for less physical sensors in a given installation while retaining a data input approximating that which would be available with more physical sensors.

II. Introduction to Combi-Sensor Systems

In certain aspects, a combi-sensor system may be used to improve control of building systems in a structure having fewer physical sensors than azimuthal facade positions and/or fewer physical sensors than vertical floors in the building. For example, a combi-sensor system may determine a combi-sensor value for a "virtual" sensor facing outward from a facade (or facet thereof) lacking its own physical sensor. The combi-sensor system can determine this combi-sensor value for this virtual sensor based on readings taken by two or more physical sensors facing different directions installed at the building.

According to certain aspects, a combi-sensor system uses either a combination technique or an interpolation technique to determine the combi-sensor value. The first technique combines readings from two or more physical sensors to determine an aggregate value that applies to all facade orientations at that time. The readings can be combined by: 1) taking the maximum value of the physical sensor readings, 2) taking the average value of the physical sensor readings, or 3) taking a sum of the physical sensor readings. The second technique interpolates readings from two or more physical sensors to a virtual facade-aligned sensor using a vector algorithm.

A combi-sensor system generally comprises two or more physical sensors in different locations, azimuthally (as observed in a plane parallel to the floors of a building or, for example, located at different vertical locations, e.g. floors, of a building). For azimuthally distinct physical sensors, for example, physical sensors facing distinctly different directions (e.g., having azimuthal angles that vary by more than about 80 degrees, by more than about 70 degrees, by more than about 60 degrees, by more than about 50 degrees, etc.). For example, a combi-sensor system may include three physical sensors facing distinctly different directions. As another example, a combi-sensor system may include four physical sensors facing distinctly different directions. Since these physical sensors face different directions, they measure solar irradiance values from these distinctly different directions. The solar radiation values are typically recorded over time, for example, on a periodic basis over a day. The solar radiation profiles of the physical sensor values recorded over time sometimes have a shape similar to bell-shaped Gaussian-type curves. When solar radiation profiles from physical sensors facing distinctly different azimuthal angles are overlaid, the curves are somewhat similar in shape to each other and/or shifted time-wise from each other. For example, these curve overlays can be used to determine or estimate solar irradiance occurring on facades with azimuthal orientations different from those facades bearing physical sensors.

In some examples of combi-sensor systems described herein, the physical sensors are facing directions that are approximately orthogonal to each other. For example, a combi-sensor system may comprise four physical sensors facing approximately orthogonal directions (e.g., approximately in the directions of North (N), South (S), East (E) and West (W)). In other examples, the combi-sensor system includes three physical sensors installed on a building. In some cases, a comb-sensor system comprises three physical sensors that are facing approximately orthogonal directions. In certain examples where the building is located in a northern latitude, the three orthogonally-directed physical sensors face approximately W, E, and S. In certain examples where the building is located at a southern latitude, the three orthogonally-directed physical sensors face approximately W, E, and N.

As described herein, a physical sensor may be considered to face approximately in a particular direction if it is, for example, within 5 degrees of the direction, within 2 degrees of the direction, within 3 degrees of the direction, in a range of 1-10 degrees of the direction, in a range of 5-15 degrees of the direction, and/or in a range of 1-5 degrees of the direction.

In certain embodiments, a combi-sensor value may be used as input to control a building system. For example, a combi-sensor value may be used as input to a control system that determines tinting decisions for electrochromic (EC) window(s) or in a building and controls power to the window(s) to implement the tinting decisions. An example of such a control system is described in Section X. This control system uses operations of Modules A, B, and C to determine the tint decisions. In one embodiment, this control system uses Module A to determine a tint level that provides occupant comfort from glare to a workspace from sunlight penetrating a room and uses Module B to increase the tint level based on clear sky predictions of solar irradiance at that time of the day. Module C may then use irradiance readings taken by one or more sensors (either physical or virtual) to override the tint level from Modules A and B. For example, a combi-sensor value may be used as input to Module C. Module C may override the tint level from Modules A and B to make the tint level lighter based on the combi-sensor value. That is, if the combi-sensor value is higher than the clear sky irradiance level used in Modules A and B, then Module C will not override Modules A and B and will ignore the higher combi-sensor irradiance value. If the combi-sensor value is lower than the clear sky irradiance level used in Modules A and B, then Module C will override Modules A and B. For illustration purposes, many embodiments are described herein with reference to input to the Modules of this control system, it would be understood however that the combi-sensor system can be used to generate combi-sensor value(s) as input for other systems as well.

III. Examples of Combi-Sensor Systems

In certain embodiments, a combi-sensor system comprises a set of at least three azimuthally distinct physical sensors (i.e. directed to different azimuth angles). In some aspects, a combi-sensor system comprises four azimuthally distinct physical sensors. In some aspects, a combi-sensor system comprises three azimuthally distinct physical sensors. In some cases, these azimuthally distinct physical sensors are oriented in approximately orthogonal directions. That is, each of these orthogonally-directed sensors is directed at an azimuth angle that is approximately 90 degrees (e.g., 90 degrees±5 degrees, 90 degrees±2 degrees, 90 degrees±1 degrees) from the azimuth angle of at least one other physical sensor. In some examples of systems with four orthogonally-directed sensors, the physical sensors may directed to face approximately N, E, S, and W (e.g., ±5 degrees from North, ±5 degrees from East, ±5 degrees from South, ±5 degrees from West; ±3 degrees from N, E, S, W; and ±2 degrees from N, E, S, W; ±1 degrees from N, E, S, W). In one embodiment, the system comprises four orthogonally-directed physical sensors directed to North, 90 degrees from North, 180 degrees from North, and 270 degrees from North.

Figure 4:
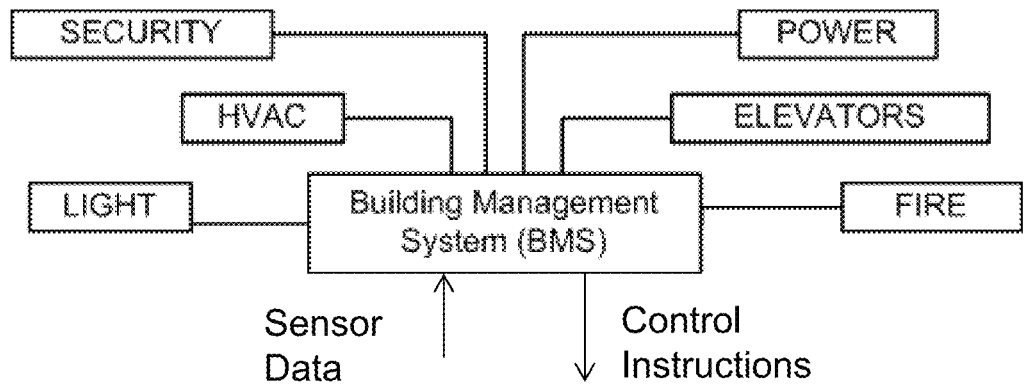
FIG. 4 is a schematic diagram of a combi-sensor system at a multi-faceted building and building control systems, according to embodiments.
Figure 4:
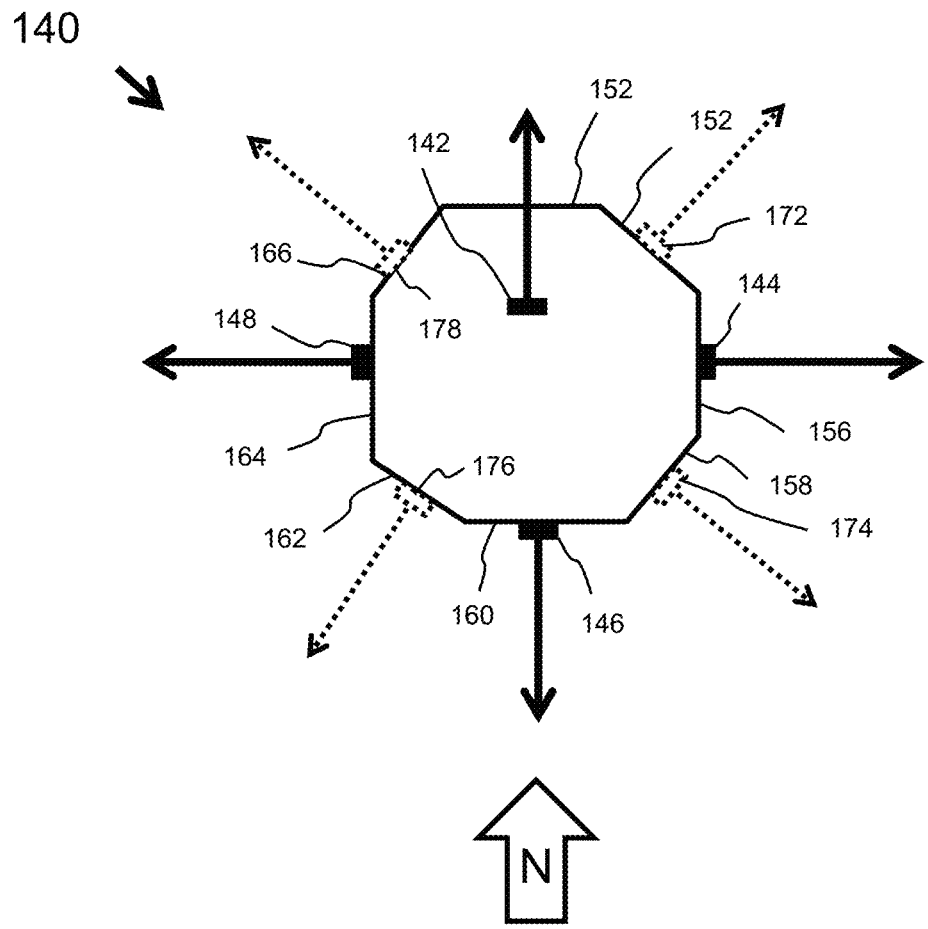

FIG. 4 is a schematic diagram of a combi-sensor system 140 at a multi-faceted building and building control systems, according to embodiments. The combi-sensor system 140 comprises four physical sensors 142, 144, 146, and 148. The multi-faceted structure is octagonal, having a first facade 152, a second façade 154, a third façade 156, a fourth facade 158, and fifth façade 160, a sixth façade 162, a seventh façade 164 and an eighth façade 166. The first physical sensor 142 is directed to 0 degrees from North (North), which is the direction normal to the first façade 152. The second physical sensor 144 is located on the third façade 156 and is directed to 90 degrees from North (East), which is in the normal direction of the third facade 156. The third physical sensor 146 is located on the fifth facade 160 and is directed to 180 degrees from North (South), which is the normal direction of the fifth facade 160. The fourth physical sensor 148 is located on the seventh facade 164 and is directed to 270 degrees from North (West), which is the normal direction to the seventh facade 164.

In FIG. 4, combi-sensor system 140 further comprises a first virtual sensor 172 in a direction normal to the second façade 154 and a second virtual sensor 174 in a direction normal to the fourth façade 158. In addition, the combi-sensor system 140 comprises a third virtual sensor 176 in the direction normal to the sixth façade 162 and a fourth virtual sensor 178 in the direction normal to the eighth façade 166. Although the structure in FIG. 4 is shown having eight facades on a single floor of a structure, the combi-sensor system 140 can be used with a structure having more or fewer facades/facets and/or a structure having multiple floors. Although many of the sensors are shown on the outside of facades, a sensor can be at another location from the façade while oriented (pointed) in the direction of the corresponding façade. For example, first physical sensor 142 is not located on the first façade 152, but is in in a normal direction to the first façade 152.

In FIG. 4, the physical sensors are in electrical communication (not shown) with the building management system (BMS) 2710 to send and receive data such as sensor data. The BMS 2710 may be a component of the combi-sensor system 140, or may be a separate component. The BMS 2710 is in communication with a fire system 2720, an elevators system 2730, a power system 2740, a security system 2750, an HVAC system 2760, and a lighting system 2770. In this example, the BMS 2710 is receiving sensor data from the physical sensors 142, 144, 146, and 148 and sending control instructions to the windows of the structure. Details of other possible components of combi-sensor system 140 are described in Section X.

In certain aspects, the combi-sensor system 140 is in communication with one or more window controllers for controlling EC windows in the multifaceted structure.

Figure 5A:
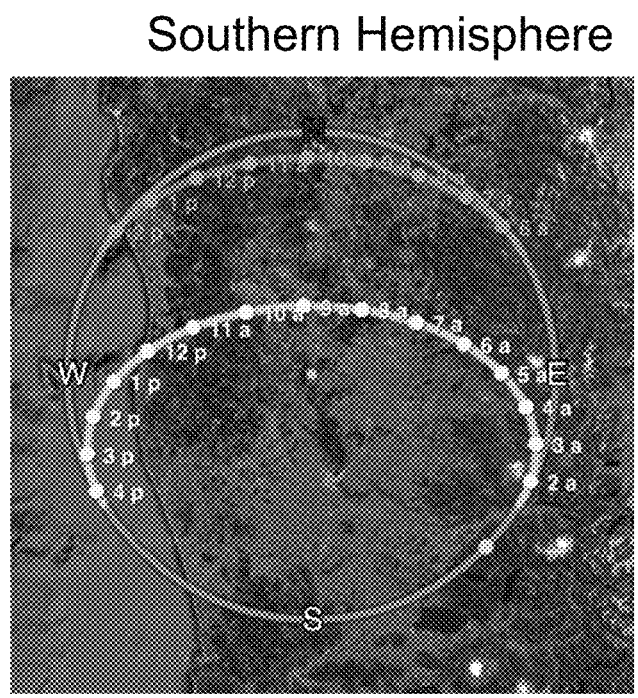
FIGS. 5A and 5B depict diagrams showing the solar radiation exposure at different times of day for geographical locations in the southern hemisphere and northern hemisphere respectively, according to embodiments.
Figure 5B:
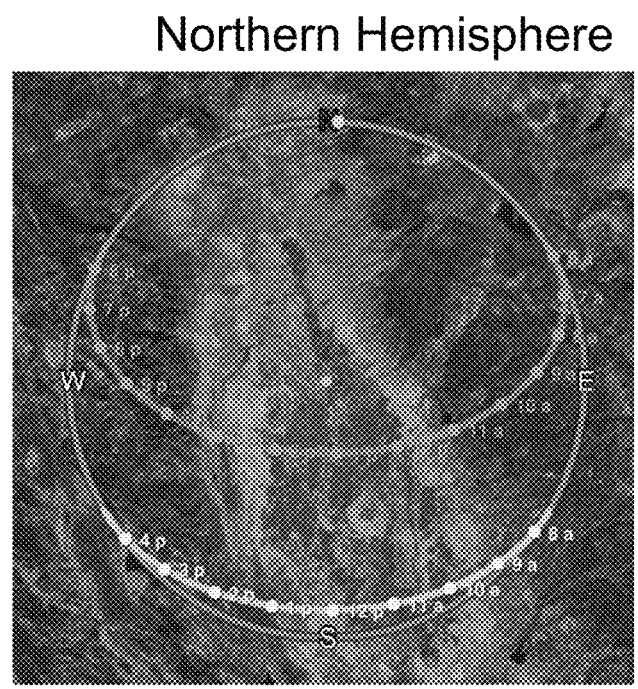

FIGS. 5A and 5B are diagrams showing the solar radiation exposure at different times of day for geographical locations in the southern hemisphere and northern hemisphere respectively. As shown in FIGS. 5A and 5B, North is actually precisely opposite of south however exposure to the north is covered by the combination of East and West and vice versa in the southern hemisphere.

For buildings geographically located in the Northern hemisphere, the north facing facades are only exposed to morning and evening sun for a brief time (and only in summer months) which would be covered by an east and west facing physical sensor combined. In these cases, the northern exposure's radiant component is less impactful and, in certain cases, may be omitted from a combi-sensor system's physical sensors. In one example of a building geographically located in a northern latitude, a combi-sensor system comprises three orthogonally-directed physical sensors facing approximately W, E, and S.

For buildings geographically located in the Southern hemisphere, the south facing facades are only exposed to morning and evening sun for a brief time (and only in summer months) which would be covered by an east and west facing physical sensor. In these cases, the southern exposure's radiant component is less impactful and, in certain cases, may be omitted from the combi-sensor system's physical sensors. In one example of a building geographically located in a southern latitude, a combi-sensor system comprises three orthogonally-directed physical sensors facing approximately W, E, and N.

Figure 6A:
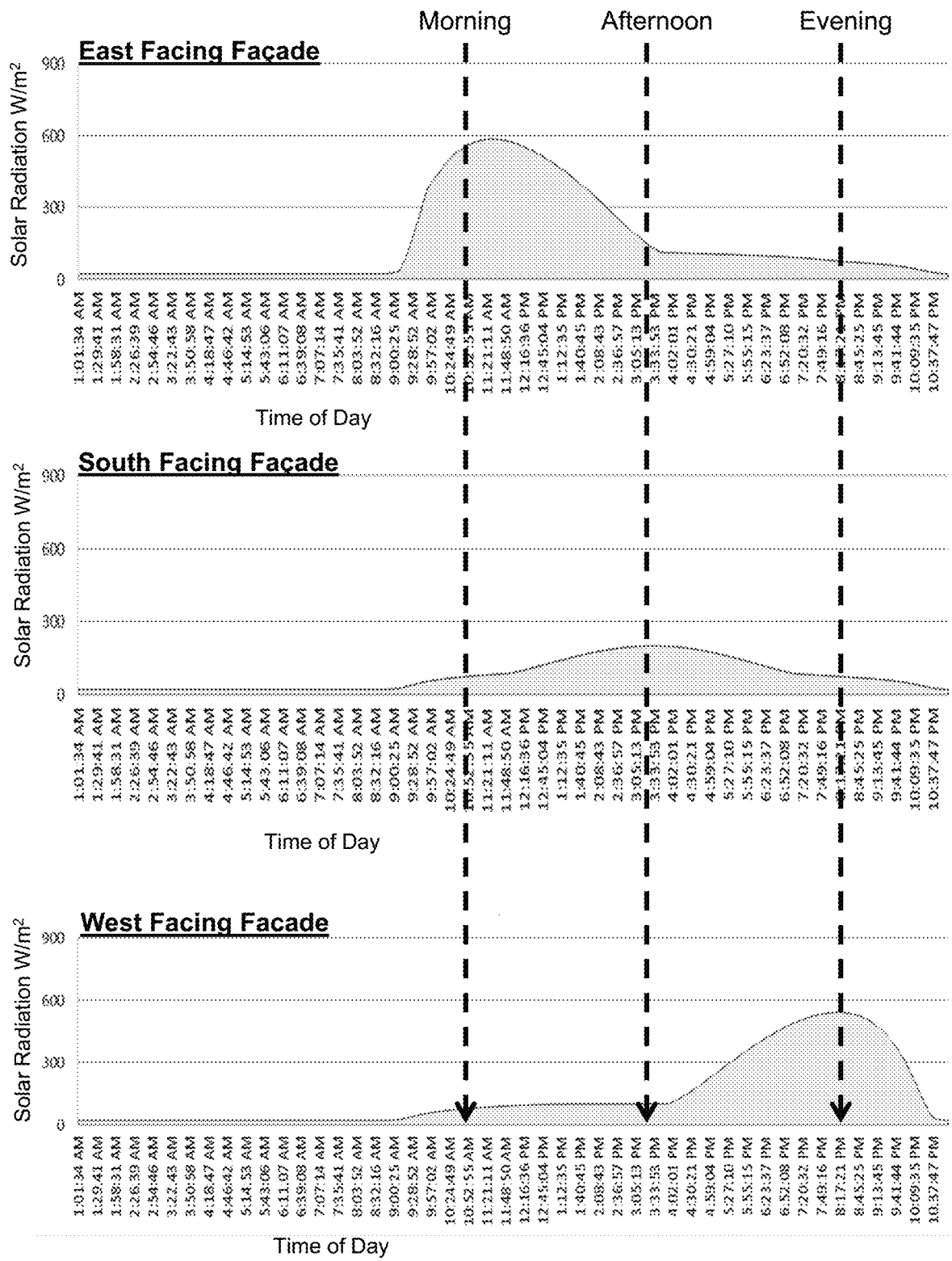
FIG. 6A depicts three graphs of solar radiation profiles based on actual readings from the East-facing sensor, the South-facing sensor, and the West-facing sensor of the combi-sensor system installed at the building, according to an embodiment.

In one embodiment, a combi-sensor system comprises three orthogonally-directed physical sensors installed at a building in southern California, which is in the Northern Hemisphere. The three orthogonally-directed physical sensors comprise an East-facing sensor at 90 degrees from North, a South-facing sensor at 180 degrees from North, and a West-facing sensor at 270 degrees from North. FIG. 6A provides three graphs of solar radiation profiles (solar radiation W/m$^2$ vs time of day) based on actual readings taken by the East-facing sensor, the South-facing sensor, and the West-facing sensor of the combi-sensor system associated with the building. As shown, the East, West, and South facing facades experience different amounts of solar radiation at the same time of day. The arrows (at morning, afternoon, and evening) show that the facades have different profiles.

Although the hardware elements, for example photosensors, may be installed at a building, algorithms and associated computing hardware may be located elsewhere, e.g. at a processing center or at the same building at the photosensors. Although typically the physical sensors are installed on the building façade, they may also be installed proximate the building and oriented as they would be if on the façade of the building, or both having some sensors on the building and some not on the building. Also, for example where two or more buildings are in the same vicinity and have similar orientations and configurations, the physical sensors may be on only one such building and the combi-sensor system serve the needs of control algorithms for window tinting functions of other buildings in the vicinity. In another example, where two or more buildings are in the same vicinity and have similar orientations and configurations, the physical sensors may be dispersed on different buildings while serving a single combi-sensor system and one or more building's window tinting control algorithms. Thus a group of sensors on a single building and/or a network of sensors in disparate locations can be part of a combi-sensor system that serves one or more buildings. Where weather and sun patterns are similar over larger geographical areas, a combi-sensor system may serve several buildings in that geographical area.

Figure 6B:
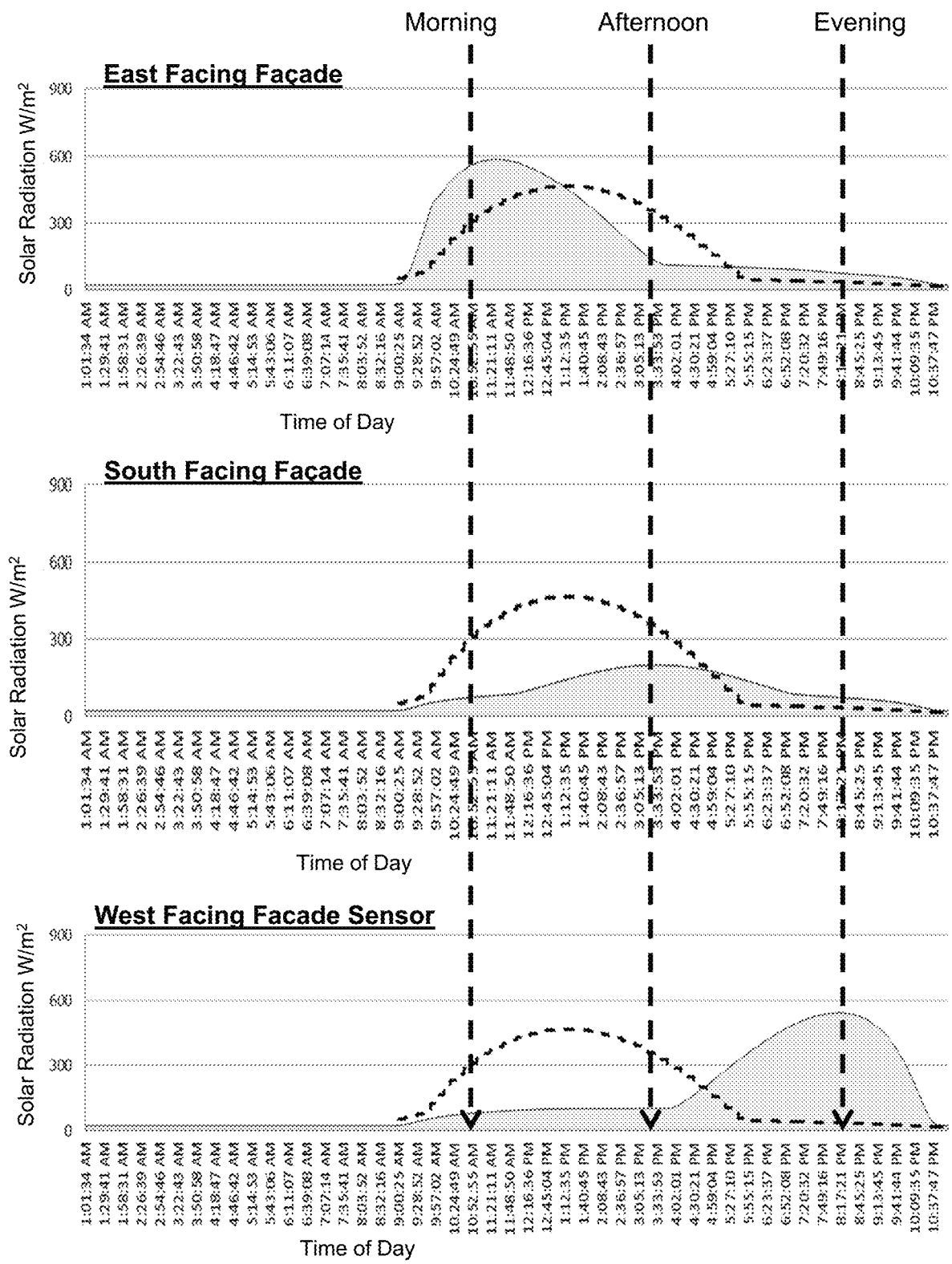
FIG. 6B depicts graphs from FIG. 6A with the addition of a solar radiation profile (dotted line) in the direction of a facade at 150 degrees from North-SE facing facade (60 degrees off East and 30 degrees off South), according to an embodiment.

FIG. 6B shows the same profiles (solid lines) from FIG. 6A with the addition of solar radiation profiles (dotted lines) in the direction of a facade at 150 degrees from North-Southeast (SE) facing facade (60 degrees off East and 30 degrees off South). If only actual irradiance readings from the physical sensors on the East, South and/or West facing facades were used as input to an electrochromic window switching algorithm, problems could arise when determining tint values for, e.g., the southeast (SE) façade. For example, in the morning, if either the South or West-facing sensors were used as input for the SE facade to Module C, they would cause Module C to override the tint level from Modules A/B lowering the tint level to too low a level, because the South or West facing sensors do not read much solar intensity at that time. This would cause a potential glare scenario since the irradiance level of the SE facade is higher, thus the readings from S and W sensors at that time would send a "false" reading. Thus, the highest irradiance value of the East facing facade would be a better value to use in the morning as a surrogate for an irradiance reading at the SE facade. In the afternoon, the East-facing facade is getting much less solar exposure and Module C would clear (override Module A and B tint values) if using the East-facing facade sensor value alone while the SE facade could still be exposed to significant radiation (because the S façade is experiencing solar irradiation sufficient for glare). Thus, the highest irradiance value of the South facing facade would a better value to use in the afternoon as a surrogate for an irradiance reading at the SE facade. In another example, in the evening, if the South facing facade irradiance value was used as a surrogate for the south west (SW) façade, Module C of the control system for tinting/clearing electrochromic (EC) windows discussed in Section X would override the tint value set by Modules A and B and clear the glass. This also would expose the SW facade to uncomfortably high solar radiation, because the West façade is exposed to high solar irradiance at that time (and thus the SW façade). Thus, the West-facing facade with the highest irradiance value is more appropriate as an irradiance input for evening on the SW facade. Since Module C can only lighten, by overriding tint decisions from Modules A and B, the evening times are irrelevant for the SE facade. Module A and B would have already maximally cleared the window in the early evening. Combi-sensor systems can calculate expected solar exposure at facades having no physical sensors and thereby ensure that tint override commands are given appropriately for windows on particular facades of a building.

IV. Vertically Sparse Physical Sensors

Just as a combi-sensor system can be used to determine virtual sensor values by using physical sensor values about a azimuthal span horizontally, so can a combi-sensor system determine virtual sensor values at vertical levels (e.g., floors, or spaced apart horizontally and oriented the same direction) without physical sensors i.e. in a structure having vertically sparse physical sensors. In certain aspects, a combi-sensor system determines a combi-sensor value at intermediate levels between levels with physical sensors or at other levels without physical sensors. For example, certain lower floors of a building may be shaded by neighboring buildings, while upper floors are not. A combi-sensor system can be used to determine combi-sensor light values for virtual sensors on those lower floors that do not have physical sensors. In other aspects, a combi-sensor system can determine a combi-sensor value based on readings from multiple vertically separated physical sensors on a single facade. The values from the individual vertically separated physical sensors could be combined in the same way as the values from azimuthally separated sensors as described in Section V below. The combi-sensor value may be used as a combined output into Module C for all of the vertical sections on the facade, for example.

V. Techniques for Determining Combi-Sensor Values for Virtual Sensors not in Phase with Physical Sensors There are two main techniques for determining a combi-sensor value for a virtual facade-aligned sensor. The first technique combines readings from two or more physical sensors to determine an aggregate combi-sensor value that can be used for all orientations. The second technique interpolates readings from two or more physical sensors to the virtual facade-aligned sensor using a vector algorithm. Technique 1.

The first technique combines readings at any given time from three or more physical sensors facing azimuthally distinct directions to determine a combi-sensor value. This combi-sensor value applies to all facade orientations for the given time. An aggregate envelope is an area enclosed by the curve defined by the aggregate combi-sensor values for that day. The aggregate value is determined by one of the following methods: 1) determining a maximum value of the physical sensor values, 2) averaging the physical sensor values, or 3) summing the physical sensor values.

Method 1—Maximum Value Method

The first method determines a combi-sensor value, at each sample time, which is the maximum value of all the readings taken by the three or more physical sensors. The determined maximum values generate an aggregate envelope that contains the solar radiation profiles from all possible facade orientations for the day. That is, all facades are experiencing a solar radiation at or lower than the maximum sensor value. This method retains the magnitude of output of a single physical sensor since each maximum value is of a single sensor at each sample time. Since the magnitude of the single physical sensor is retained, this allows for the combination of sensors in legacy installations or combination of combi-sensors and single sensors. That is, with this method, it does not matter how many sensors are added or removed from the combi-sensor system, the aggregate envelope should remain the same and thus, the magnitudes of these maximum values remain accurate.

Figure 7A:
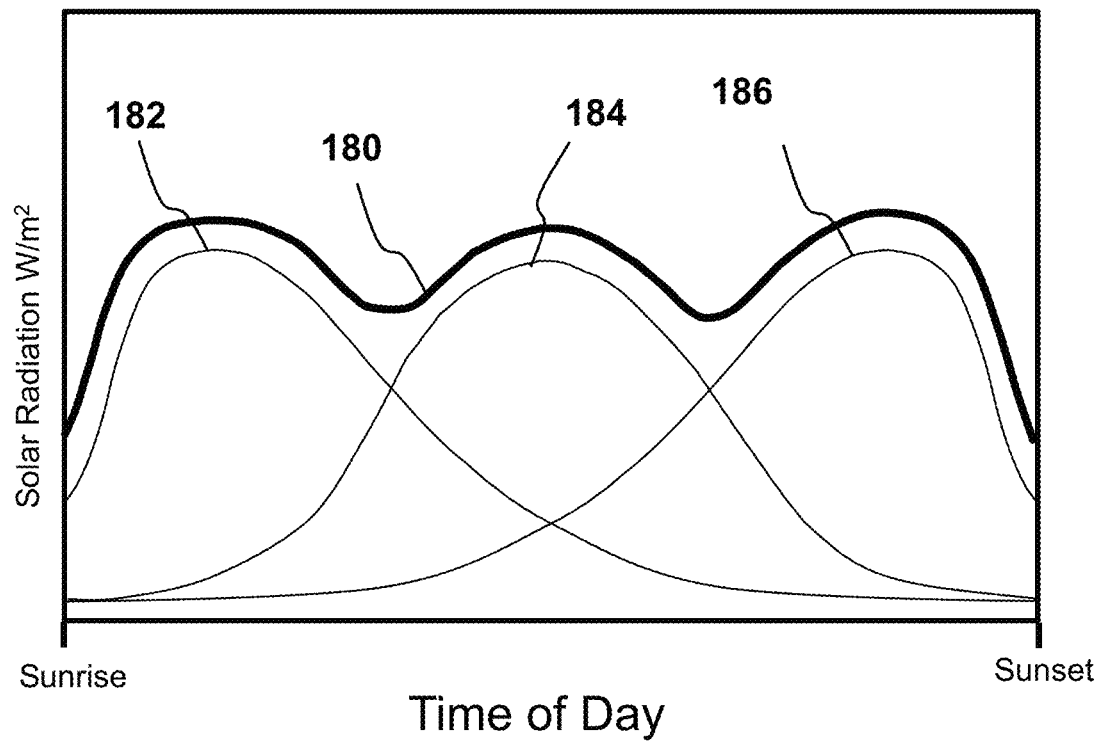
FIG. 7A is a graph illustrating an example of an aggregate curve (shaded) of combi-sensor values determined from sunrise to sunset using the maximum value method for a combi-sensor system comprising three orthogonally-directed sensors (sensor 1, sensor 2, and sensor 3), according to an embodiment.

FIG. 7A is a graph illustrating an example of an aggregate curve (shaded) 180 of combi-sensor irradiance values determined from sunrise to sunset using the maximum value method for a combi-sensor system comprising three orthogonally-directed physical sensors (sensor 1, sensor 2, and sensor 3), according to an embodiment. The graph also includes three solar radiation profiles 182, 184, and 186 from sensor 1, sensor 2, and sensor 3 respectively on a day of the year. As shown, the aggregate curve 180 contains the solar radiation profiles 182, 184, and 186. The aggregate combi-sensor values from the aggregate curve 180 can be used as input into a building control system that use irradiance values in directions that are not aligned with physical sensors. The combi-sensor values can be used as surrogate values for actual irradiance readings. The combi-sensor values at a given time of the day can be used as surrogate irradiance readings in various directions at or nearby the location of the combi-sensor system installation. For example, the combi-sensor values can be used as input to a control system that determines tint states for electrochromic windows as discussed in Section X.

Figure 7B:
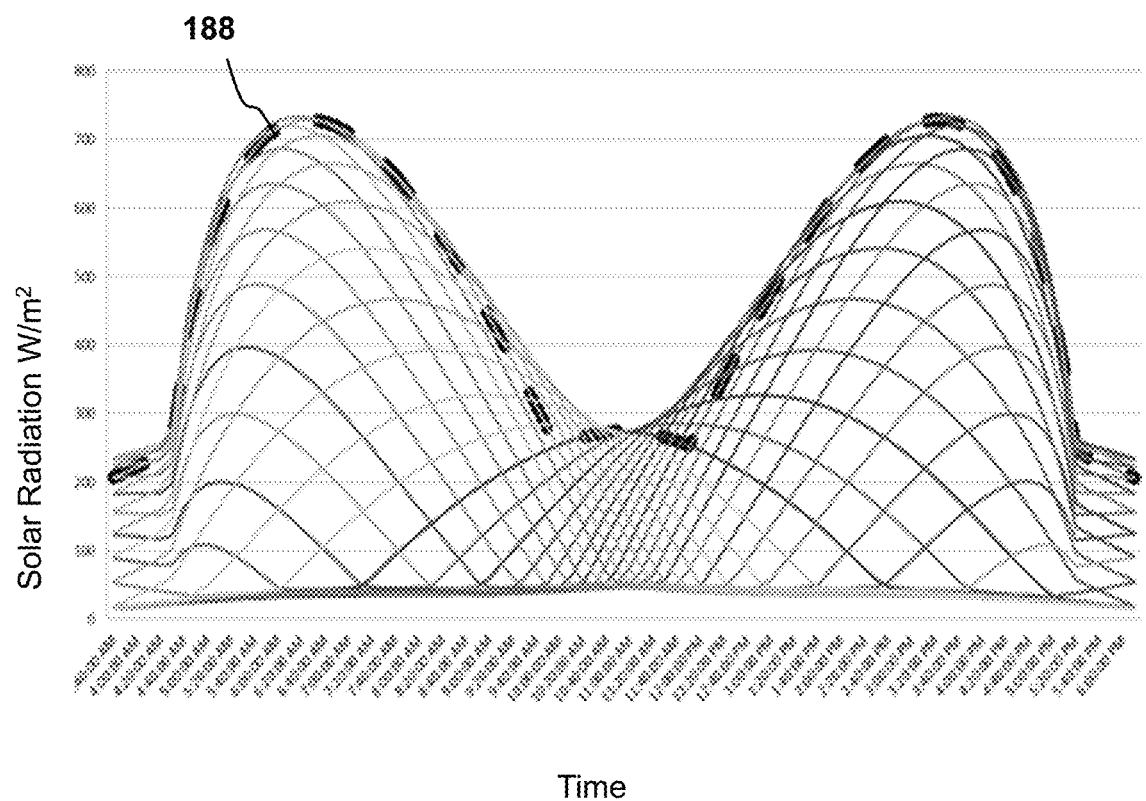
FIG. 7B is graph illustrating an example of an aggregate curve (dotted line) of combi-sensor values determined using the maximum value method over the Summer Solstice day, according to embodiments.

FIG. 7B is graph illustrating an example of an aggregate curve 188 (dotted line) of combi-sensor values determined using the maximum value method over the Summer Solstice day, according to embodiments. The aggregate curve is based on taking the maximum values of predicted clear sky solar radiation profiles for the three orientations East, South, and West. The graph also includes overlapping clear sky predicted solar radiation profiles (multiple solid lines) for every 10 degrees of azimuth angle orientations ranging from 0 (360) degrees to 350 degrees of a structure. As shown, the aggregate curve envelope will include the maximum values of all possible facade orientations for the day. That is, the combi-sensor value at each sample time will be greater or equal to the readings at all possible facades.

Figure 7C:
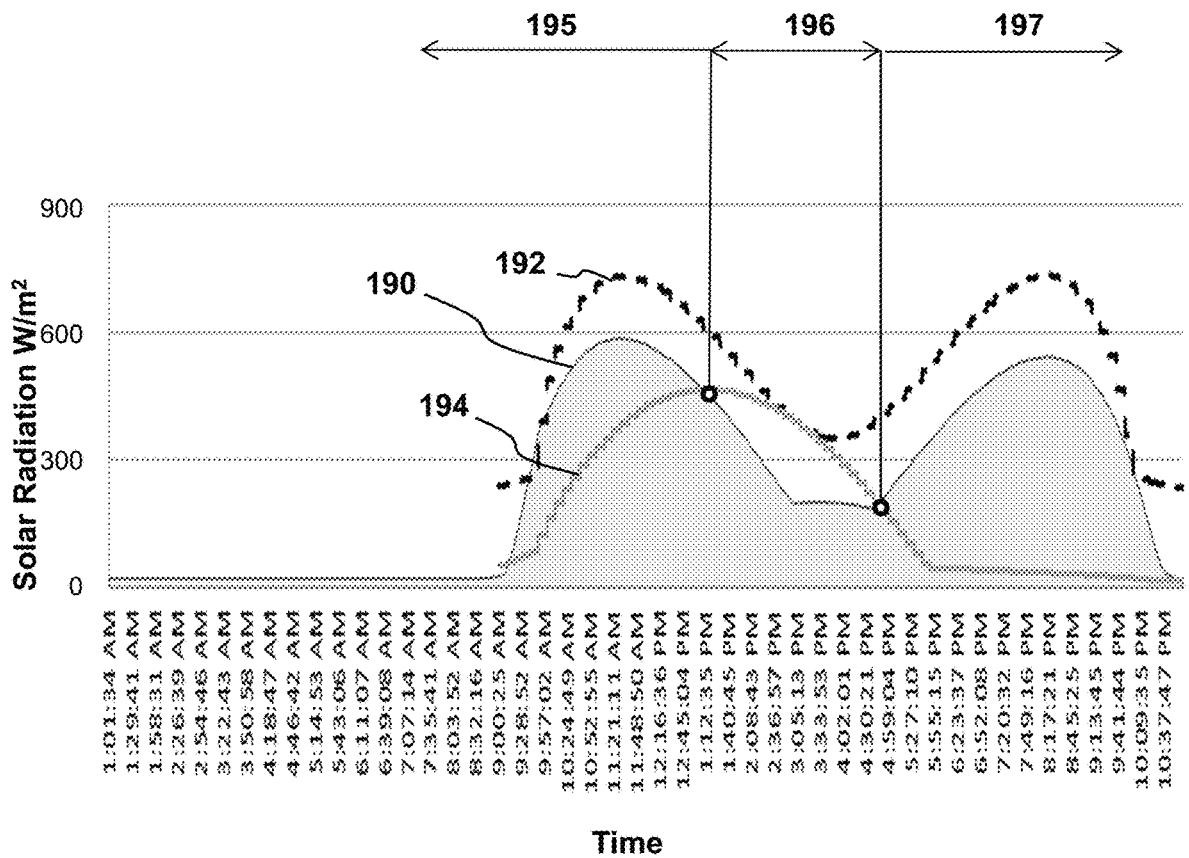
FIG. 7C depicts a graph illustrating an example of an envelope (shaded area) of an aggregate curve of combi-sensor values, over a day, determined using the maximum value method, according to an embodiment.

FIG. 7C is a graph illustrating an example of an envelope (shaded area) of an aggregate curve 190 of combi-sensor values, over a day, determined using the maximum value method, according to an embodiment. In the aggregate curve 190, the combi-sensor values are based on the maximum solar radiation measured by the combined East-facing sensor, South-facing sensor, and West-facing sensor of a structure. The graph also includes a theoretical aggregate curve 192 of combi-sensor values generated using the maximum value method by determining the maximum value of the combined predicted clear sky radiation values from the East-facing sensor, South-facing sensor, and West-facing sensor. The graph also includes a theoretical clear sky solar radiation profile 194 of a façade facing 150 degrees of North (60 degrees off East) i.e. SE facing facade. The aggregate curve 192 is the theoretical combined clear sky maximum irradiance for all modeled facades for comparison to the theoretical solar radiation profile 194 of the SE facade to show that the theoretical radiation of the SE facade falls within the envelope of all maximum theoretical values in aggregate curve 192. As shown, the theoretical solar radiation of the SE façade falls within the envelope of all maximum theoretical values of aggregate curve 192.

FIG. 7C illustrates that if a combi-sensor value from the aggregate curve 192 is used as input to Module C, all façades have predicted clear sky solar radiation lower than the theoretical values in the aggregate curve 192. Similarly, if a combi-sensor value from the aggregate curve 190 is used as input to Module C, all façades are actually experiencing solar radiation at or lower than the highest physical sensor value.

Using the illustrated example shown in FIG. 7C, a combi-sensor value from the aggregate curve 190 can be used as input to Module C for the SE facing facade. The graph shows three regions 195, 196, and 197, generally associated with morning, afternoon, and evening. In the morning region 195, the combi-sensor values from aggregate curve 190 are higher than the theoretical SE facade value. Since Module C can only lighten, the higher combi-sensor values do not override the Module A and B tinting decision based on the theoretical radiation of the SE facing facade. In the afternoon region 196, the combi-sensor values from aggregate curve 192 are lower than the theoretical SE facade value. Here, Module C would lighten based on the combi-sensor value. In the evening region 197, the combi-sensor values from aggregate curve 190 are higher than the theoretical SE facade value. Since Module C can only lighten, the higher combi-sensor value does not override the Module A and B tinting decision, which would have already maximally cleared the window in the early evening.

Method 2—Average Value Method

The second method determines a combi-sensor value at a given time by averaging the readings taken by all the physical sensors at that time. This second method tends to soften the curve of the combi-sensor values and reduce the bounce. In this method, however, the magnitudes of the average combi-sensor values may be lower than a single physical sensor reading. Since the combi-sensor value may be much lower, tuning these combi-sensor values before inputting them into a control module may be desired. The difference in magnitude between an average combi-sensor value and a single physical sensor reading may be more pronounced as the number of physical sensors is increased, in certain circumstances. That is, the higher the number of physical sensors, the lower the average value in these cases. Tuning (scaling) to adjust the combi-sensor values can be used to get the aggregate values (output) back to realistic levels. That is, the combi-sensor values may be multiplied by a scaling factor such as 1.05, 1.1, 1.2, 1.3, 1.4, 1.5, etc. when using the average value method.

Method 3—Additive Method

In this third method, the combi-sensor value is determined by summing the readings at any given time from all the physical sensors. This method results in the highest magnitude combi-sensor value of the three methods. As with the average method, this third method may require tuning to return the relative magnitudes back to realistic output e.g. by using a scaling factor. That is, the combi-sensor values may be multiplied by a scaling factor such as 0.95, 0.9, 0.85, 0.8, 0.75, 0.7, 0.65, 0.6, 0.55, 0.50, etc. when using the average value method. In the additive method, the higher the number of physical sensors, the higher the aggregate value.

Figure 8A:
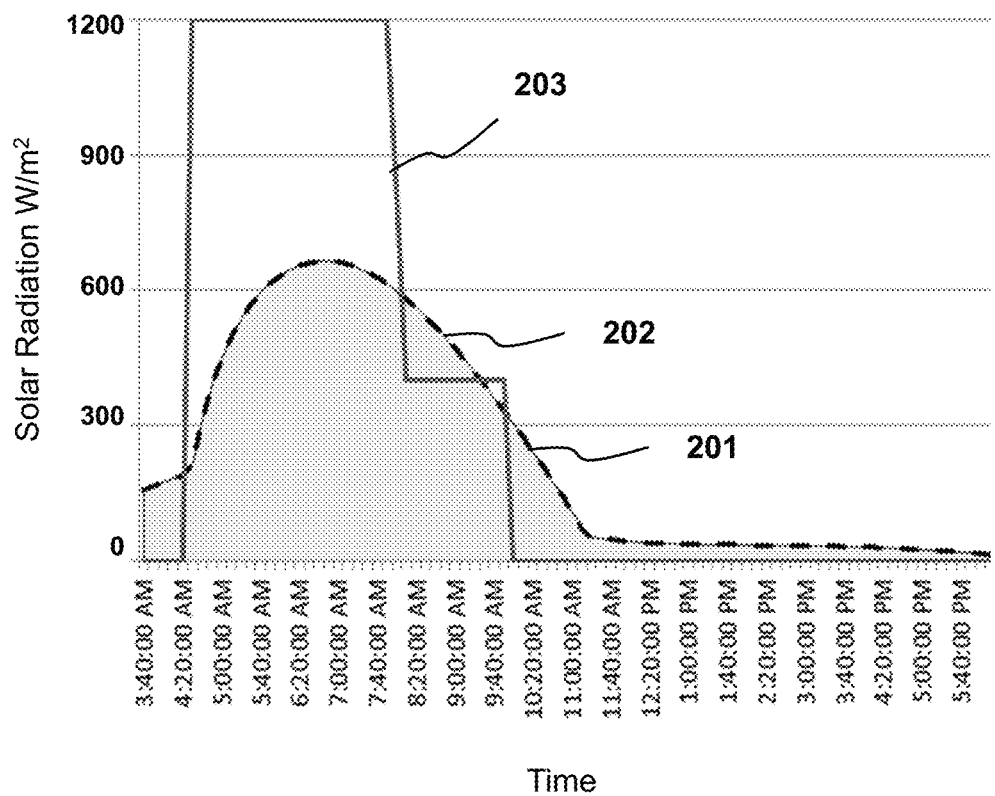
FIG. 8A depicts a graph including a solar radiation profile (dotted line) based on clear sky predictions of solar radiation on a sunny day on a facade-aligned sensor, according to an embodiment.

FIG. 8A is a graph including a solar radiation profile 201 (dotted line) based on clear sky predictions of solar radiation on a sunny day on a facade-aligned sensor, according to an embodiment. The graph also includes a curve 202 of simulated solar radiation readings from a façade-aligned sensor. The graph also includes a curve 203 of returned tint states (levels) from the logic described in Section X, according to an embodiment.

Figure 8B:
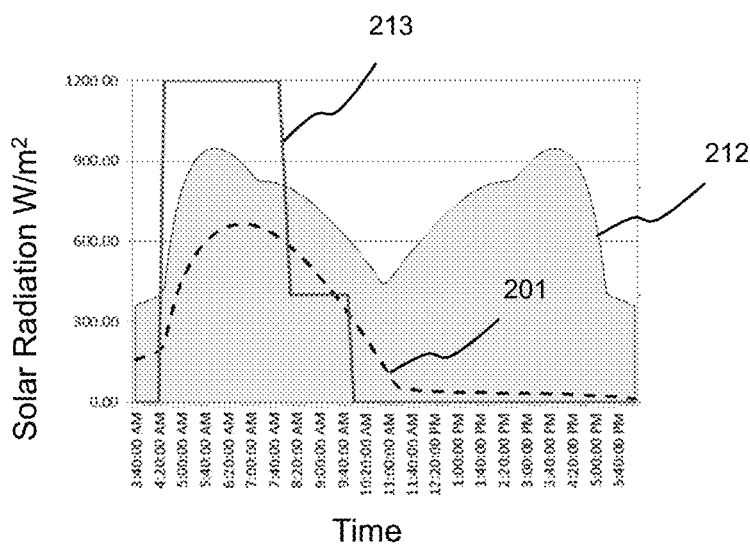
FIG. 8B depicts a graph that includes an aggregate curve of combi-sensor values using the additive method, according to an embodiment.

FIG. 8B is a graph that includes the solar radiation profile 201 (dotted line) of FIG. 8A. The graph also includes an aggregate curve 212 of combi-sensor values using the additive method based on clear sky predictions of solar radiation on a sunny day for a combi-sensor system comprising three orthogonally-directed physical sensors, according to embodiments. The combi-sensor values are based on summing the readings at any given time from the three orthogonally-directed physical sensors. The graph also includes a curve 213 of returned tint states from the logic described in Section X, according to an embodiment.

Figure 8C:
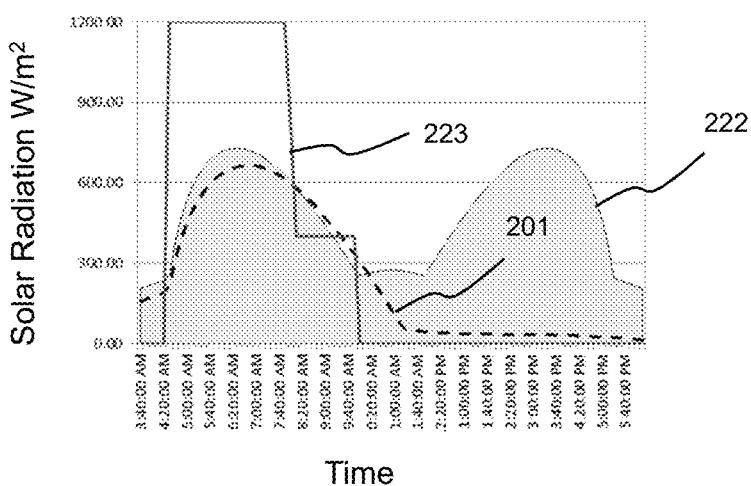
FIG. 8C depicts a graph that includes an aggregate curve of combi-sensor values using the maximum value method, according to an embodiment.

FIG. 8C is a graph that includes the solar radiation profile 201 (dotted line) of FIG. 8A. The graph also includes an aggregate curve 222 of combi-sensor values using the maximum value method based on clear sky predictions of solar radiation on a sunny day for the combi-sensor system with three orthogonally-directed physical sensors discussed with respect to FIG. 8B. The combi-sensor values are based on the maximum reading at any given time from the three orthogonally-directed physical sensors. The graph also includes a curve 223 of returned tint states from the logic described in Section X, according to an embodiment.

Figure 8D:
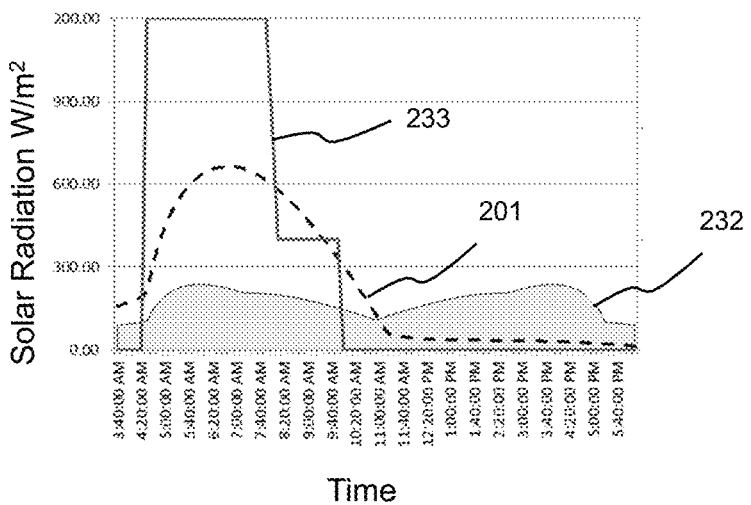
FIG. 8D depicts a graph that includes an aggregate curve of combi-sensor values using the average value method, according to an embodiment.

FIG. 8D is a graph that includes the solar radiation profile 201 (dotted line) of FIG. 8A. The graph also includes an aggregate curve 232 of combi-sensor values using the average value method based on clear sky predictions of solar radiation on a sunny day for the combi-sensor system with three orthogonally-directed physical sensors discussed with respect to FIG. 8B. The combi-sensor values are based on the average value at any given time of the three orthogonally-directed physical sensors. The graph also includes a curve 233 of returned tint states from the logic described in Section X, according to an embodiment.

As discussed above, FIGS. 8B-8D include curves of combi-sensor values (readings) based on a combining physical sensor readings from a combi-sensor system with three orthogonally-directed physical sensors taken on a sunny day, according to an embodiment. The three curves 212, 222, and 232 were determined based on the three methods: 1) taking the maximum value of the physical sensor values (Maximum Value Method), 2) averaging the physical sensor values (Average Value Method), and 3) summing the sensor values (Additive Value Method), respectively.

The average value method of determining an aggregate curve has the lowest combi-sensor values of the three methods generally. In the morning, the average value method has combi-sensor values that are lower than the values of the theoretical solar radiation profile 201. In evening, the average value method has combi-sensor values that are higher than the values of the theoretical solar radiation profile 201. As shown, the additive (summing) method has the highest combi-sensor values of the three methods and has higher combi-sensor values than the values of the theoretical solar radiation profile 201 throughout day. The maximum value method has combi-sensor values closest to the theoretical solar radiation profile 201 in the morning and has combi-sensor values that are higher than the values of the theoretical solar radiation profile 201 in the evening.

In some embodiments, certain determinations in the control logic may be adjusted based on the type of combination method used to determine the combi-sensor value. For example, the threshold value used by Module C in the logic described in Section X may be adjusted based on the technique and method used to determine the combi-sensor value. In this example, the threshold value determines the actual irradiance level outside that determines whether it is a cloudy condition i.e. below this threshold value, it is determined that it is a cloudy day and Module C may decrease the tint level accordingly overriding Module A/B. In this example, the threshold value may be proportionally increased if being compared to a combi-sensor value determined with the additive sensor method or proportionally decreased if being compared to a combi-sensor value determined with the average sensor method. Combi-sensor systems can use one, two or all three of the combination methods to provide a combi-sensor value for a given façade for a given time of day to approximate as closely as possible the actual irradiance on that façade and therefore apply tinting algorithms, e.g. Intelligence™ modules, appropriately.

As mentioned above, FIGS. 8A-8D include curves 203, 213, 223, and 233 of tint states returned by the logic described in Section X for an electrochromic window based on the combi-sensor values of the curves 212, 222, and 232 and values in the theoretical solar radiation profile 201 respectively. The values in 212, 222, 232, and 202 are based on a sunny day. Since in this example, since Module C only lightens (overrides tint commands or does nothing), Module A and B would not be overridden by Module C in the evening and thus would return a low tint state based on predicted low irradiance on this facade. Sunny day performance of tinting Modules is not compromised by any of the methods, however, the combi-sensor value based on average value is relatively low (as compared to additive) and the threshold value may be proportionally decreased and the combi-sensor value based on additive value is relatively high (as compared to average) and the threshold value may be proportionally increased.

Figure 9:
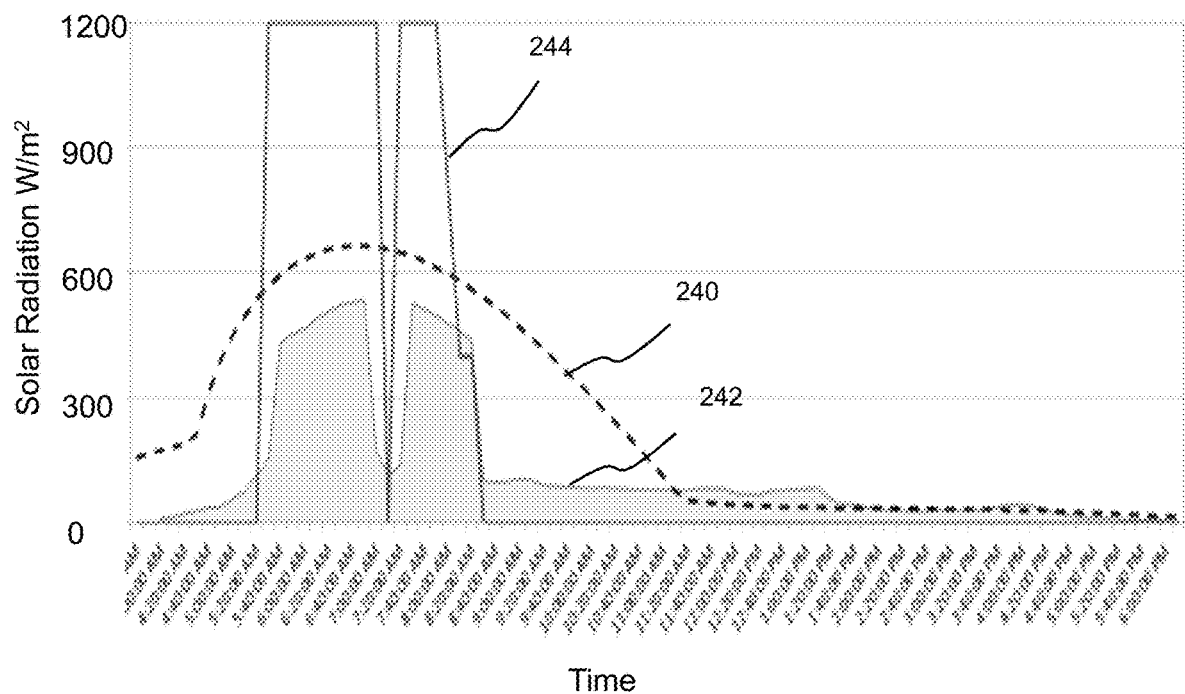
FIG. 9 depicts a graph including theoretical solar radiation readings (dotted line) and simulated solar radiation readings on a cloudy day from a facade-aligned sensor, according to an embodiment.

FIG. 9 is a graph including theoretical solar radiation readings 240 (dotted line) based on clear sky predictions of solar radiation on a facade-aligned sensor. The graph also includes simulated solar radiation readings 242 on a cloudy day from a facade-aligned sensor. The graph also includes a curve 244 of returned tint states from the logic described in Section X based on the simulated solar radiation readings 242.

Figure 10A:
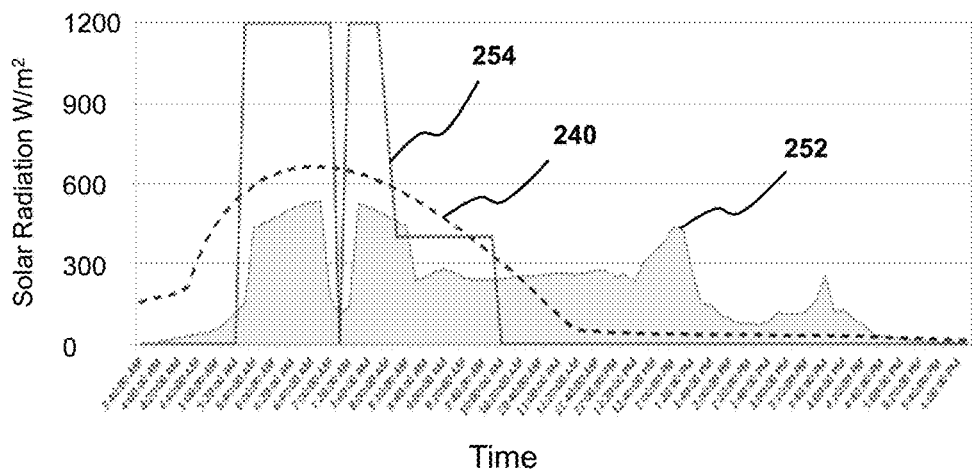
FIG. 10A depicts a graph that includes an aggregate curve of combi-sensor values using the maximum value method, according to an embodiment.

FIG. 10A is a graph that includes the solar radiation profile 240 (dotted line) of FIG. 9 from a facade-aligned sensor. The graph also includes an aggregate curve 252 of combi-sensor values using the maximum value method based on actual solar radiation readings on a cloudy day for a combi-sensor system comprising three orthogonally-directed physical sensors, according to embodiments. The combi-sensor values are based on the maximum reading at any given time from the three orthogonally-directed physical sensors. The graph also includes a curve 254 of returned tint states from the logic described in Section X, according to an embodiment.

Figure 10B:
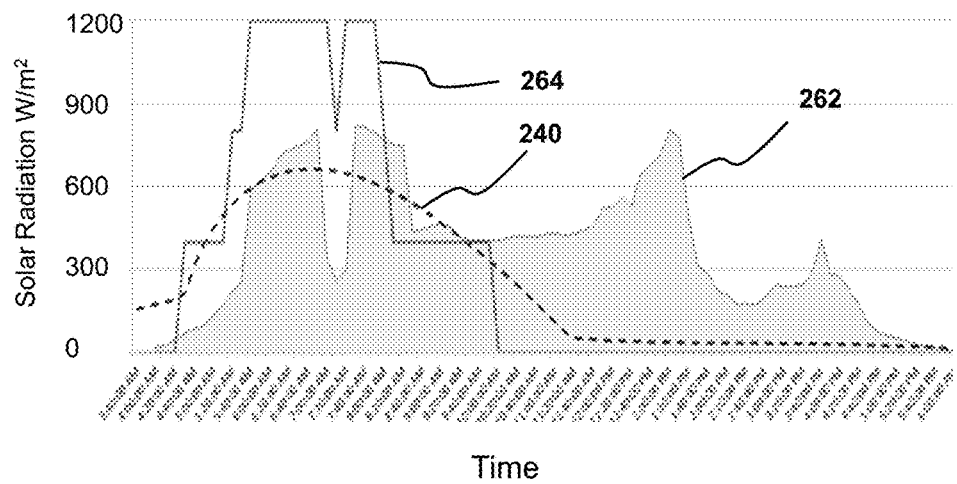
FIG. 10B depicts a graph that includes an aggregate curve of combi-sensor values using the additive value method, according to an embodiment.

FIG. 10B is a graph that includes the solar radiation profile 240 (dotted line) of FIG. 9 on a cloudy day from a facade-aligned sensor. The graph also includes an aggregate curve 262 of combi-sensor values using the additive method based on actual solar radiation readings on a cloudy day for a combi-sensor system comprising three orthogonally-directed physical sensors, according to embodiments. The combi-sensor values are based on summing the readings at any given time from the three orthogonally-directed physical sensors. The graph also includes a curve 264 of returned tint states from the logic described in Section X, according to an embodiment.

Figure 10C:
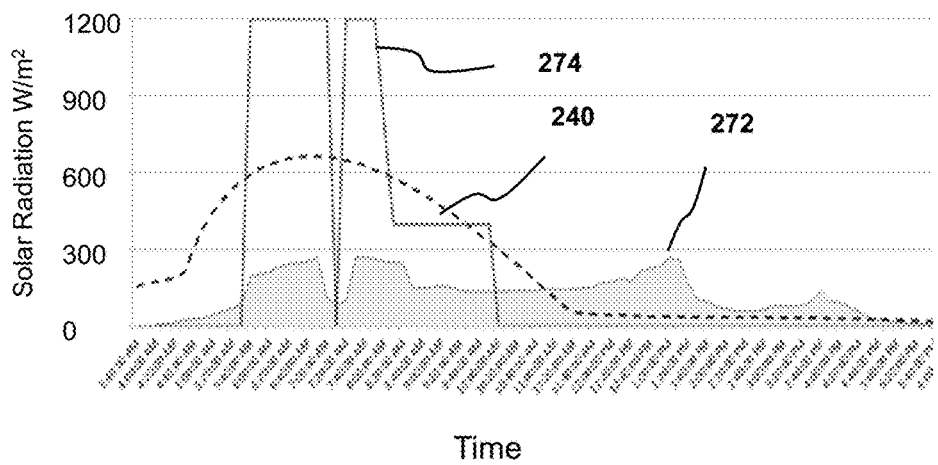
FIG. 10C depicts a graph that includes an aggregate curve of combi-sensor values using the average value method, according to an embodiment.

FIG. 10C is a graph that includes the solar radiation profile 240 (dotted line) of FIG. 9 on a cloudy day from a facade-aligned sensor. The graph also includes an aggregate curve 272 of combi-sensor values using the additive method based on actual solar radiation readings on a cloudy day for a combi-sensor system comprising three orthogonally-directed physical sensors, according to embodiments. The combi-sensor values are based on an average of the readings at any given time from the three orthogonally-directed physical sensors. The graph also includes a curve 274 of returned tint states from the logic described in Section X, according to an embodiment.

FIGS. 10A-10C have graphs including the aggregate curves 252, 262, and 272 of combi-sensor values determined using simulated readings for a cloudy day from three physical sensors of a combi-sensor system, according to an embodiment. The combi-sensor values of the aggregate curves 252, 262, and 272 were determined based on the three methods: 1) maximum values of three physical sensor values, 2) averaging the sensor values, and 3) summing the sensor values, respectively. The aggregate curves 3520, 3620, and 3720 are based on readings from three orthogonally-directed physical sensors on a cloudy day. In addition, each graph has a tint state of an electrochromic window that would be returned by a control system based on the combi-sensor values (bottom graphs) or the theoretical solar radiation profile (top). When comparing the methods in this example, the maximum value method retains tail values into the afternoon. Using the maximum value method, an EC window tinting method as described in Section X, would remain tinted longer due to the higher tail values. Module C performance mirrors sensor when active. In the additive sensor method, tinting would be biased to a darker tint state. In the average sensor method, though only 20 minutes difference from facade-aligned, this method biases to a clearer state. Combi-sensor systems may include operations that select the appropriate combination of methods to mimic solar exposure at facades having no physical sensor.

Although combi-sensor systems are not limited to the example of being used as input to a control system for electrochromic windows, according to this example the maximum value method generates combi-sensor values that perform with Module C closest to in-phase façade sensor readings when in cloudy conditions. The maximum value method improves sunny condition performance in this example as well. That is, the maximum value method performs better as input to Module C than an out-of phase sensor in sunny conditions. An in-phase sensor refers to a physical sensor that faces the same direction as the façade orientation. An out-of-phase sensor refers to a physical sensor that faces a direction that is not aligned to the direction of the façade. An out-of phase sensor is either trailing (i.e. in a direction with an azimuth angle less than the azimuth angle of the façade orientation) or leading (i.e. in a direction with an azimuth angle more than the azimuth angle of the façade orientation). The average value method generates combi-sensor values that perform with Module C better than an out-of-phase sensor. The additive method generates combi-sensor values that perform with Module C better than an out-of-phase sensor. All three methods perform with Module C that same as when using readings from an in-phase sensor.

Technique 2

The second technique uses a vector algorithm to interpolate solar radiation readings taken by two or more physical sensors to a virtual facade-aligned sensor directed at a different azimuth angle. That is, the virtual facade-aligned sensor is typically in a direction that is not aligned to any of the physical sensors at the structure. In one embodiment, the combi-sensor value of the virtual facade-aligned sensor is based on two or more of the physical sensors that are closest in azimuthal position to the virtual facade-aligned sensor. In one embodiment, the combi-sensor value of the virtual facade-aligned sensor is based on all the physical sensors.

Figure 11:
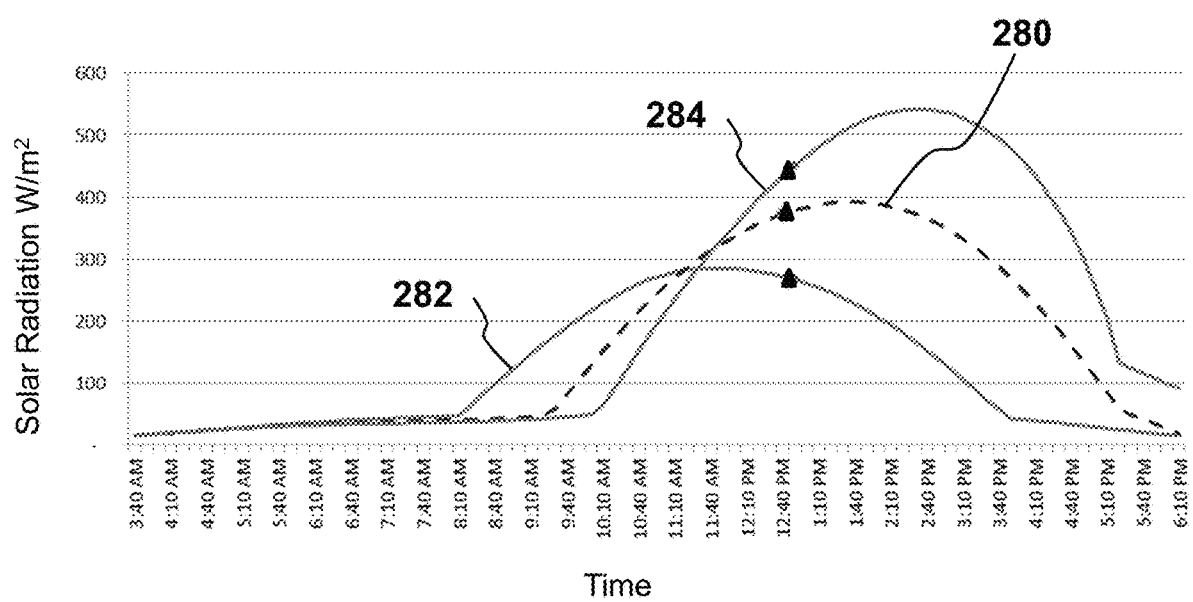
FIG. 11 is an example of a solar radiation curve of an interpolated virtual facade-aligned sensor as interpolated using a vector algorithm from readings taken by a first physical sensor (sensor 1) and readings taken by a second physical sensor (sensor 2) of a combi-sensor system, according to an embodiment.

FIG. 11 is an example of a solar radiation curve 280 of an interpolated virtual facade-aligned sensor as interpolated using a vector algorithm from readings of curve 282 taken by a first physical sensor (sensor 1) and readings of curve 284 taken by a second physical sensor (sensor 2) of a combi-sensor system, according to an embodiment. In this example, first physical sensor readings 282 and the second physical sensor readings 284 are input and used to calculate the solar radiation value at the virtual facade between the physical sensors. In this case, the virtual facade-aligned sensor is directed at an azimuth angle between the azimuth angles of the first and second physical sensors (sensor 1 and sensor 2). The solar radiation value of the virtual façade-facing sensor at each time can be interpolated from the solar radiation values of the first and second physical sensors at the same time. For example, the solar radiation value of the virtual facade-aligned sensor can be calculated as a function of the solar radiation values of the first and second physical sensors at the same time. The graph also shows the readings of the three curves 280, 282, and 284 at 12:40p.m. These markers show that by taking the maximum value of the two out of phase sensors readings, the combi-sensor value is covered between the two.

VI. Misaligned Sensor Examples

In some cases, an installed physical sensor may not be properly aligned to its facade or may become misaligned i.e. not facing a normal direction to the corresponding facade. For example, it may have be improperly installed, may have become misaligned after installation, etc. In one embodiment, the combi-sensor system may determine the actual orientation of a misaligned physical sensor and adjust its readings for use at the corresponding facade orientation and/or for use in determining other combi-sensor values for other facades. To determine the actual orientation of a misaligned sensor, the combi-sensor system could determine the solar radiation profiles (irradiance vs. time) over two or more clear sky days for multiple orientations. The solar radiation profiles can be determined from a solar calculator or from an open-source program such as Radiance. These programs predict clear sky irradiance profiles for many different azimuthal positions. The combi-sensor system can compare the solar radiation profiles for multiple orientations with the sensor output for two or more clear sky days. The combi-sensor system could determine the best matching solar radiation profile to determine the actual orientation to the sensor. Once the actual orientation of the sensor is determined, the readings from this incorrectly oriented sensor can be used to determine a combi-sensor value for a virtual facade-aligned sensor in the orientation of the corresponding facade with the misaligned sensor and for a virtual sensor in the orientation of other facades not having physical sensors.

In one embodiment, a virtual sensor is directed azimuthally with the wall/facade on which the misaligned sensor is mounted. The adjustment is accomplished by time shifting the misaligned sensor's output to correspond with the azimuthal position of the wall/facade. In other words, by using the actual position of the sun at a given time, one can apply a time shift factor to the misaligned sensor so that its output corresponds with the solar irradiance actually experienced on the façade. For example if the sensor is not orthogonal (facing directly outward as intended) from a façade, but rather at an angle which would allow the sensor to read solar irradiance levels that will be encountered by that façade in 10 minutes. Then a 10 minute time shift is applied to the sensor's output, for example, the façade's solar irradiance experienced is known 10 minutes prior to the façade actually being exposed to that level of irradiance. So, sensor inputs are read 10 minutes prior to the sun actually impinging directly (orthogonally) on the façade, since the sun is impinging directly on the sensor at that time.

VII. Combi-Sensor Methods

In general operation, the combi-sensor methods determine a combi-sensor value for each facade (or facet thereof) or for a representative facade of a zone of facades of a building. The combi-sensor value may be determined using either Technique 1 (any of the three methods) or by using Technique 2, as described in detail above. The combi-sensor value can be used as input to a one or more building control systems. For example, this combi-sensor method can be used to determine a combi-sensor value at each facade having an electrochromic window or other controllable component. The combi-sensor value can then be used by the control system to adjust the controllable component such as, for example, transitioning tint state (e.g., increasing tint, clearing, etc.) of an electrochromic window. This is the equivalent to having a "virtual" sensor on facades where no physical sensor is deployed.

In some embodiments, a combi-sensor value may be used as input to Module C described in Section X. In the case of a facade having an electrochromic window, the combi-sensor value can be used as input to Module C to determine whether to decrease tint in the electrochromic window based on whether the combi-sensor value is less than a certain value such as, for example, the theoretical clear sky irradiance. In some cases, a combi-sensor value for a representative window of a zone of electrochromic windows can be used to control the electrochromic windows in that zone of the building. Although control of electrochromic windows is described in many examples herein, other building systems may be controlled using combi-sensor values such as HVAC systems. For example, by knowing the solar irradiance on any given façade, the heat load can be managed by increasing or decreasing air conditioning on various interior sides of the building.

In embodiments that use Technique 2 to determine the combi-sensor value, the combi-sensor method may determine the two closest physical sensors to the facade. First, solar radiation readings from three or more physical sensors in the combi-sensor system are determined for clear sky day(s). In some cases, the physical sensors may take solar radiation readings for two or more clear sky days to generate "clear sky" solar radiation profiles associated with the directions of the physical sensors. A solar calculator or from an open-source program such as Radiance may be used to determine expected, theoretical solar radiation profiles for clear sky days. These programs can generate the theoretical "clear sky" profiles for different azimuthal positions. The actual daily solar radiation profiles (irradiance vs. time) from readings taken by the physical sensor(s) over two or more clear sky days can be compared to the expected theoretical output from the programs. The theoretical clear sky radiation profile from the program(s) that best agrees with the actual physical sensor solar radiation profile provides the actual azimuthal position of the physical sensor. The actual azimuthal position of the physical sensor(s) may be compared with the azimuthal position of the facade (e.g., provided in a lookup table) to determine any degree of misalignment of the facade with one of the physical sensors. This may be repeated for all the physical sensors in the combi-sensor system. This comparison can be also used to determine which two physical sensors are closest to the facade and azimuthally contain the facade. The closest physical sensor to the facade may be determined by comparing the actual azimuthal position of the physical sensors with the azimuthal position of the facade. The closest physical sensor has the smallest difference in azimuthal position from the facade.

VIII. Virtual FaçAde-Aligned Sensor Values Used as Input to Building Control Systems As discussed herein, combi-sensor values for facades may be used as input into building control systems such as thermal/comfort management systems. An example of such a building system that controls electrochromic windows is described in Section X. If used with logic described in Section X, the combi-sensor values may be input into Module C for a specific window/zone.

FIGS. 12A-12F illustrate the impacts of different sensor out of phase misalignments on a building management system for controlling electrochromic windows as described in Section X, according to embodiments. The impacts on the building management system show the effects of different degrees of misalignment (either trailing or leading) between a facade and a physical sensor. Misalignments could cause improper tinting of the window that could be noticeable to the occupants. In this case, a combi-sensor value determined by Technique 1 or Technique 2 may be used to avoid improper tinting.

Figure 12A:
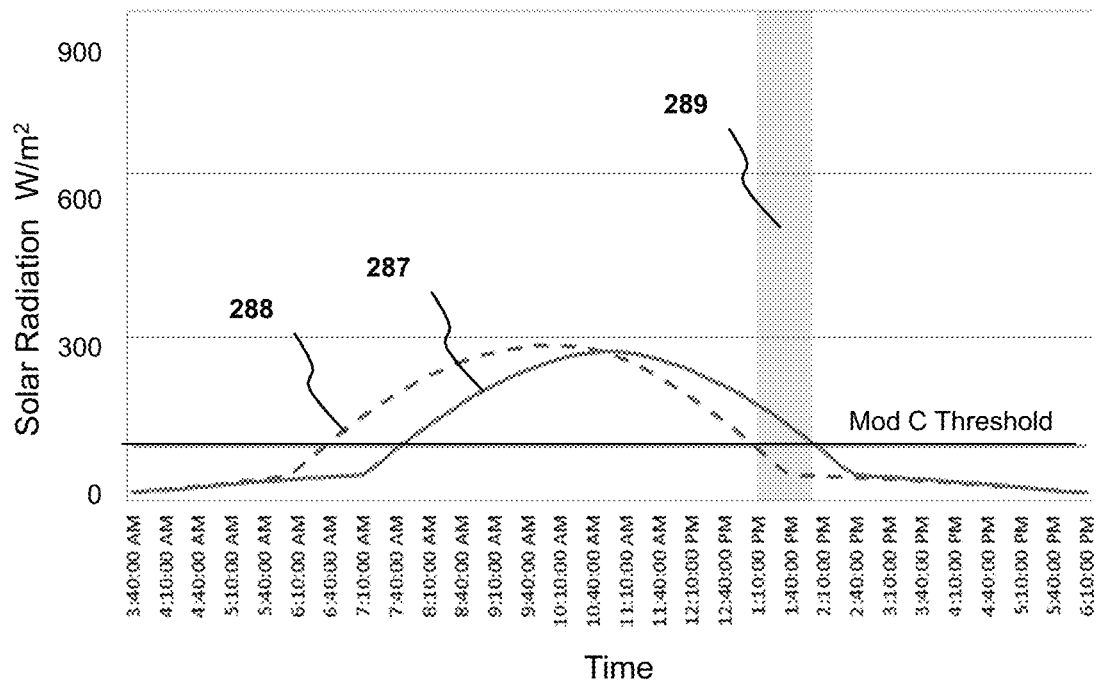
FIG. 12A shows an example of the impact of out-of-phase sensors which are trailing the facade, according to embodiments.
Figure 12A:
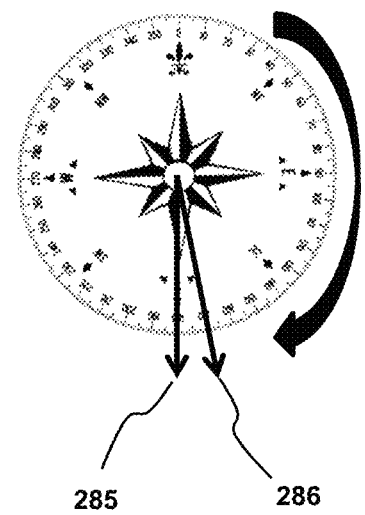
Figure 12B:
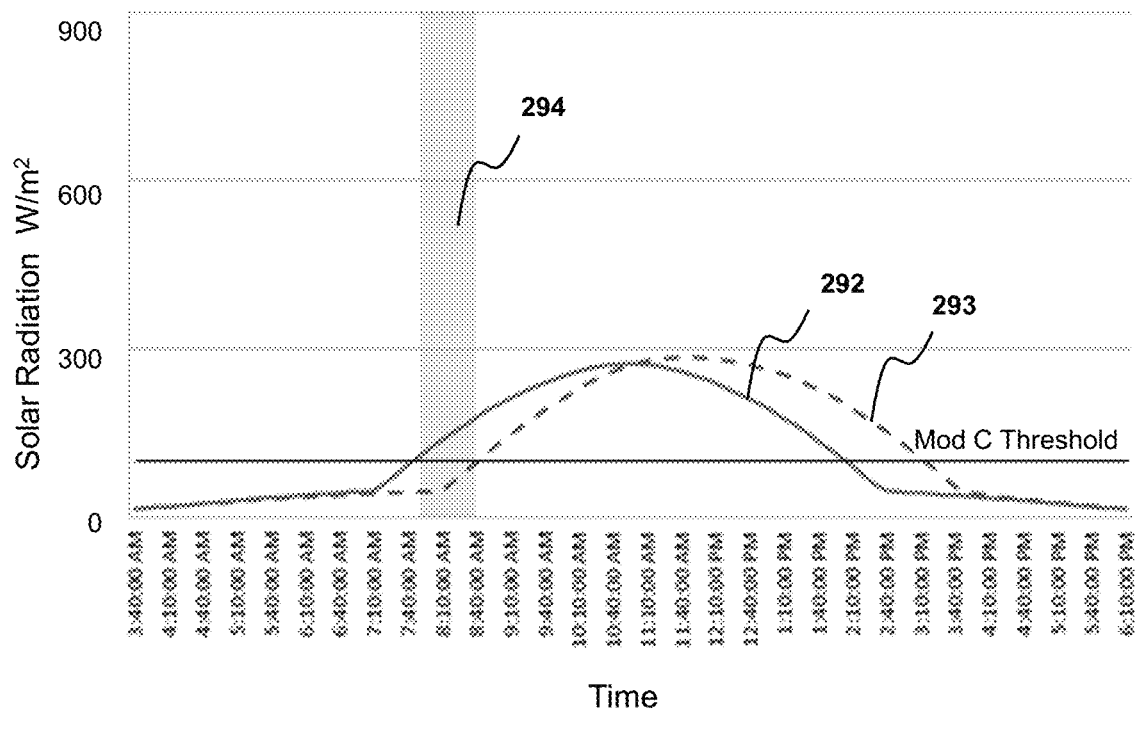
FIG. 12B shows an example of the impact of out-of-phase sensors which are leading the facade, according to embodiments.
Figure 12B:
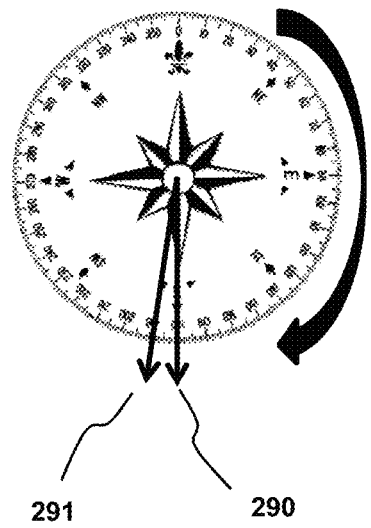

FIG. 12A shows an example of the impact of out-of-phase sensors which are trailing the facade, according to embodiments. FIG. 12B shows an example of the impact of out-of-phase sensors which are leading the facade, according to embodiments.

FIG. 12A includes a graph with a first solar radiation profile 287 of a facade directed at 180 degrees and a second solar radiation profile 288 of readings taken by a physical sensor directed at 170 degrees and trailing the facade by 10 degrees. FIG. 12A also includes a compass showing the first azimuth angle 285 of the façade at 180 degrees and the second azimuth angle 286 of the physical sensor at 170 degrees. As depicted by the clockwise arrow, the physical sensor azimuth angle is trailing the façade so that the sun reaches the physical sensor before the façade. Due to this 10 degree misalignment of the physical sensor trailing the façade, the façade is exposed to solar radiation greater than the Module C threshold for 50 minutes before the physical sensor measures radiation greater than the threshold. In the graph shown in FIG. 12A, there is a shaded region 289 from about 1:00 pm to 1:50 pm during which Module C overrides tint commands (thus clears the windows) for 50 minutes due to misalignment. This is because the sensor reading indicates the solar irradiance is diminished to low levels where Module C should override tint values—50 minutes before the solar exposure on the façade actually diminishes.

FIG. 12B includes a graph with a first solar radiation profile 292 of a facade at 180 degrees and a second solar radiation profile 293 of readings taken by a physical sensor directed at 190 degrees and leading the facade by 10 degrees. FIG. 12B also includes a compass showing the first azimuth angle 290 of the façade at 180 degrees and the second azimuth angle 291 of the physical sensor at 190 degrees. As depicted by the clockwise arrow, the physical sensor azimuth angle is leading the façade so that the sun reaches the façade before the physical sensor. In the graph shown in FIG. 12B, there is a shaded region 294 from about 7:50 a.m. to 8:40 a.m. during which Module C overrides for 50 minutes due to misalignment. In this example, the sensor reads lower solar irradiance levels for 50 minutes after the façade has already experienced higher solar irradiance levels. Based on these examples, it was found that that on average during the year if the physical sensor is misaligned from the facade by 10 degrees, there could be a time of roughly 50 minutes where the electrochromic window would be erroneously cleared.

Figure 12C:
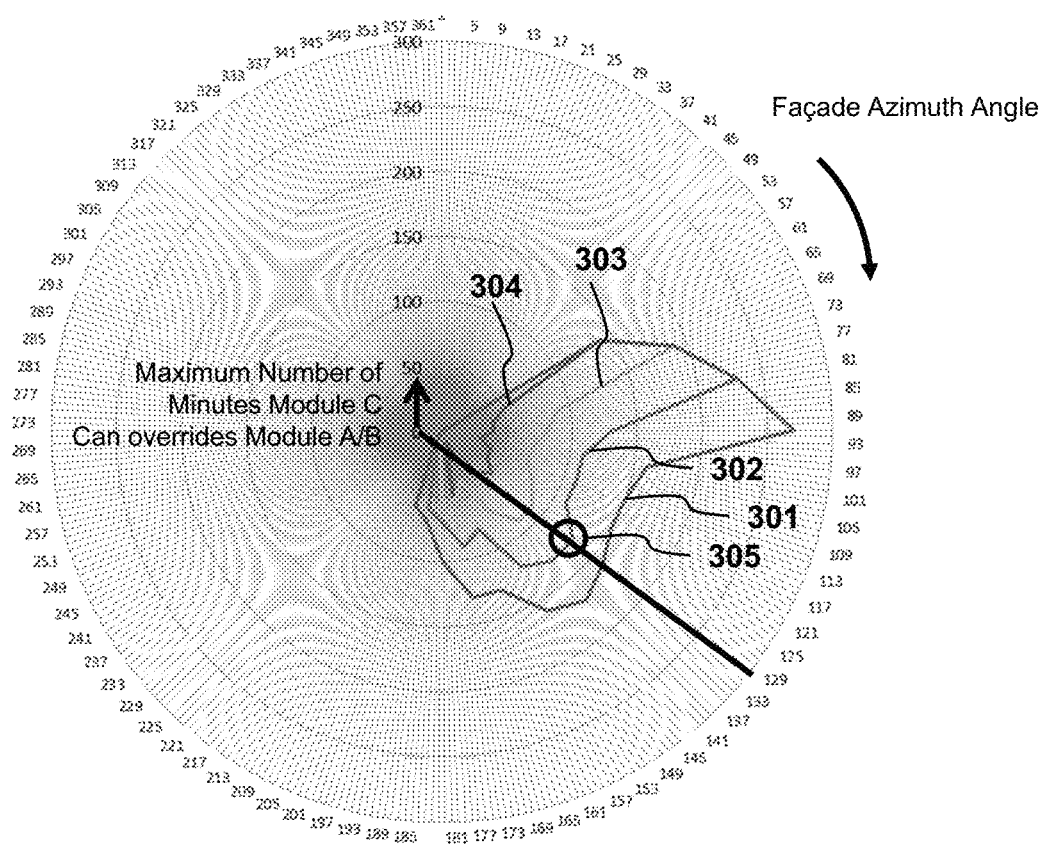
FIG. 12C include a phase diagram for physical sensors leading the facade during the winter solstice times, according to embodiments.
Figure 12D:
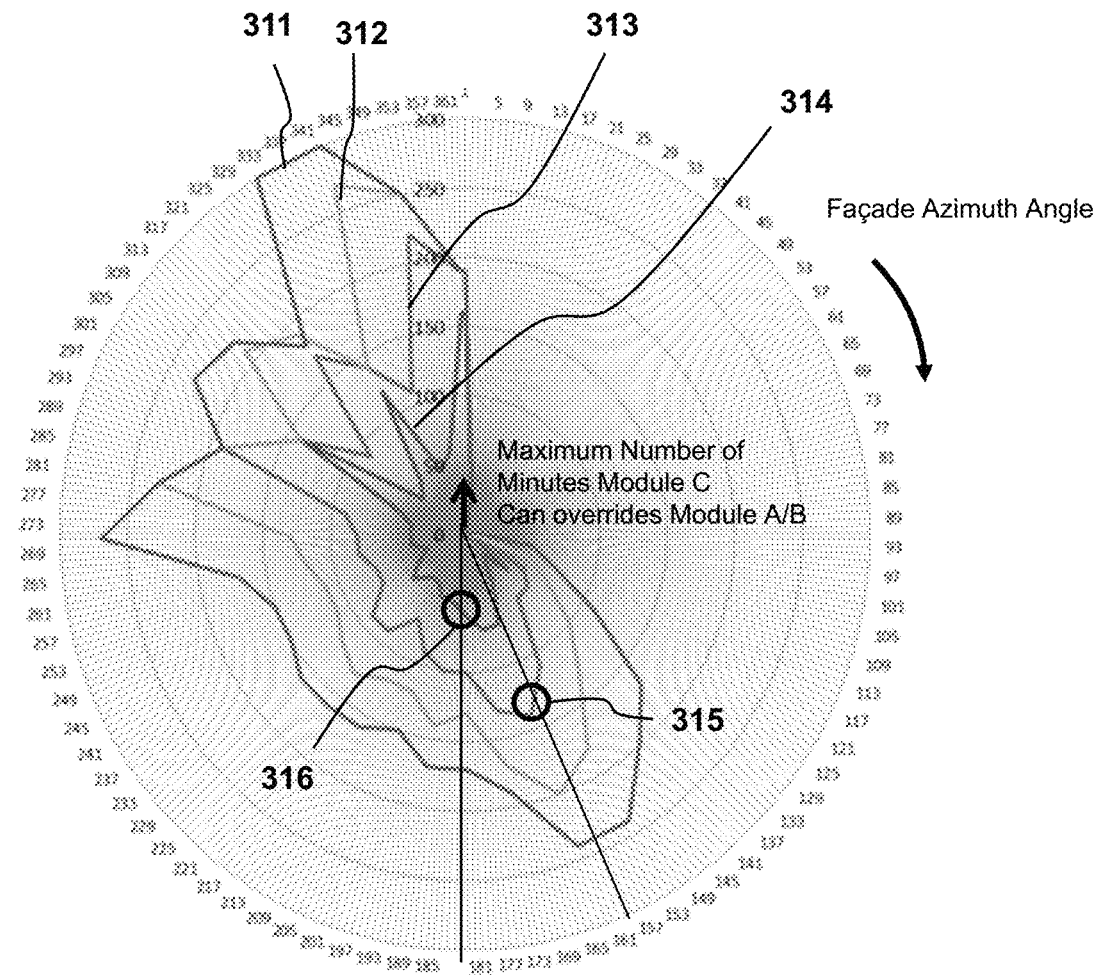
FIG. 12D is a phase diagram illustrating the yearly maximum impact of out-of-phase sensors leading the facade, according to embodiments.
Figure 12E:
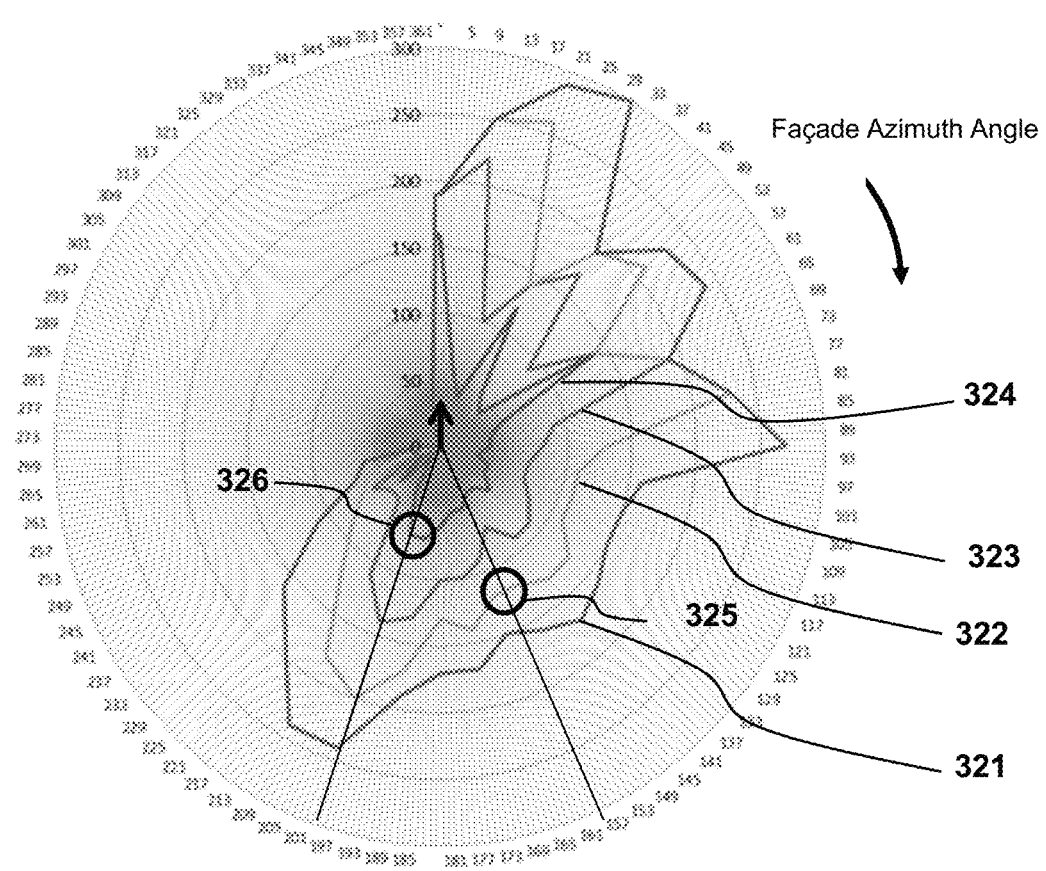
FIG. 12E is a phase diagram illustrating the yearly maximum impact of out-of-phase sensors trailing the facade, according to embodiments.

FIGS. 12C-12E each include phase diagrams for illustrating the maximum number of minutes Module C can override Module A/B based on the time of year, façade azimuth angle, and azimuth angle of the out-of-phase physical sensor, according to certain embodiments. The circumferential axis is in terms of number of degrees that the physical sensor is out-of-phase with the façade orientation. The radial axis is the maximum number of minutes Module C would erroneously override Module A/B incorrectly due to the misalignment of the physical sensor not reading correctly the solar irradiation impinging directly on the façade. That is, due to its misalignment, would read direct solar exposure during a period of time before or after the façade experiences the direct solar exposure. During these time periods, or shifts, Module C would erroneously override or override incorrectly, due to incorrect photosensor input as a result of the misalignment. Each phase diagram is for a specific time of year.

FIG. 12C is a phase diagram for physical sensors leading the facade during the winter solstice times, according to embodiments. The phase diagram illustrates the maximum number of minutes Module C can erroneously override Module A/B when using an out of phase physical sensor that is trailing the façade during the winter solstice. The phase diagram shows a first curve 301 for a physical sensor trailing the façade by 40 degrees, a second curve 302 for a physical sensor trailing the façade by 30 degrees, a third curve 303 for a physical sensor trailing the façade by 20 degrees, and a fourth curve 304 for a physical sensor trailing the façade by 10 degrees. A line is drawn to show the intersection 305 of the second curve 302 for a physical sensor trailing a façade at 130 degrees by 30 degrees. The phase diagram in FIG. 12C specifically illustrates that when a window has an azimuth angle of 130 degrees and there is a physical sensor trailing by 30 degrees, the physical sensor measures readings that are offset in time (time shifted) by 125 minutes. In this case, Module C could erroneously override Modules A/B during a 125 minute period during the winter solstice if the sensor is misaligned (out of phase) by 30 degrees. Thus the phase diagram may be used in combi-sensor systems to calculate time shifts necessary to compensate for out of phase sensors and provide correct solar irradiation data to, for example, smart window control algorithms.

FIG. 12D is a phase diagram illustrating the yearly maximum impact of out-of-phase sensors leading the facade, according to embodiments. The phase diagram shows a first curve 311 for a physical sensor leading the façade by 40 degrees, a second curve 312 for a physical sensor leading the façade by 30 degrees, a third curve 313 for a physical sensor leading the façade by 20 degrees, and a fourth curve 314 for a physical sensor leading the façade by 10 degrees. A first line is drawn to show the intersection 315 of the third curve 313 for a physical sensor directed at 180 degrees leading a façade at 160 degrees by 30 degrees. This illustrates that for a window having an azimuth angle of 160 degrees and with a physical sensor leading by 20 degrees, the physical sensor measures readings that are offset in time (time shifted, and therefore not reading solar irradiation that is actually hitting the façade directly) by about 140 minutes. In this case, Module C could erroneously override Modules A/B for 140 minutes at some time during the year if the sensor is misaligned by 20 degrees. A second line is drawn to show the intersection 316 of the fourth curve 314 for a physical sensor directed at 190 degrees leading a façade at 180 degrees by 10 degrees. This illustrates that for a window having an azimuth angle of 180 degrees and with a physical sensor leading by 10 degrees, the physical sensor measures readings that are offset in time (time shifted) by about 50 minutes. In this case, Module C could erroneously override Modules A/B during this 50 minute window.

FIG. 12E is a phase diagram illustrating the yearly maximum impact of an out of phase sensor trailing the façade, according to an embodiment. The phase diagram shows a first curve 321 for a physical sensor trailing the façade by 40 degrees, a second curve 322 for a physical sensor trailing the façade by 30 degrees, a third curve 323 for a physical sensor trailing the façade by 20 degrees, and a fourth curve 324 for a physical sensor trailing the façade by 10 degrees. A first line is drawn to show the intersection 325 of the second curve 322 for a physical sensor directed at 130 degrees trailing a façade at 160 degrees by 30 degrees. This illustrates that for a window having an azimuth angle of 160 degrees and with a physical sensor leading by 30 degrees, the physical sensor measures readings that are offset in time (time shifted) by about 130 minutes. In this case, Module C could erroneously override Modules A/B during a 130 minute period due to sensor misalignment. A second line is drawn to show the intersection 326 of the fourth curve 324 for a physical sensor directed at 190 degrees trailing a façade at 200 degrees by 10 degrees. This illustrates that for a window having an azimuth angle of 200 degrees and with a physical sensor trailing by 10 degrees, the physical sensor measures readings that are offset in time (time shifted) by about 70 minutes. In this case, Module C could erroneously override Modules A/B during these 70 minutes.

In certain embodiments, a control method that uses combi-sensor values does not prematurely override or erroneously override Module A/B on a sunny day for any window azimuth angle. A phase diagram of the yearly maximum impact of using a combi-sensor value based on the maximum approach method has a single point at the center showing that the combi-sensor value does not override Module A/B prematurely. In the associated system, the combi-sensor system has three physical sensors facing East, South and West.

Figure 13A:
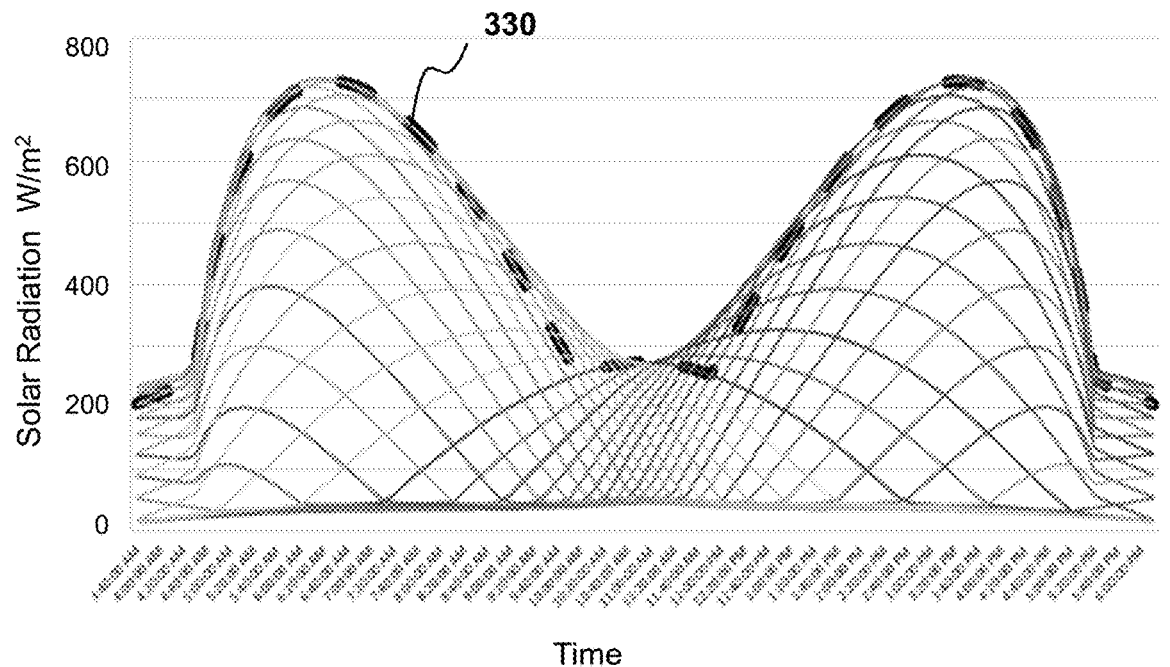
FIG. 13A is a graph with the theoretical solar radiation profiles for different façade orientations (every 10 degrees) during summer solstice and with the combi-sensor values for a combi-sensor system, according to an embodiment.
Figure 13B:
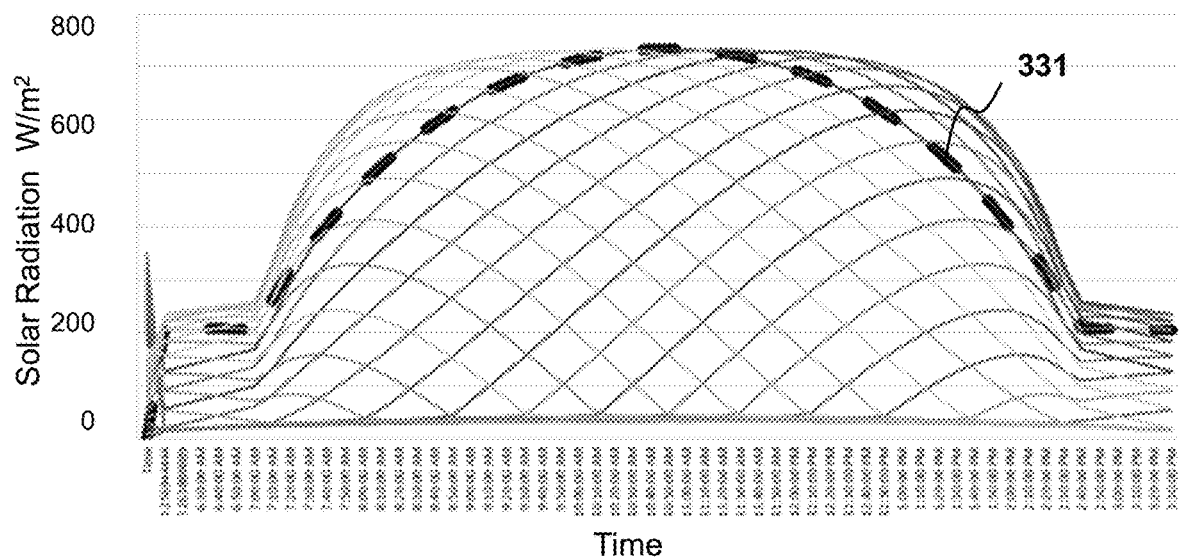
FIG. 13B is a graph with the theoretical solar radiation profiles for different façade orientations (every 10 degrees) during winter solstice and with the combi-sensor values for the combi-sensor system of FIG. 13A, according to an embodiment.

FIG. 13A is a graph having theoretical solar radiation profiles for different façade orientations (every 10 degrees) during summer solstice. The graph in FIG. 13A also includes an aggregate curve 330 of combi-sensor values for a combi-sensor system during summer solstice, according to an embodiment. FIG. 13B is a graph with the theoretical solar radiation profiles for different façade orientations (every 10 degrees) during winter solstice. The graph in FIG. 13B also includes an aggregate curve 331 of combi-sensor values for the combi-sensor system of FIG. 13A during winter solstice, according to an embodiment. In both FIGS. 13A and 13B, the combi-sensor values were determined using the maximum value method based on the theoretical values.

Each of the graphs in FIGS. 13A and 13B include multiple solid lines representing theoretical physical sensor values at facade orientations spaced 10 degrees from each other (0-350). The graph in FIG. 13A also includes an aggregate curve 330 (dashed line) of combi-sensor values which are a combined output of the three physical sensors (East-facing, South-facing, and West-facing) of the combi-sensor system of this embodiment. The combi-sensor values for the aggregate curve 330 in FIG. 13A were determined using the maximum value method. The combi-sensor values for the aggregate curve 331 were based on sensor readings from 12 sensors separated by 30 degrees from each other.

The aggregate curves (dotted line) cover an envelope under the curves. In FIG. 13A, the theoretical values of all the facades any given azimuth angle fall within the envelope under the aggregate curve.

According to the aggregate curves in FIGS. 13A and 13B, all facades at any given azimuth will be above 100 W/m2 at any given time during the day. The peak value of each of the theoretical solar radiation profiles at each azimuthal value is below the combi-sensor value of the aggregate curve at nearly all times of the day. All possible facades will fall within the combi-sensor aggregate envelope meaning that the combi-sensor will not falsely send a value to mod C on a sunny day that it would interpret to be a cloudy day due to misalignment.

IX. Ring Sensor Example

In "ring sensor" embodiments, a combi-sensor system generally comprises a mast and a set of two or more physical sensors (e.g., 12 sensors) mounted to the mast. The physical sensors are facing outward to direct the sensors at distinctly different azimuth angles as discussed in sections above. The mast may be installed at/near the structure. For example, the mast of the ring sensor may be mounted on the top of a building in an unobstructed area. In many cases, the physical sensors may be equally-spaced in a ring arrangement (i.e. at the same radius from a central axis of the mast). For example, a ring sensor may be comprised of twelve (12) equally-spaced physical sensors directed at azimuth angles separated by 30 degrees and at/nearly the same radius from the central axis of the mast.

In ring sensor embodiments, the physical sensors may be mounted directly or indirectly to the mast. In certain aspects, a ring sensor comprises a circular tray mounted to one end of the mast. In these cases, the physical sensors may be located within this circular tray. A protective translucent casing may be provided over the physical sensors.

Figure 14A:
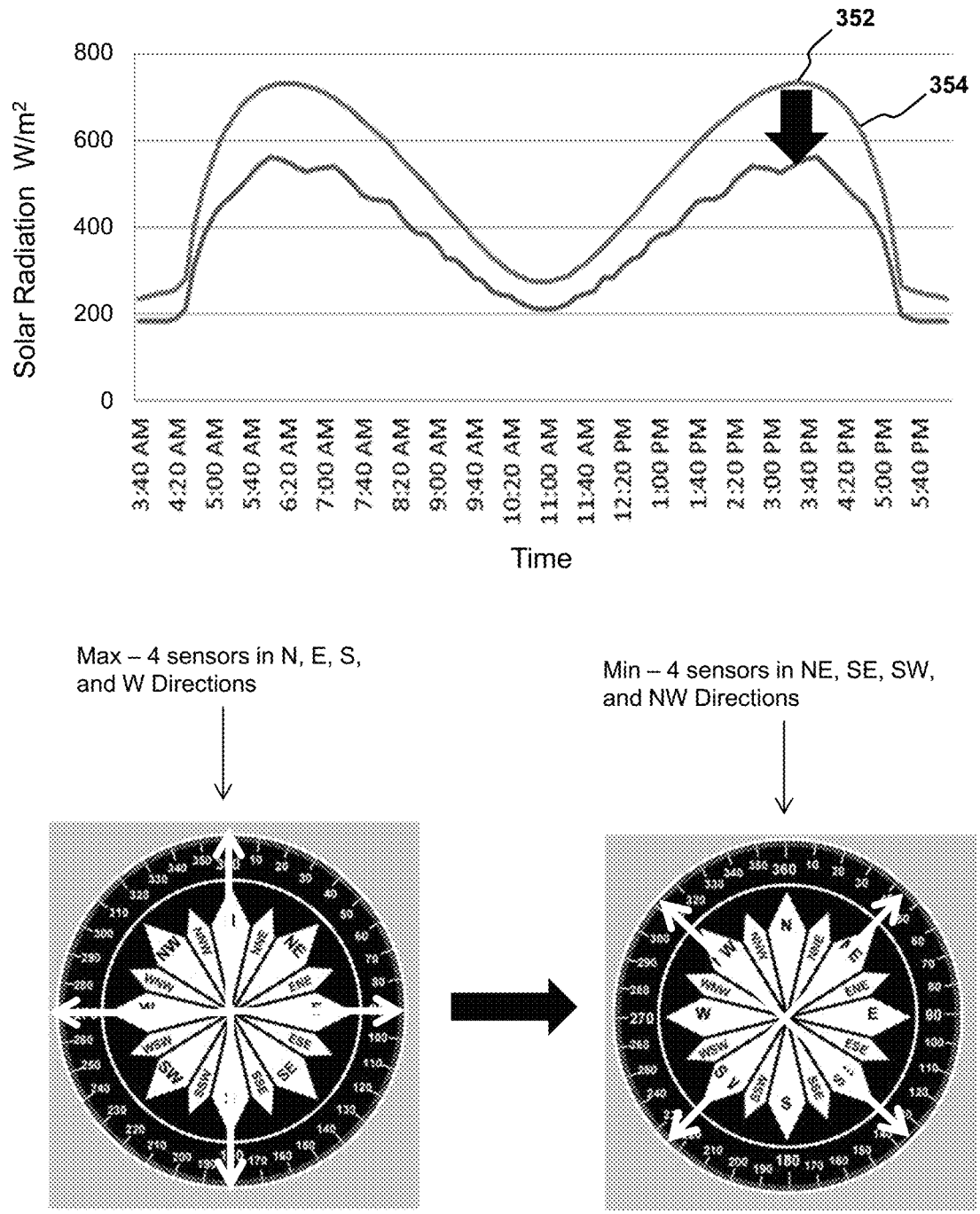
FIG. 14A shows a graph having two aggregate curves of combi-sensor values based on readings from a ring sensor comprising four equally-spaced physical sensors separated by 90 degrees, according to an embodiment.
Figure 14B:
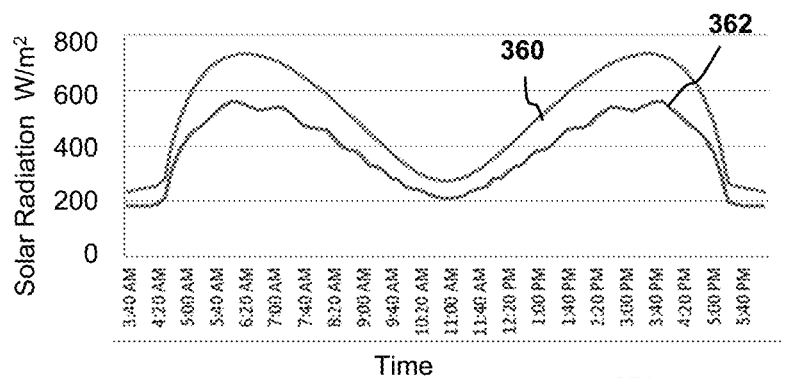
FIGS. 14B-14E are graphs associated with different ring sensor arrangements comprising four (4) physical sensors, eight (8) physical sensors, twelve (12) physical sensors, and eighteen (18) physical sensors respectively, according to embodiments.
Figure 14C:
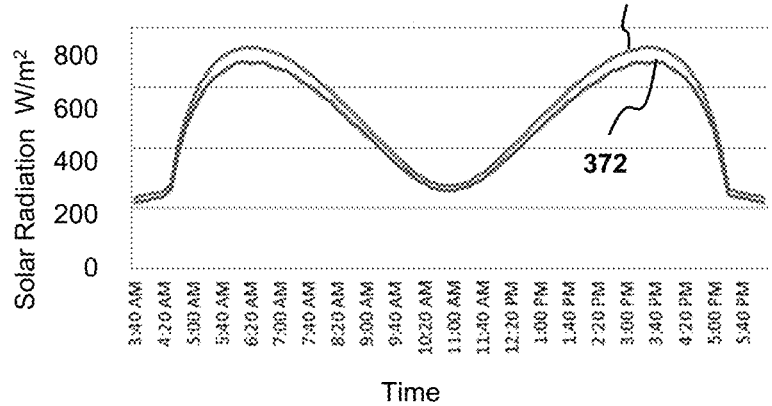
Figure 14D:
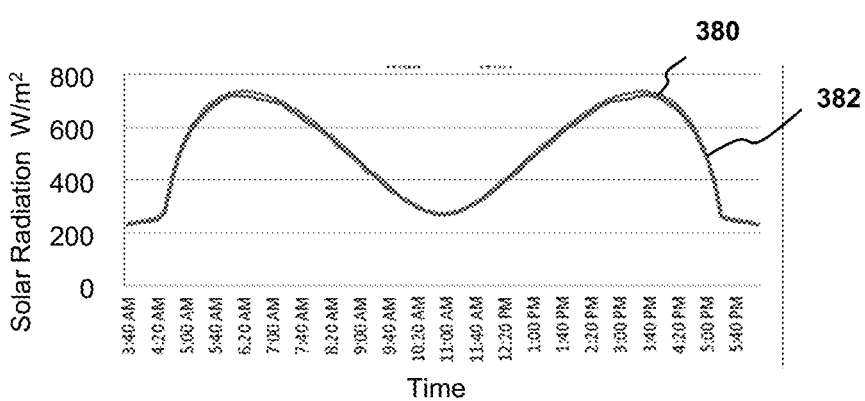
Figure 14E:
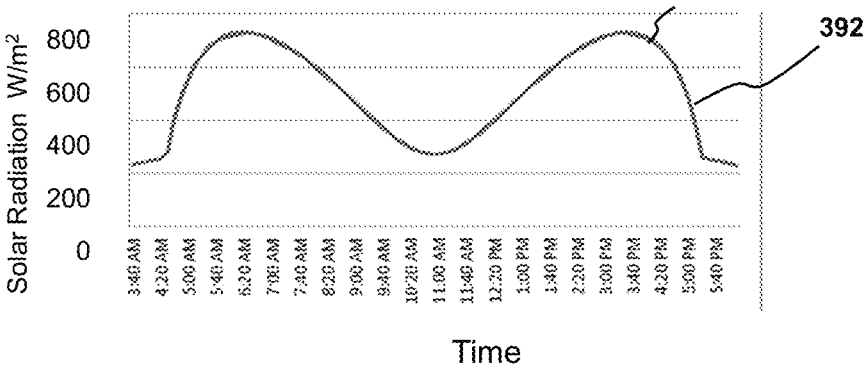

FIG. 14A shows a graph having two aggregate curves 352 and 354 of combi-sensor values based on readings from a ring sensor comprising four equally-spaced physical sensors separated by 90 degrees, according to an embodiment. The combi-sensor values in aggregate curves 352 and 354 are based on the maximum values of the combining readings from the four equally-spaced physical sensors mounted to the mast of the ring sensor of the embodiment. In the first aggregate curve 352, the four equally-spaced physical sensors are directed in the N, E, S, W directions (maximal optimal). At the bottom of FIG. 14A, the left compass shows the N, E, S, W directions of the physical sensors. In the second aggregate curve 354, the four equally-spaced physical sensors are directed in NE, SE, SW, NW directions (minimal optimal). At the bottom of FIG. 14A, the right compass shows the NE, SE, SW, NW directions of the physical sensors after rotation by 45 degrees. That is, the mast of the ring sensor mounted with physical sensors has been rotated by 45 degrees resulting in the combi-sensor values changing from the aggregate curve 352 to the aggregate curve 354. As shown, as the mast of sensors is rotated, the maximum value profile changes. The arrow pointed downward between the aggregate curves 352 and 354 indicates that the combi-sensor values decrease if the mast were to be rotated from N, E, S, and W to NE, SE, SW, and NW directions.

FIGS. 14B-14E are graphs associated with different ring sensor arrangements comprising four (4) physical sensors, eight (8) physical sensors, twelve (12) physical sensors, and eighteen (18) physical sensors respectively, according to embodiments. The ring sensor arrangement with 4 sensors has a 90 degrees spacing between adjacent sensors. The ring sensor arrangement with 8 sensors has a 45 degrees spacing between adjacent sensors. The ring sensor arrangement with 12 sensors has a 30 degrees spacing between adjacent sensors. The ring sensor arrangement with 18 sensors has a 20 degrees spacing between adjacent sensors.

Each of the graphs in FIGS. 14B-14E includes two aggregate curves of combi-sensor values determined using the maximum value method by taking the maximum values of the combined readings from the associated equally-spaced physical sensors. In each of the graphs in FIGS. 14B-14E, the first curve (360, 370, 380, 390) is associated with the equally-spaced physical sensors in the standard arrangement before being rotated (maximal optimal). In each of the graphs in FIGS. 14B-14E, the second curve (362, 372, 382, 392) is associated with equally-spaced physical sensors after rotating the mast (minimal optimal) by half the spacing. As shown, the difference between the aggregate curves becomes negligible for ring sensors having more than 12 sensors with a 30 degree separation between the physical sensors.

Figure 14F:
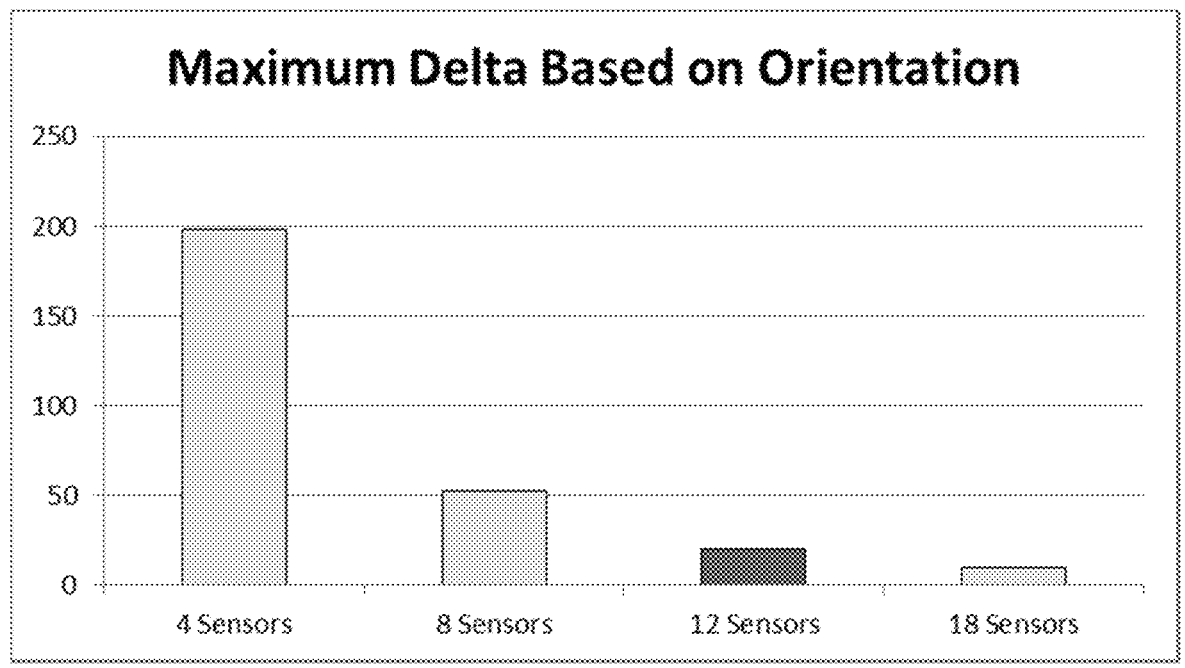
FIG. 14F is a chart of the maximum difference (delta) between the first and second aggregate curves from FIGS. 14B-14E for ring sensors having four (4), eight (8), twelve (12) and eighteen (18) equally spaced physical sensors.

FIG. 14F is a chart of the maximum difference (delta) between the first and second aggregate curves from FIGS. 14B-14E for ring sensors having four (4), eight (8), twelve (12) and eighteen (18) equally spaced physical sensors. As shown, the greater the number of physical sensors in a ring sensor, the lower the maximum difference between all possible combi-sensor values in the first and second aggregate curves before and after rotation of the ring sensor. By comparing the maximum delta for different numbers of physical sensors, increasing the number of physical sensors beyond twelve (12) yields negligible gains in performance. Based on this comparison, a ring sensor with twelve (12) or more physical sensors does not need to be aligned to face particular orientations. That is, any rotation of a ring sensor having more than twelve physical sensors will have a negligible effect on performance and provided substantially the same combi-sensor values.

Ring sensor embodiments may have one or more technical advantages. For example, an advantage of a ring sensor embodiment may be ease of installation. If using a ring sensor of more than 12 equally spaced sensors, the sensors do not need to be aligned to certain compass directions. In addition, the ring sensor may only require a single installation of a pre-constructed arrangement of physical sensors. This ring sensor embodiment may also avoid certain restrictions placed on sensors installations on the outer facades of the building since the ring sensor can be mounted to the top of the building.

X. Building Control Systems

In certain embodiments, a combi-sensor system provides a combi-sensor value for a facade of a structure as input to control building systems. For example, combi-sensor values can be used to control the transitioning to different tint states of one or more electrochromic window(s) in a building. Description of control methods for transitioning to different tint states can be found in PCT/US15/29675, titled "CONTROL METHOD FOR TINTABLE WINDOWS," and filed on May 7, 2015, and U.S. patent application Ser. No. 13/772,969, titled "CONTROL METHOD FOR TINTABLE WINDOWS," and filed on Feb. 21, 2014, both of which are hereby incorporated by reference in their entirety and for all purposes. An example of a management system for controlling electrochromic window(s) and other building systems is described below.

A. Overview of Electrochromic Devices

It should be understood that while disclosed embodiments described below focus on electrochromic windows (also referred to as smart windows), the concepts disclosed herein may apply to other types of tintable windows. For example, a tintable window incorporating a liquid crystal device or a suspended particle device, instead of an electrochromic device could be incorporated in any of the disclosed embodiments.

In order to orient the reader to the embodiments of systems, window controllers, and methods disclosed herein, a brief discussion of electrochromic devices is provided. This initial discussion of electrochromic devices is provided for context only, and the subsequently described embodiments of systems, window controllers, and methods are not limited to the specific features and fabrication processes of this initial discussion.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

Electrochromic devices having distinct layers can be fabricated as all solid state devices and/or all inorganic devices. Such devices and methods of fabricating them are described in more detail in U.S. patent application Ser. No. 12/645,111, entitled "Fabrication of Low-Defectivity Electrochromic Devices," filed on Dec. 22, 2009, and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In a similar way, the electrochromic device of embodiments described herein can be reversibly cycled between different tint levels (e.g., bleached state, darkest colored state, and intermediate levels between the bleached state and the darkest colored state). In certain aspects, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, and methods of fabricating them, are described in U.S. Pat. No. 8,300,298 and U.S. patent application Ser. No. 12/772,075 filed on Apr. 30, 2010, and U.S. patent application Ser. Nos. 12/814,277 and 12/814,279, filed on Jun. 11, 2010—each of the three patent applications and patent is entitled "Electrochromic Devices," each names Zhongchun Wang et al. as inventors, and each is incorporated by reference herein in its entirety.

B. Window Controllers

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite.

In some embodiments, an electrochromic window can include an electrochromic device on one lite of an IGU and another electrochromic device on the other lite of the IGU. If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 15:
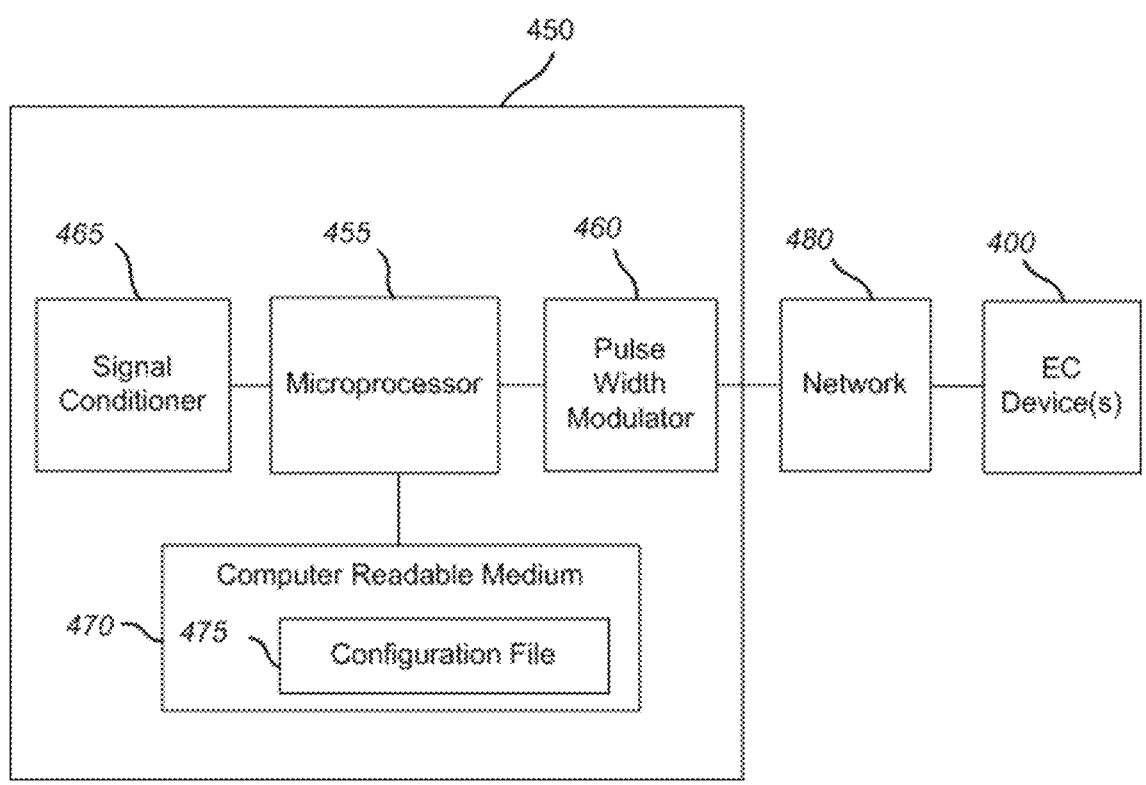
FIG. 15 depicts a simplified block diagram of components of a window controller.

FIG. 15 depicts a block diagram of some components of a window controller 450 and other components of a window controller system of disclosed embodiments. FIG. 15 is a simplified block diagram of a window controller, and more detail regarding window controllers can be found in U.S.

patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 15, the illustrated components of the window controller 450 include a window controller 450 having a microprocessor 455 or other processor, a power width modulator (PWM) 460, a signal conditioning module 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, the output from the one or more sensors may be input to the signal conditioning module 465 of the window controller 450. In some cases, the output from the one or more sensors may be input to a BMS, as described further in the Building Management Systems section. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Figure 16A:
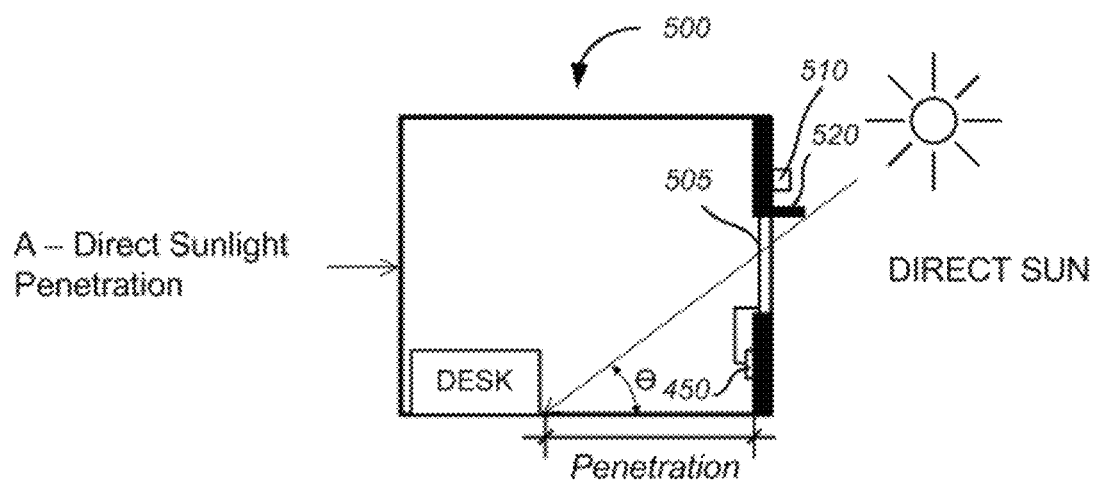
FIGS. 16A-16C include diagrams depicting information collected by each of three Modules A, B, and C of an exemplary control logic, according to disclosed embodiments.

FIG. 16A depicts a schematic diagram of a room 500 having an electrochromic window 505 with at least one electrochromic device. The electrochromic window 505 is located between the exterior and the interior of a building, which includes the room 500. The room 500 also includes a window controller 450 connected to and configured to control the tint level of the electrochromic window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to the signal conditioning module 465. The input may be in the form of a voltage signal to signal conditioning module 465. Signal conditioning module 465 passes an output signal to the window controller 450. Window controller 450 determines a tint level of the electrochromic window 505, based on various information from the configuration file 475, output from the signal conditioning module 465, override values. Window controller 450 and then instructs the PWM 460, to apply a voltage and/or current to electrochromic window 505 to transition to the desired tint level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the electrochromic window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

Window controller 450 or a master controller in communication with the window controller 450 may employ any one or more predictive control logic components to determine a desired tint level based on signals from the exterior sensor 510 and/or other input. The window controller 450 can instruct the PWM 460 to apply a voltage and/or current to electrochromic window 505 to transition it to the desired tint level.

C. An Example of Predictive Control Logic

Figure 16B:
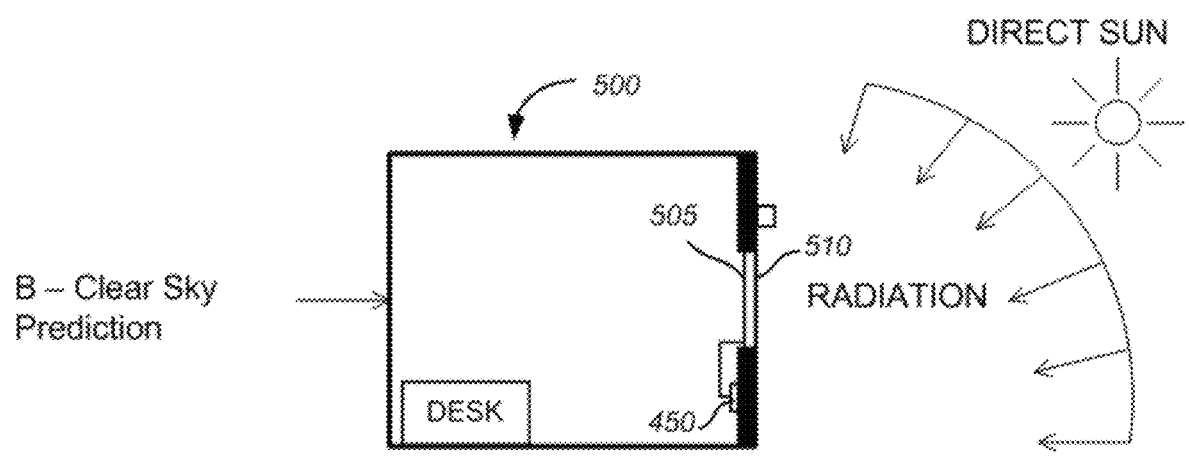
Figure 16C:
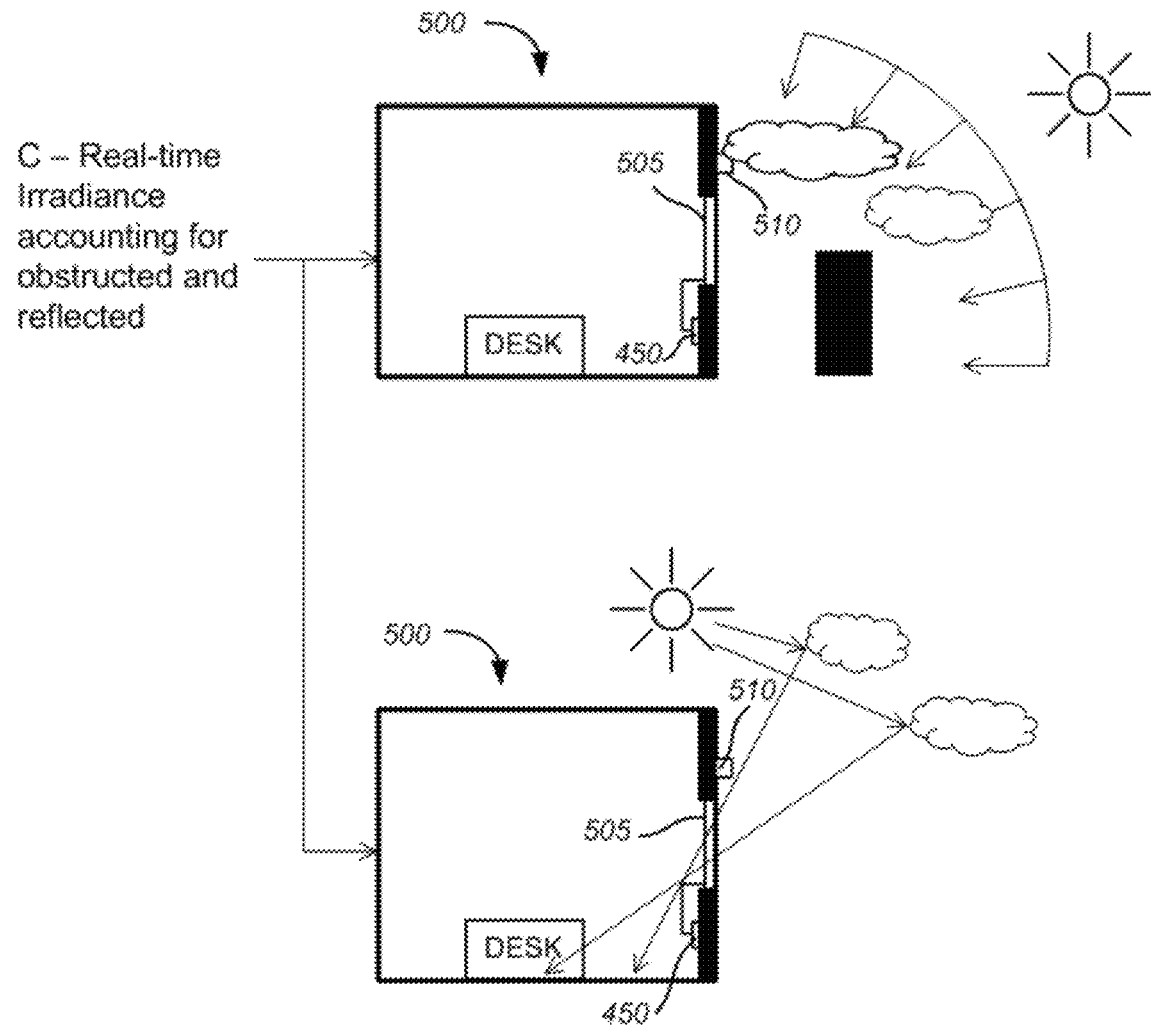

In disclosed embodiments, predictive control logic is used to implement methods of determining and controlling a desired tint level for the electrochromic window 505 or other tintable window that accounts for occupant comfort and/or energy conservation considerations. This predictive control logic may employ one or more logic modules. FIGS. 16A-16C include diagrams depicting some information collected by each of three logic modules A, B, and C of an exemplary control logic of disclosed embodiments.

FIG. 16A shows the penetration depth of direct sunlight into a room 500 through an electrochromic window 505 between the exterior and the interior of a building, which includes the room 500. Penetration depth is a measure of how far direct sunlight will penetrate into the room 500. As shown, penetration depth is measured in a horizontal direction away from the sill (bottom) of window. Generally, the window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 505 may be due to any type of structure that can shade the window such as an overhang, a fin, etc. In FIG. 16A, there is an overhang 520 above the electrochromic window 505 that blocks a portion of the direct sunlight entering the room 500 thus shortening the penetration depth. The room 500 also includes a local window controller 450 connected to and configured to control the tint level of the electrochromic window 505. An exterior sensor 510 is located on a vertical surface in the exterior of the building.

Module A can be used to determine a tint level that considers occupant comfort from direct sunlight through the electrochromic window 505 onto an occupant or their activity area. The tint level is determined based on a calculated penetration depth of direct sunlight into the room and the space type (e.g., desk near window, lobby, etc.) in the room at a particular instant in time. In some cases, the tint level may also be based on providing sufficient natural lighting into the room. In many cases, the penetration depth is the value calculated at a time in the future to account for glass transition time. The concern addressed in Module A is that direct sunlight may penetrate so deep into the room 500 as to show directly on an occupant working at a desk or other work surface in a room. Publicly available programs can provide calculation of the sun's position and allow for easy calculation of penetration depth.

FIG. 16A also shows a desk in the room 500 as an example of a space type associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk.

FIG. 16B shows direct sunlight and radiation under clear sky conditions entering the room 500 through the electrochromic window 505. The radiation may be from sunlight scattered by molecules and particles in the atmosphere. Module B determines a tint level based on predicted values of irradiance under clear sky conditions flowing through the electrochromic window 505 under consideration. Various software, such as open source RADIANCE program, can be used to predict clear sky irradiance at a certain latitude, longitude, time of year, and time of day, and for a given window orientation.

FIG. 16C shows radiant light from the sky that is measured in real-time by an exterior sensor 510 to account for light that may be obstructed by or reflected from objects such as buildings or weather conditions (e.g., clouds) that are not accounted for in the clear sky predictions. The tint level determined by Module C is based on the real-time irradiance based on measurements taken by the exterior sensor 510.

The predictive control logic may implement one or more of the logic Modules A, B and C separately for each electrochromic window 505 in the building. Each electrochromic window 505 can have a unique set of dimensions, orientation (e.g., vertical, horizontal, tilted at an angle), position, associated space type, etc. A configuration file with this information and other information can be maintained for each electrochromic window 505. The configuration file 475 may be stored in the computer readable medium 470 of the local window controller 450 of the electrochromic window 505 or in the BMS described later in this disclosure. The configuration file 475 can include information such as a window configuration, an occupancy lookup table, information about an associated datum glass, and/or other data used by the predictive control logic. The window configuration may include information such as the dimensions of the electrochromic window 505, the orientation of the electrochromic window 505, the position of the electrochromic window 505, etc.

A lookup table describes tint levels that provide occupant comfort for certain space types and penetration depths. That is, the tint levels in the occupancy lookup table are designed to provide comfort to occupant(s) that may be in the room 500 from direct sunlight on the occupant(s) or their workspace. An example of an occupancy lookup table is shown in FIG. 20.

The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 505. As another example, the space type may be a lobby.

In certain embodiments, one or more modules of the predictive control logic can determine desired tint levels while accounting for energy conservation in addition to occupant comfort. These modules may determine energy savings associated with a particular tint level by comparing the performance of the electrochromic window 505 at that tint level to a datum glass or other standard reference window. The purpose of using this reference window can be to ensure that the predictive control logic conforms to requirements of the municipal building code or other requirements for reference windows used in the locale of the building. Often municipalities define reference windows using conventional low emissivity glass to control the amount of air conditioning load in the building. As an example of how the reference window 505 fits into the predictive control logic, the logic may be designed so that the irradiance coming through a given electrochromic window 505 is never greater than the maximum irradiance coming through a reference window as specified by the respective municipality. In disclosed embodiments, predictive control logic may use the solar heat gain coefficient (SHGC) value of the electrochromic window 505 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based on code requirements specified by the respective municipality.

Generally, buildings are designed to have an HVAC with the capacity to fulfill the maximum expected heating and/or air-conditioning loads required at any given instance. The calculation of required capacity may take into consideration the datum glass or reference window required in a building at the particular location where the building is being constructed. Therefore, it is important that the predictive control logic meet or exceed the functional requirements of the datum glass in order to allow building designers to confidently determine how much HVAC capacity to put into a particular building. Since the predictive control logic can be used to tint the window to provide additional energy savings over the datum glass, the predictive control logic could be useful in allowing building designers to have a lower HVAC capacity than would have been required using the datum glass specified by the codes and standards.

Particular embodiments described herein assume that energy conservation is achieved by reducing air conditioning load in a building. Therefore, many of the implementations attempt to achieve the maximum tinting possible, while accounting for occupant comfort level and perhaps lighting load in a room having with the window under consideration. However, in some climates, such as those at far northern and for southern latitudes, heating may be more of a concern than air conditioning. Therefore, the predictive control logic can be modified, specifically, road reversed in some matters, so that less tinting occurs in order to ensure that the heating load of the building is reduced.

In certain implementations, the predictive control logic has only two independent variables that can be controlled by an occupant (end user), building designer, or building operator. These are the space types for a given window and the datum glass associated with the given window. Often the datum glass is specified when the predictive control logic is implemented for a given building. The space type can vary, but is typically static. In certain implementations, the space type may be part of the configuration file maintained by the building or stored in the local window controller 450. In some cases, the configuration file may be updated to account for various changes in the building. For example, if there is a change in the space type (e.g., desk moved in an office, addition of desk, lobby changed into office area, wall moved, etc.) in the building, an updated configuration file with a modified occupancy lookup table may be stored in the computer readable medium 470. As another example, if an occupant is hitting manual override repeatedly, then the configuration file may be updated to reflect the manual override.

Figure 17:
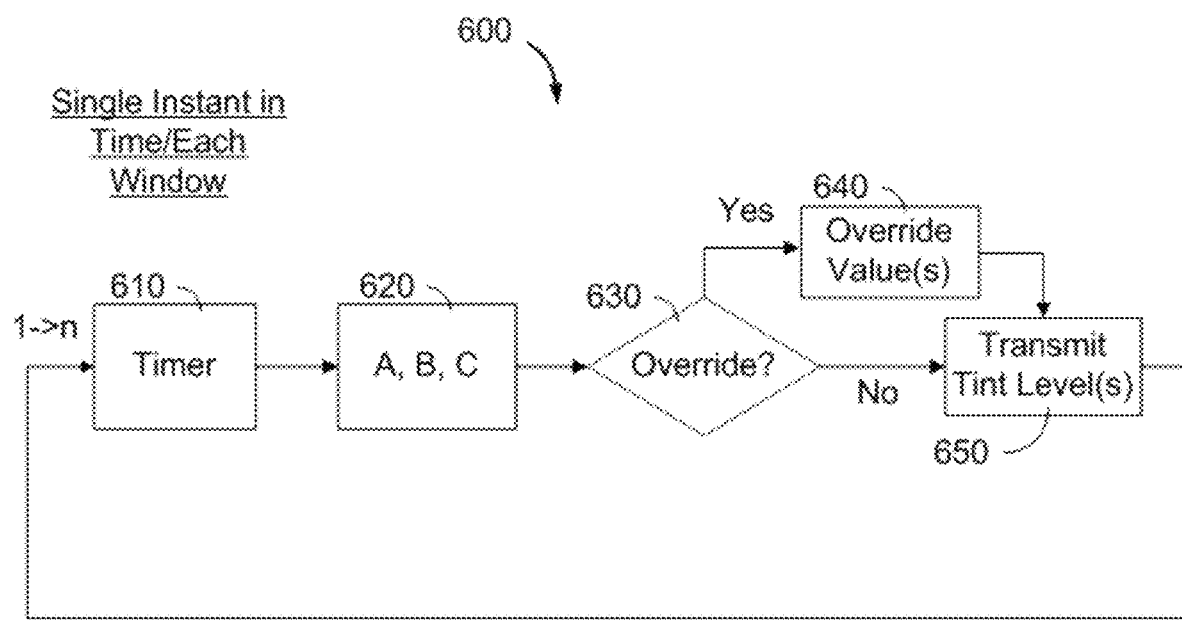
FIG. 17 is a flowchart showing some steps of predictive control logic for a method of controlling one or more electrochromic windows in a building, according to disclosed embodiments.

FIG. 17 is a flowchart showing predictive control logic for a method of controlling one or more electrochromic windows 505 in a building, according to embodiments. The predictive control logic uses one or more of the Modules A, B, and C to calculate tint levels for the window(s) and sends instructions to transition the window(s). The calculations in the control logic are run 1 to n times at intervals timed by the timer at step 610. For example, the tint level can be recalculated 1 to n times by one or more of the Modules A, B, and C and calculated for instances in time $t_i=t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass can take up to 30 minutes or more. For these large windows, calculations may be done on a less frequent basis such as every 30 minutes.

At step 620, logic Modules A, B, and C perform calculations to determine a tint level for each electrochromic window 505 at a single instant in time $t_i$. These calculations can be performed by the window controller 450. In certain embodiments, the predictive control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At step 630, the predictive control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the predictive control logic described herein to ensure that all windows have a particularly high level of tinting. Another example of an override may be if there is no occupant in the room, for example during a weekend in a commercial office building. In these cases, the building may disengage one or more Modules that relate to occupant comfort and all the windows may have a high level of tinting in cold weather and low level of tinting in warm weather.

At step 650, the tint levels are transmitted over a network to electrochromic device(s) in one or more electrochromic windows 505 in the building. In certain embodiments, the transmission of tint levels to all windows of a building may be implemented with efficiency in mind. For example, if the recalculation of tint level suggests that no change in tint from the current tint level is required, then there is no transmission of instructions with an updated tint level. As another example, the building may be divided into zones based on window size. The predictive control logic may recalculate tint levels for zones with smaller windows more frequently than for zones with larger windows.

In some embodiments, the logic in FIG. 17 for implementing the control methods for multiple electrochromic windows 505 in an entire building can be on a single device, for example, a single master window controller. This device can perform the calculations for each and every window in the building and also provide an interface for transmitting tint levels to one or more electrochromic devices in individual electrochromic windows 505.

Also, there may be certain adaptive components of the predictive control logic of embodiments. For example, the predictive control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The predictive control logic may receive information about these instances and change the predictive control logic to change the tint level to the override value at that time of day.

Figure 18:
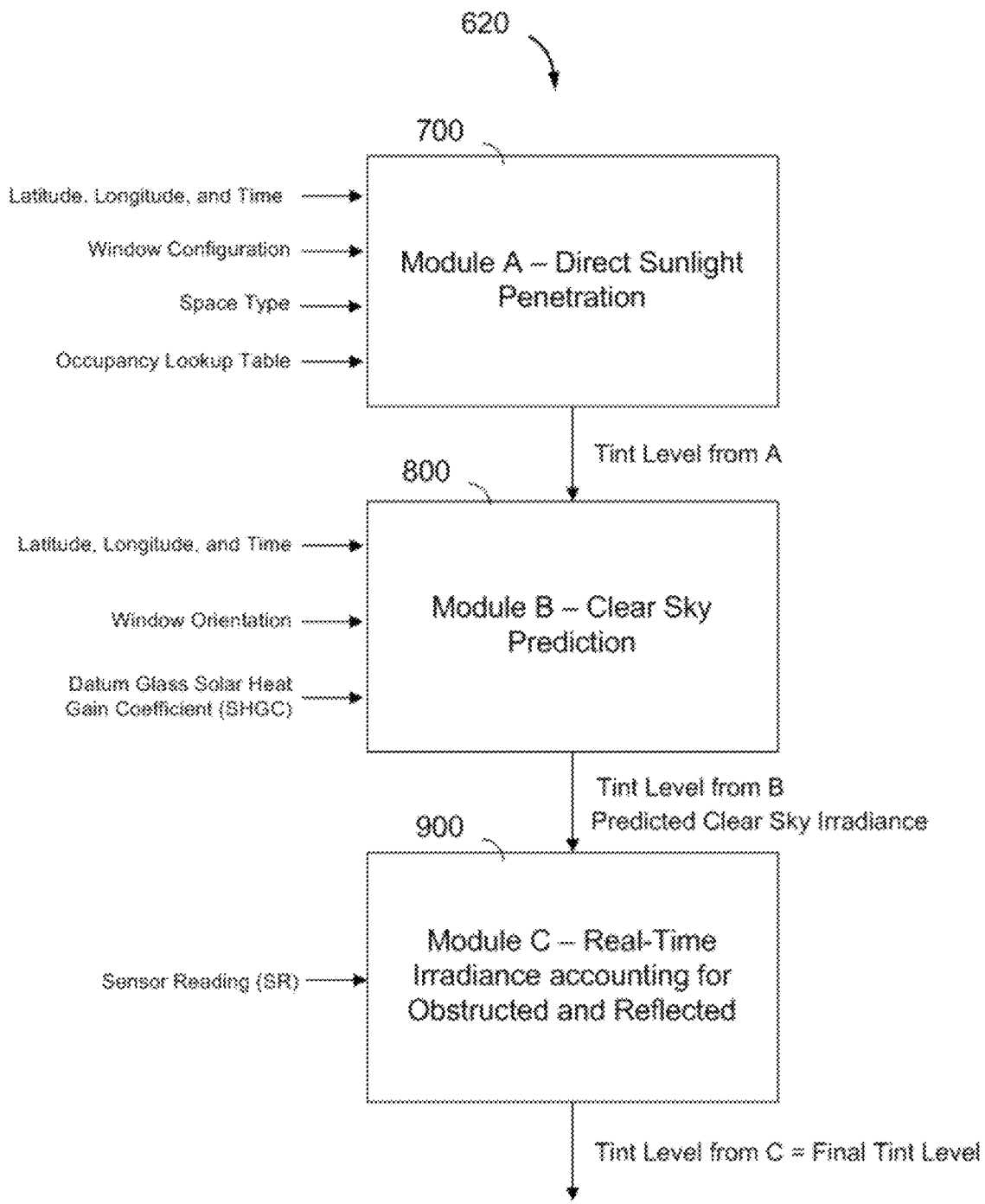
FIG. 18 is a flowchart showing a particular implementation of a portion of the control logic shown in FIG. 17.

FIG. 18 is a diagram showing a particular implementation of block 620 from FIG. 17. This diagram shows a method of performing all three Modules A, B, and C in sequence to calculate a final tint level of a particular electrochromic window 505 for a single instant in time $t_i$. The final tint level may be the maximum permissible transmissivity of the window under consideration. FIG. 18 also includes some exemplary inputs and outputs of Modules A, B, and C. The calculations in Modules A, B, and C are performed by window controller 450 in local window controller 450 in embodiments. In other embodiments, one or more of the modules can be performed by another processor. Although illustrated embodiments show all three Modules A, B, and C being used, other embodiments may use one or more of the Modules A, B, and C or may use additional modules.

At step 700, window controller 450 uses Module A to determine a tint level for occupant comfort to prevent direct glare from sunlight penetrating the room 500. Window controller 450 uses Module A to calculate the penetration depth of direct sunlight into the room 500 based on the sun's position in the sky and the window configuration from the configuration file. The position of the sun is calculated based on the latitude and longitude of the building and the time of day and date. The occupancy lookup table and space type are input from a configuration file for the particular window. Module A outputs the Tint level from A to Module B.

The goal of Module A is to ensure that direct sunlight or glare does not strike the occupant or his or her workspace. The tint level from Module A is determined to accomplish this purpose. Subsequent calculations of tint level in Modules B and C can reduce energy consumption and may require even greater tint. However, if subsequent calculations of tint level based on energy consumption suggest less tinting than required to avoid interfering with the occupant, the predictive logic prevents the calculated greater level of transmissivity from being executed to assure occupant comfort.

At step 800, the tint level calculated in Module A is input into Module B. A tint level is calculated based on predictions of irradiance under clear sky conditions (clear sky irradiance). Window controller 450 uses Module B to predict clear sky irradiance for the electrochromic window 505 based on window orientation from the configuration file and based on latitude and longitude of the building. These predictions are also based on a time of day and date. Publicly available software such as the RADIANCE program, which is an open-source program, can provide the calculations for predicting clear sky irradiance. The SHGC of the datum glass is also input into Module B from the configuration file. Window controller 450 uses Module B to determine a tint level that is darker than the tint level in A and transmits less heat than the datum glass is predicted to transmit under maximum clear sky irradiance. Maximum clear sky irradiance is the highest level of irradiance for all times predicted for clear sky conditions.

At step 900, a tint level from B and predicted clear sky irradiance are input to Module C. Real-time irradiance values are input to Module C based on measurements from an exterior sensor 510. Window controller 450 uses Module C to calculate irradiance transmitted into the room if the window were tinted to the Tint level from Module B under clear sky conditions. Window controller 450 uses Module C to find the appropriate tint level where the actual irradiance through the window with this tint level is less than or equal to the irradiance through the window with the Tint level from Module B. The tint level determined in Module C is the final tint level.

Much of the information input to the predictive control logic is determined from fixed information about the latitude and longitude, time and date. This information describes where the sun is with respect to the building, and more particularly with respect to the window for which the predictive control logic is being implemented. The position of the sun with respect to the window provides information such as the penetration depth of direct sunlight into the room assisted with the window. It also provides an indication of the maximum irradiance or solar radiant energy flux coming through the window. This calculated level of irradiance can be modified by sensor input which might indicate that there is a reduction from the maximum amount of irradiance. Again, such reduction might be caused by a cloud or other obstruction between the window and the sun.

Figure 19:
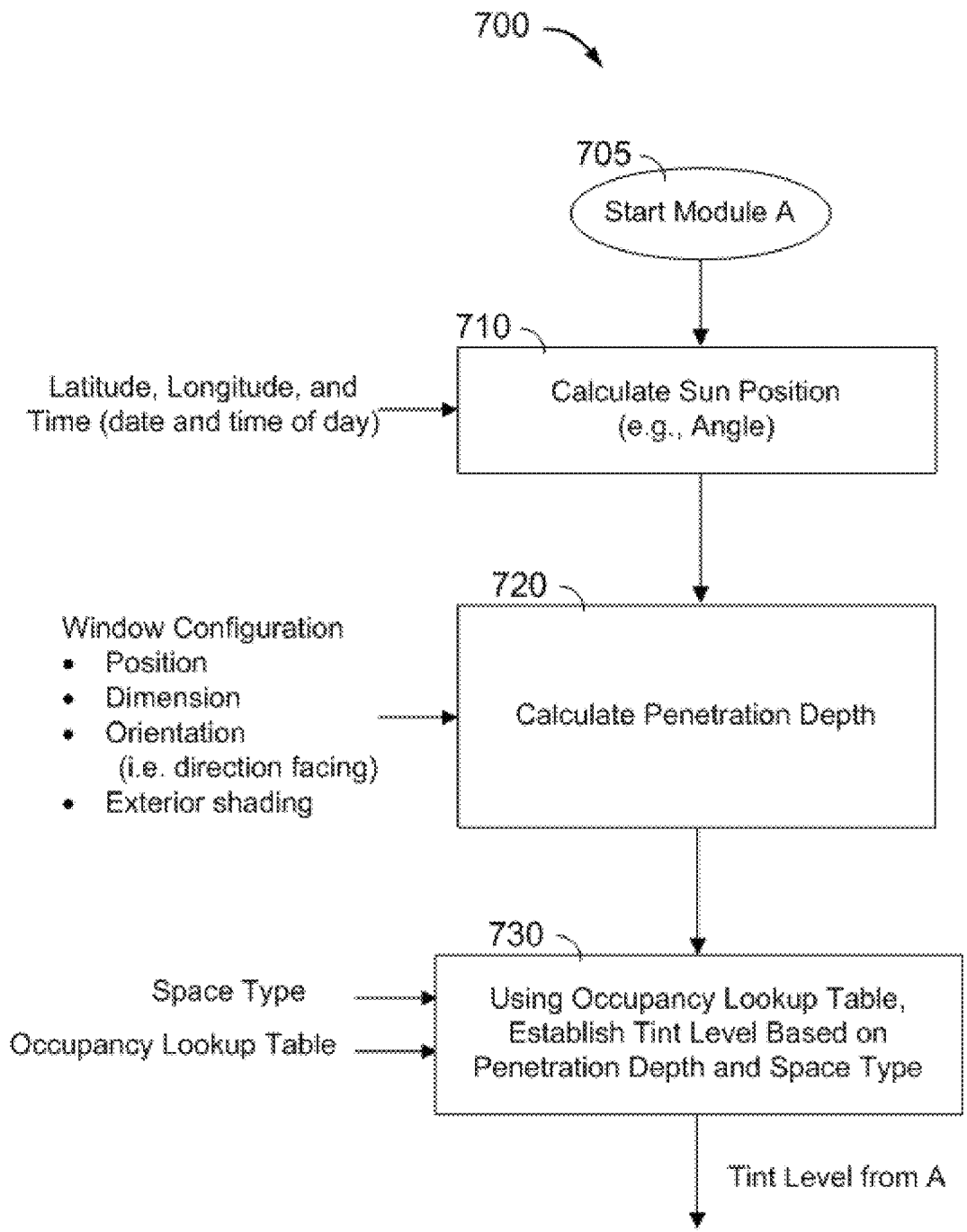
FIG. 19 is a flowchart showing details of Module A according to disclosed embodiments.

FIG. 19 is a flowchart showing details of step 700 of FIG. 18. At step 705, Module A begins. At step 710, the window controller 450 uses Module A to calculate the position of the sun for the latitude and longitude coordinates of the building and the date and time of day of a particular instant in time, b. The latitude and longitude coordinates may be input from the configuration file. The date and time of day may be based on the current time provided by the timer. The sun position is calculated at the particular instant in time, $t_i$, which may be in the future in some cases. In other embodiments, the position of the sun is calculated in another component (e.g., module) of the predictive control logic.

At step 720, window controller 450 uses Module A to calculate the penetration depth of direct sunlight into the room 500 at the particular instant in time used in step 710. Module A calculates the penetration depth based on the calculated position of the sun and window configuration information including the position of the window, dimensions of the window, orientation of the window (i.e. direction facing), and the details of any exterior shading. The window configuration information is input from the configuration file associated with the electrochromic window

505. For example, Module A can be used to calculate the penetration depth of the vertical window shown in FIG. 16A by first calculating the angle θ of the direct sunlight based on the position of the sun calculated at the particular instant in time. The penetration depth can be determined based on calculated angle θ and the location of the lintel (top of the window).

At step 730, a tint level is determined that will provide occupant comfort for the penetration depth calculated in step 720. The occupancy lookup table is used to find a desired tint level for the space type associated with the window, for the calculated penetration depth, and for the acceptance angle of the window. The space type and occupancy lookup table are provided as input from the configuration file for the particular window.

Figure 21A:
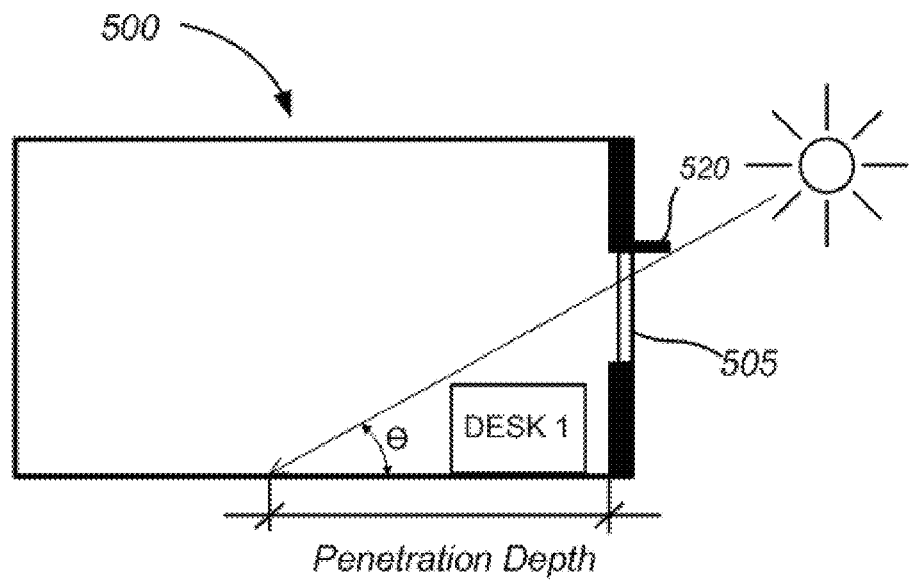
FIG. 21A depicts a schematic diagram of a room including an electrochromic window with a space type based on a Desk 1 located near the window, according to disclosed embodiments.
Figure 21B:
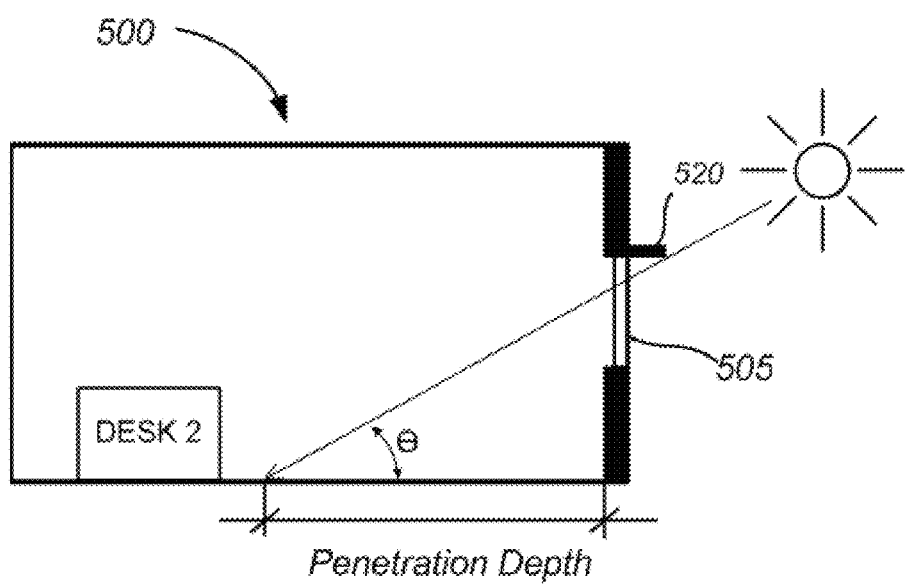
FIG. 21B depicts a schematic diagram of a room including an electrochromic window with a space type based on a Desk 2 located far away from the window, according to disclosed embodiments.

An example of an occupancy lookup table is provided in FIG. 20. The values in the table are in terms of a Tint level and associated SGHC values in parenthesis. FIG. 20 shows the different tint levels (SGHC values) for different combinations of calculated penetration values and space types. The table is based on eight tint levels including 0 (lightest), 5, 10, 15, 20, 25, 30, and 35 (lightest). The lightest tint level of 0 corresponds to an SGHC value of 0.80, the tint level of 5 corresponds to an SGHC value of 0.70, the tint level of 10 corresponds to an SGHC value of 0.60, the tint level of 15 corresponds to an SGHC value of 0.50, the tint level of 20 corresponds to an SGHC value of 0.40, the tint level of 25 corresponds to an SGHC value of 0.30, the tint level of 30 corresponds to an SGHC value of 0.20, and the tint level of 35 (darkest) corresponds to an SGHC value of 0.10. The illustrated example includes three space types: Desk 1, Desk 2, and Lobby and six penetration depths. FIG. 21A shows the location of Desk 1 in the room 500. FIG. 21B shows the location of Desk 2 in the room 500. As shown in the occupancy lookup table of FIG. 20, the tint levels for Desk 1 close to the window are higher than the tint levels for Desk 2 far from window to prevent glare when the desk is closer to the window. Occupancy lookup tables with other values may be used in other embodiments. For example, one other occupancy lookup table may include only four tint levels associated with the penetration values.

Figure 22:
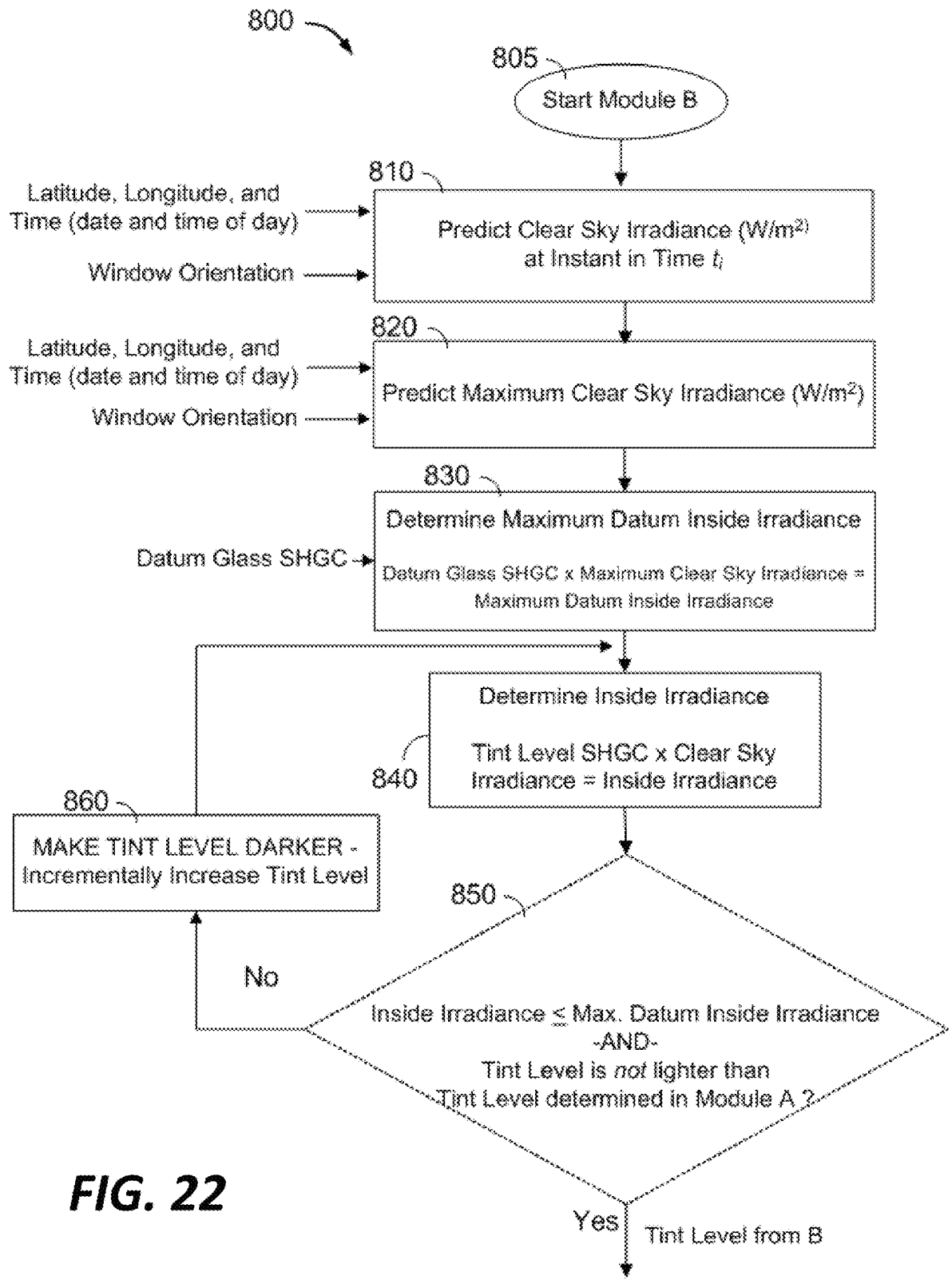
FIG. 22 is a flowchart showing details of Module B according to disclosed embodiments.

FIG. 22 is a diagram showing further detail of step 800 of FIG. 18. At step 805, Module B begins. At step 810, Module B can be used to predict the irradiance at the window under clear sky conditions at $t_i$. This clear sky irradiance at $t_i$ is predicted based on the latitude and longitude coordinates of the building and the window orientation (i.e. direction the window is facing). At step 820, the Maximum Clear Sky Irradiance incident the window at all times is predicted. These predicted values of clear sky irradiance can be calculated using open source software, such as Radiance.

At step 830, the window controller 450 uses Module B to determine the maximum amount of irradiance that would be transmitted through a datum glass into the room 500 at that time (i.e. determines Maximum Datum Inside Irradiance). The calculated Maximum Clear Sky Irradiance from step 820 and the datum glass SHGC value from the configuration file can be used to calculate the Maximum Irradiance inside the space using the equation:

Maximum Datum Inside Irradiance =

Daxtum Glass *SHGC* × Maximum Clear Sky Irradiance.

At step 840, window controller 450 uses Module B to determine inside irradiance into the room 500 having a window with the current tint level based on the equation. The calculated Clear Sky Irradiance from step 810 and the SHGC value associated with the current tint level can be used to calculate the value of the inside irradiance using the equation:

Tint level Irradiane = Tint level *SHGC* × Clear Sky Irradiance.

In one embodiment, one or more the steps 705, 810 and 820 may be performed by a solar position calculator separate from Modules A and B. A solar position calculator refers to logic that determines the position of the sun at a particular future time and makes predictive determinations (e.g., predicts clear sky irradiance) based on the sun's position at that future time. The solar position calculator may perform one or more steps of the methods disclosed herein. The solar position calculator may be a portion of the predictive control logic performed by one or more of the components of the master window controller. For example, the solar position calculator may be part of the predictive control logic shown in FIG. 25 implemented by the window controller 1410.

At step 850, window controller 450 uses Module B to determine whether the inside irradiance based on the current tint level is less than or equal to the maximum datum inside irradiance and the tint level is darker than the tint level from A. If the determination is NO, the current tint level is incrementally increased (darkened) at step 860 and the inside irradiance is recalculated at step 840. If the determination is YES at step 850, Module B ends.

Figure 23:
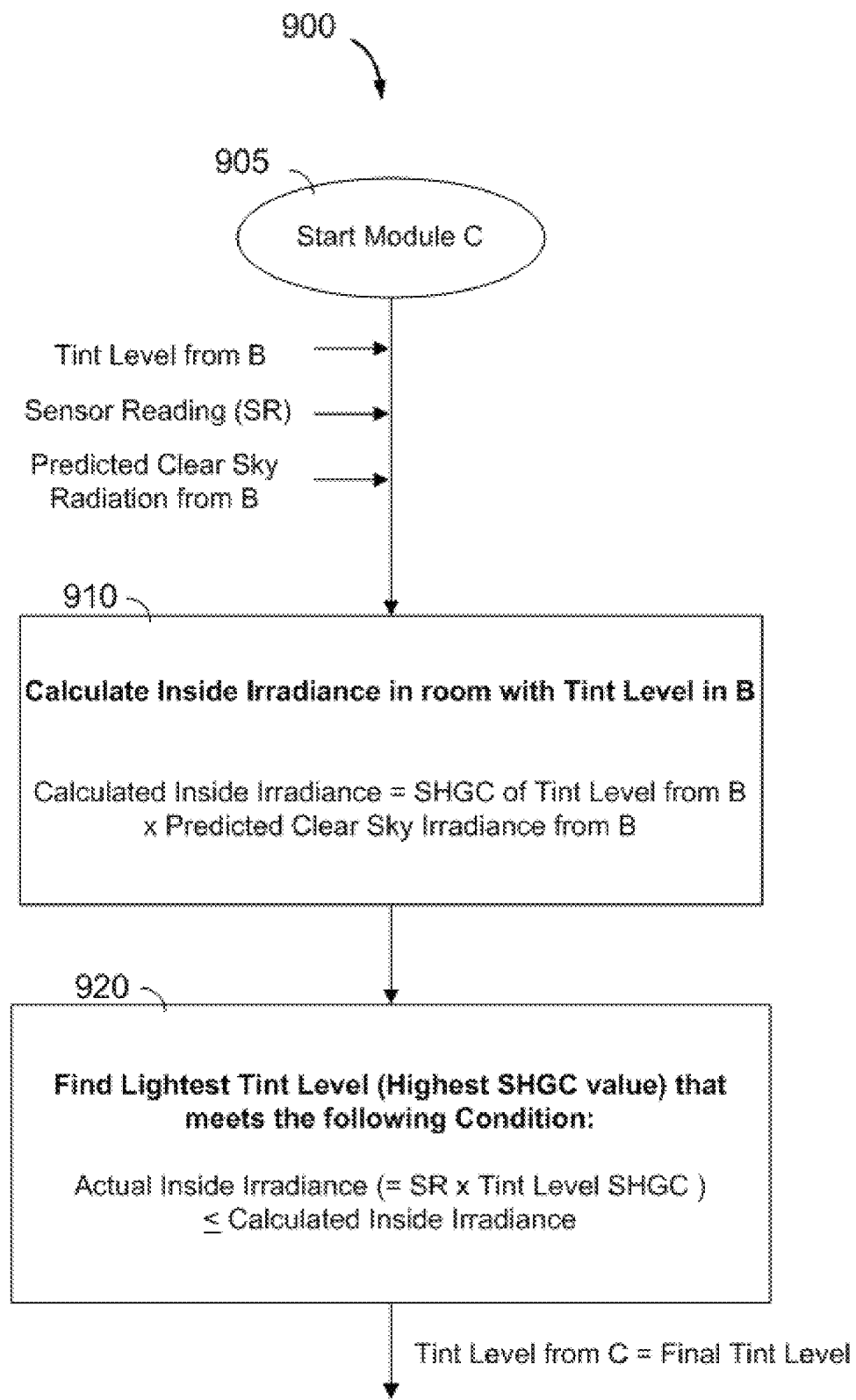
FIG. 23 is a flowchart showing details of Module C according to disclosed embodiments.

FIG. 23 is a diagram showing further detail of step 900 of FIG. 18. At step 905, Module C begins. A tint level from B and predicted clear sky irradiance at the instant in time $t_i$ is input from Module B. Real-time irradiance values are input to Module C based on measurements from an exterior sensor 510.

At step 910, window controller 450 uses Module C to calculate irradiance transmitted into the room through an electrochromic window 505 tinted to the Tint level from B under clear sky conditions. This Calculated Inside Irradiance can be determined using the equation: Calculated Inside Irradiance=SHGC of Tint Level from B×Predicted Clear Sky Irradiance from B.

At step 920, window controller 450 uses Module C to find the appropriate tint level where the actual irradiance (=SR× Tint level SHGC) through the window with this tint level is less than or equal to the irradiance through the window with the Tint level from B (i.e. Actual Inside Irradiance≤Calculated Inside Irradiance). In some cases, the module logic starts with the tint level from B and incrementally increases the tint level until the Actual Inside Irradiance≤Calculated Inside Irradiance. The tint level determined in Module C is the final tint level. This final tint level may be transmitted in tint instructions over the network to the electrochromic device(s) in the electrochromic window 505.

Figure 24:
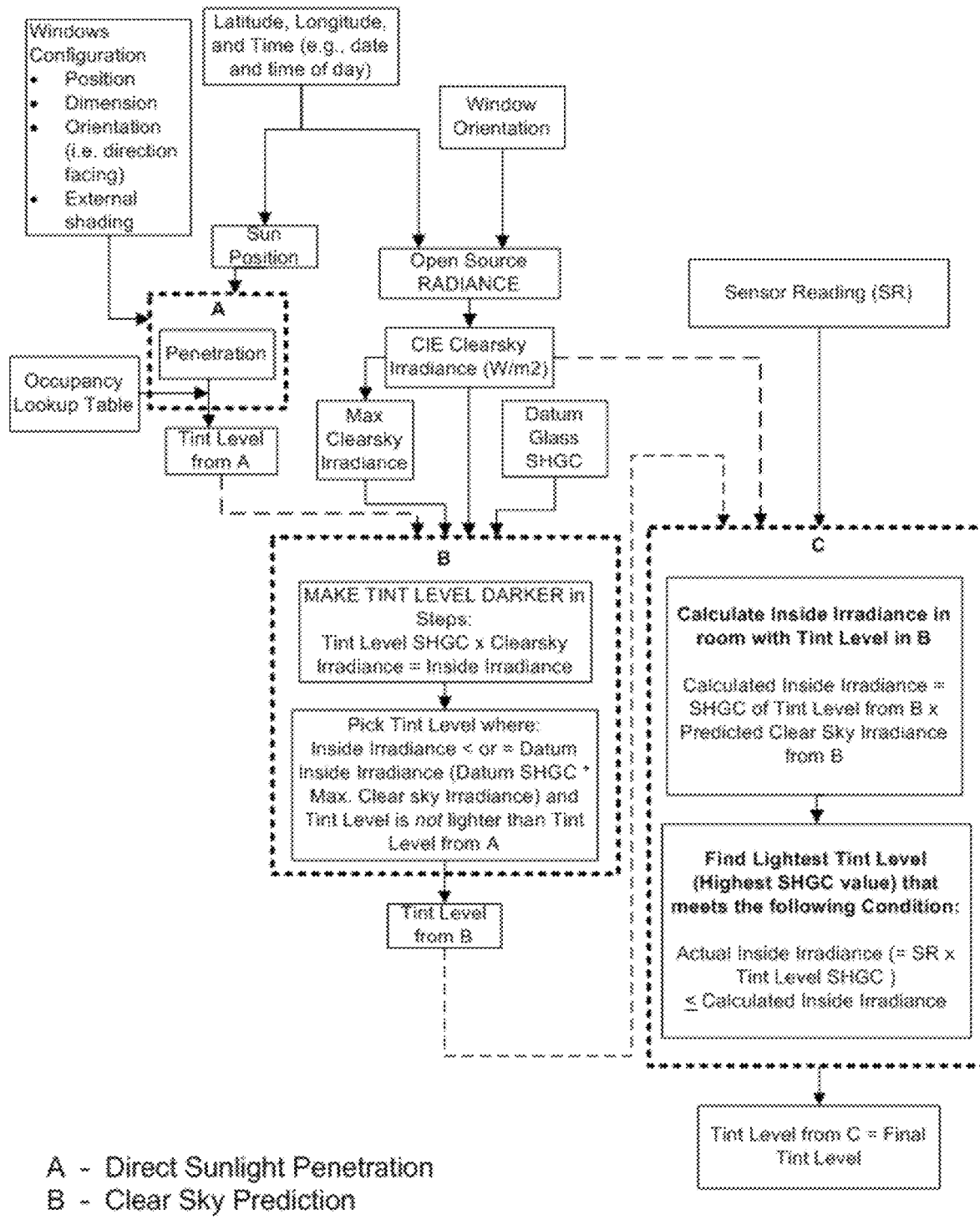
FIG. 24 is a diagram showing another implementation of a portion of the control logic shown in FIG. 17.

FIG. 24 is a diagram includes another implementation of block 620 from FIG. 17. This diagram shows a method of performing Modules A, B, and C of embodiments. In this method, the position of the sun is calculated based on the latitude and longitude coordinates of the building for a single instant in time $t_i$. The penetration depth is calculated in Module A based on the window configuration including a position of the window, dimensions of the window, orientation of the window, and information about any external shading. Module A uses a lookup table to determine the tint level from A based on the calculated penetration and the space type. The tint level from A is then input into Module B.

A program such as the open source program Radiance, is used to determine clear sky irradiance based on window orientation and latitude and longitude coordinates of the building for both a single instant in time $t_i$ and a maximum value for all times. The datum glass SHGC and calculated maximum clear sky irradiance are input into Module B. Module B increases the tint level calculated in Module A in steps and picks a tint level where the Inside radiation is less than or equal to the Datum Inside Irradiance where: Inside Irradiance=Tint level SHGC×Clear Sky Irradiance and Datum Inside Irradiance=Datum SHGC×Maximum Clear Sky Irradiance. However, when Module A calculates the maximum tint of the glass, module B doesn't change the tint to make it lighter. The tint level calculated in B is then input into Module C. The predicted clear sky irradiance is also input into Module C.

Module C calculates the inside irradiance in the room with an electrochromic window 505 having the tint level from B using the equation: Calculated Inside Irradiance=SHGC of Tint Level from B×Predicted Clear Sky Irradiance from B. Module C then finds the appropriate tint level that meets the condition where actual inside irradiance is less than or equal to the Calculated Inside Irradiance. The actual inside irradiance is determined using the equation: Actual Inside Irradiance=SR×Tint level SHGC. The tint level determined by Module C is the final tint level in tint instructions sent to the electrochromic window 505.

In some embodiments, tintable windows for the exterior windows of the building (i.e., windows separating the interior of the building from the exterior of the building), may be grouped into zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone.

In some embodiments, electrochromic windows in a zone may be controlled by the same window controller. In some other embodiments, electrochromic windows in a zone may be controlled by different window controllers, but the window controllers may all receive the same output signals from sensors and use the same function or lookup table to determine the level of tint for the windows in a zone.

In some embodiments, electrochromic windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, electrochromic windows in a zone that includes the windows on a single side of the building may be controlled by a window controller or controllers that receive an output signal from a transmissivity sensor.

In some embodiments, a sensor (e.g., photosensor) may provide an output signal to a window controller to control the electrochromic windows 505 of a first zone (e.g., a master control zone). The window controller may also control the electrochromic windows 505 in a second zone (e.g., a slave control zone) in the same manner as the first zone. In some other embodiments, another window controller may control the electrochromic windows 505 in the second zone in the same manner as the first zone.

In some embodiments, a building manager, occupants of rooms in the second zone, or other person may manually instruct (using a tint or clear command or a command from a user console of a BMS, for example) the electrochromic windows in the second zone (i.e., the slave control zone) to enter a tint level such as a colored state (level) or a clear state. In some embodiments, when the tint level of the windows in the second zone is overridden with such a manual command, the electrochromic windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the electrochromic windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a building network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate, or master window controller, a remote control device, or a BMS. Wireless communication is used in the window controller for at least one of the following operations: programming and/or operating the electrochromic window 505, collecting data from the EC window 505 from the various sensors and protocols described herein, and using the electrochromic window 505 as a relay point for wireless communication. Data collected from electrochromic windows 505 also may include count data such as number of times an EC device has been activated, efficiency of the EC device over time, and the like. These wireless communication features is described in more detail below.

In one embodiment, wireless communication is used to operate the associated electrochromic windows 505, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

D. Another Example of Predictive Control Logic

Figure 25:
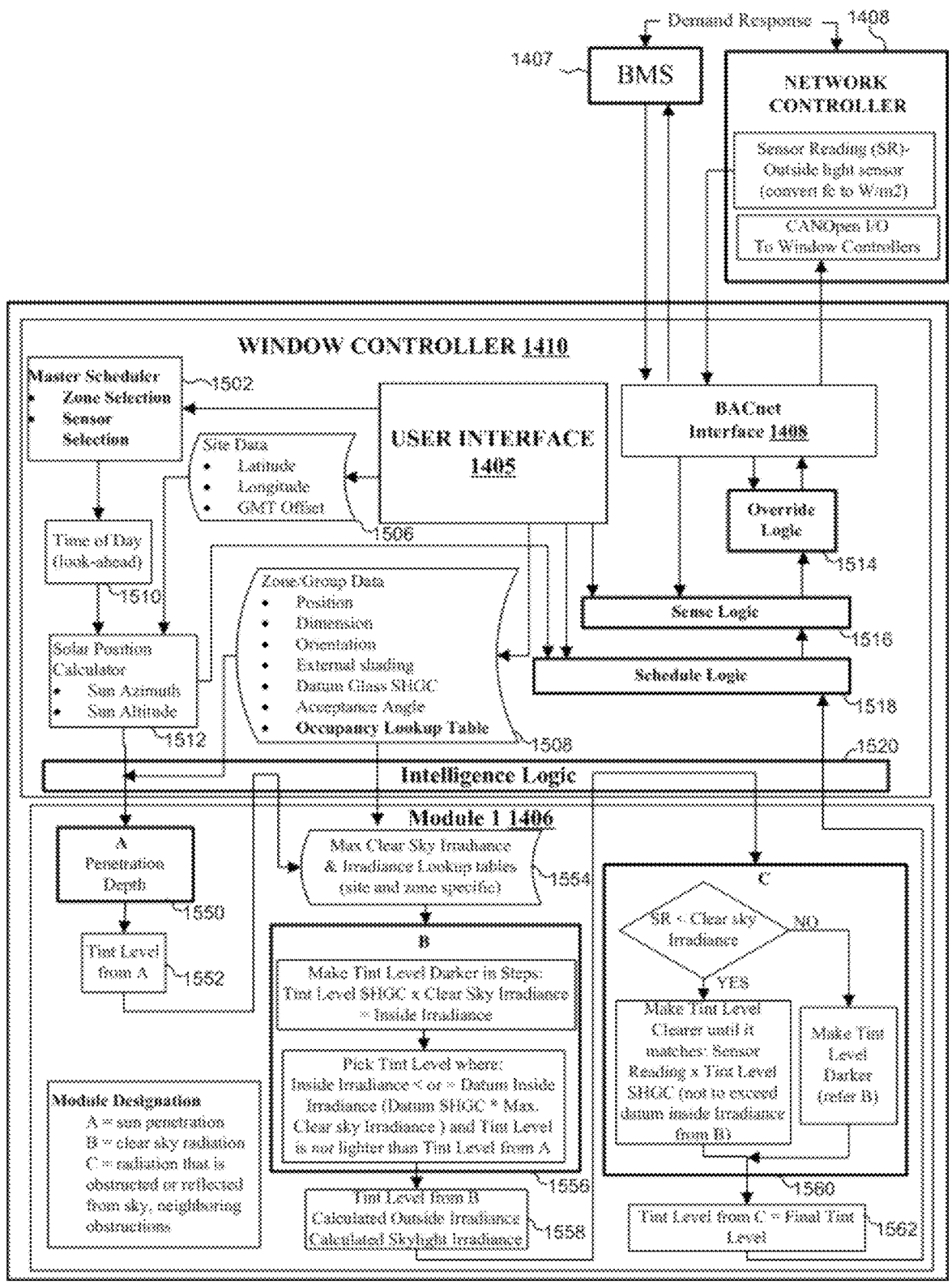
FIG. 25 is a block diagram depicting predictive control logic for a method of controlling the transitioning of tint levels of one or more tintable windows (e.g., electrochromic windows) in a building.

FIG. 25 is a block diagram depicting predictive control logic for a method of controlling the tint level of one or more tintable windows (e.g., electrochromic windows) in different zones of a building, according to embodiments. This logic makes predictive determinations at a time in the future that accounts for the transition time of the EC devices in the tintable windows. In the illustrated example, a portion of the predictive control logic is performed by window controller 1410, another portion is performed by network controller 1408, and the logic in Module 1 1406 is performed by a separate component from the window controller 1410 and network controller 1408. Alternatively, Module 1 1406 may be separate logic that may or may not be loaded onto the window controller 1410.

In FIG. 25, the portions of the predictive control logic employed by window controller 1410 and Module 1 1406 are managed by BMS 1407. BMS 1407 may be similar to BMS 1100 described with respect to FIG. 15. BMS 1407 is in electronic communication with window controller 1410 through a BACnet Interface 1408. In other embodiments, other communications protocol may be used. Although not shown in FIG. 25, Module 1 1406 is also in communication with BMS 1407 through BACnet Interface 1408. In other embodiments, the predictive control logic depicted in FIG. 25 may operate independently of a BMS.

Network controller 1408 receives sensor readings from one or more sensors (e.g., an outside light sensor) and may also convert the sensor reading into $W/m^2$. The network controller 1408 is in electronic communication with the window controller 1410 via either CANbus or CANOpen protocol. The network controller 1408 communicates the converted sensor readings to the window controller 1410.

In FIG. 25, the portion of the predictive control logic employed by window controller 1410 includes a master scheduler 1502. The master scheduler 1502 includes logic that allows a user (e.g., building administrator) to prepare a schedule that can use different types of control programs at different times of day and/or dates. Each of the control programs includes logic for determining a tint level based on or more independent variables. One type of control program is simply a pure state. A pure state refers to particular level of tint (e.g., transmissivity=40%) that is fixed during a certain time period, regardless of other conditions. For example, the building manager may specify that the windows are clear after 3 PM every day. As another example, building manager may specify a pure state for the time period between the hours of 8 PM to 6 AM every day. At other times of day, a different type of control program may be employed, for example, one employing a much greater level of sophistication. One type of control program offering a high level of sophistication. For example, a highly sophisticated control program of this type includes predictive control logic described in reference to FIG. 25 and may include the implementation of one or more of the logic Modules A, B, and C of Module 1 1406. As another example, another highly sophisticated control program of this type includes predictive control logic described in reference to FIG. 25 and may include the implementation of one or more of the logic Modules A, B, and C of Module 1 1406 and Module D described later in this Section VII. As another example, another highly sophisticated control program of this type is the predictive control logic described in reference to FIG. 17 and includes full multi-module implementation of logic Modules A, B, and C described in reference to FIGS. 18, 19, and 22. In this example, the predictive control logic uses sensor feedback in Module C and solar information in Modules A and B. Another example of a highly sophisticated control program is the predictive control logic described in reference to FIG. 18 with partial logic module implementation of one or two of the logic Modules A, B, and C described in reference to FIGS. 18, 19, and 22. Another type of control program is a threshold control program that relies on feedback from one or more sensors (e.g., photosensors) and adjusts the tint level accordingly without regard to solar position. One of the technical advantages of using master scheduler 1502 is that the user can select and schedule the control program (method) being used to determine the tint level.

Master scheduler 1502 runs the control programs in the schedule according to time in terms of the date and time of day based on a 24-hour day. Master scheduler 1502 may determine the date in terms of a calendar date and/or the day of the week based on a 7-day week with five weekdays (Monday through Friday) and two weekend days (Saturday and Sunday). Master scheduler 1502 may also determine whether certain days are holidays. Master scheduler 1502 may automatically adjust the time of day for daylight savings time based on the location of the tintable windows, which is determined by site data 1506.

In one embodiment, master scheduler 1502 may use a separate holiday schedule. The user may have determined which control program(s) to use during the holiday schedule. The user may determine which days will be included in the holiday schedule. Master scheduler 1502 may copy the basic schedule set up by the user and allow the user to set up their modifications for the holidays in the holiday schedule.

When preparing the schedule employed by master scheduler 1502, the user may select the zone or zones (Zone Selection) of the building where the selected program(s) will be employed. Each zone includes one or more tintable windows. In some cases, a zone may be an area associated with a space type (e.g., offices having a desk at a particular position, conference rooms, etc.) or may be associated with multiple space types. For example, the user may select Zone 1 having offices to: 1) Monday through Friday: heat up at 8 am in morning to 70 degrees and turn on air conditioning to at 3 pm in afternoon to keep temperature in offices to 80 degrees, and then turn off all air conditioning, and heat at 5 pm during weekdays, and 2) (Saturday and Sunday) turn off heat and air conditioning. As another example, the user may set Zone 2 having a conference room to run the predictive control logic of FIG. 25 including full-module implementation of Module 1 using all of the logic Module A, B, and C. In another example, the user may select a Zone 1 having conference rooms to run Module 1 from 8 AM to 3 PM and a threshold program or pure state after 3 PM. In other cases, a zone may be the entire building or may be one or more windows in a building.

When preparing the schedule with programs that may use sensor input, the user may also be able to select the sensor or sensors used in the programs. For example, the user may select a sensor located on the roof or a sensor located near or at the tintable window. As another example, the user may select an ID value of a particular sensor.

The portion of the predictive control logic employed by window controller 1410 also includes a user interface 1504 in electronic communication with master scheduler 1502. User interface 1504 is also in communication with site data 1506, zone/group data 1508, and sense logic 1516. The user may input their schedule information to prepare the schedule (generate a new schedule or modify an existing schedule) using user interface 1504. User interface 1504 may include an input device such as, for example, a keypad, touchpad, keyboard, etc. User interface 1504 may also include a display to output information about the schedule and provide selectable options for setting up the schedule. User interface 1504 is in electronic communication with a processor (e.g., microprocessor), which is in electronic communication with a computer readable medium (CRM). Both the processor and CRM are components of the window controller 1410. The logic in master scheduler 1502 and other components of the predictive control logic may be stored on the computer readable medium of window controller 1410.

The user may enter their site data 1506 and zone/group data 1508 using user interface 1504. Site data 1506 includes the latitude, longitude, and GMT Offset for the location of the building. Zone/group data includes the position, dimension (e.g., window width, window height, sill width, etc.), orientation (e.g., window tilt), external shading (e.g., overhang depth, overhang location above window, left/right fin to side dimension, left/right fin depth, etc.), datum glass SHGC, and occupancy lookup table for the one or more tintable windows in each zone of the building. In FIG. 25, site data 1506 and zone/group data 1508 is static information (i.e. information that is not changed by components of the predictive control logic). In other embodiments, this data may be generated on the fly. Site data 1506 and zone/group data 1508 may be stored on a computer readable medium of the window controller 1410.

When preparing (or modifying) the schedule, the user selects the control program that master scheduler 1502 will run at different time periods in each of the zones of a building. In some cases, the user may be able to select from multiple control programs. In one such case, the user may prepare a schedule by selecting a control program from a list of all control programs (e.g., menu) displayed on user interface 1405. In other cases, the user may have limited options available to them from a list of all control programs. For example, the user may have only paid for the use of two control programs. In this example, the user would only be able to select one of the two control programs paid for by the user.

Returning to FIG. 25, the portion of the predictive control logic employed by window controller 1410 also includes time of day (look ahead) logic 1510. Time of day (look ahead) logic 1510 determines a time in the future used by predictive control logic to make its predictive determinations. This time in the future accounts for time needed to transition the tint level of the EC devices 400 in the tintable windows. By using a time that accounts for transition time, the predictive control logic can predict a tint level appropriate for the future time at which time the EC devices 400 will have had the time to transition to the tint level after receiving the control signal. Time of day portion 1510 may estimate the transition time of EC device(s) in a representative window based on information about the representative window (e.g., window dimension, etc.) from the Zone/Group Data. Time of day logic 1510 may then determine the future time based on the transition time and the current time. For example, the future time may be equal to or greater than the current time added to the transition time.

The Zone/Group Data includes information about the representative window of each zone. In one case, the representative window may be one of the windows in the zone. In another case, the representative window may be a window having average properties (e.g., average dimensions) based on averaging all the properties from all the windows in that zone.

The predictive control logic employed by window controller 1410 also includes a solar position calculator 1512.

Solar position calculator 1512 includes logic that determines the position of the sun, sun azimuth and sun altitude, at an instance in time. In FIG. 25, solar position calculator 1512 makes its determinations based on a future instance in time received from time of day logic 1510. Solar position calculator 1512 is in communication with time of day portion 1510 and site data 1506 to receive the future time, latitude and longitude coordinates of the building, and other information that may be needed to make its calculation(s), such as the solar position calculation. Solar position calculator 1512 may also perform one or more determinations based on the calculated solar position. In one embodiment, solar position calculator 1512 may calculate clear sky irradiance or make other determinations from Modules A, B, and C of Module 1 1406.

The control logic employed by window controller 1410 also includes schedule logic 1518, which is in communication with the sense logic 1516, the user interface 1405, the solar position calculator 1512, and Module 1 1406. The schedule logic 1518 includes logic that determines whether to use the tint level passing through the intelligence logic 1520 from Module 1 1406 or use another tint level based on other considerations. For example, as sunrise and sunset times change throughout the year, the user may not want to reprogram the schedule to account for these changes. The schedule logic 1518 may use the sunrise and sunset times from the solar position calculator 1512 to set an appropriate tint level before sunrise and after sunset without requiring the user to reprogram the schedule for these changing times. For example, the schedule logic 1518 may determine that according to the sunrise time received from the solar position calculator 1512 the sun has not risen and that a pre-sunrise tint level should be used instead of the tint level passed from Module 1 1406. The tint level determined by the schedule logic 1518 is passed to sense logic 1516.

Sense logic 1516 is in communication with override logic 1514, schedule logic 1518, and user interface 1405. Sense logic 1516 includes logic that determines whether to use the tint level passed from schedule logic 1518 or use another tint level based on the sensor data received through the BACnet interface 1408 from one or more sensors. Using the example in the paragraph above, if schedule logic 1518 determines that it the sun has not risen and passed a pre-sunrise tint level and the sensor data shows that the sun has actually risen, then sense logic 1516 would use the tint level passed from Module 1 1406 through schedule logic 1518. The tint level determined by sense logic 1516 is passed to override logic 1514.

BMS 1407 and network controller 1408 are also in electronic communication with a demand response (e.g., utility company) to receive signals communicating the need for a high demand (or peak load) override. In response to receiving these signals from the demand response, BMS 1407 and/or network controller 1408 may send instructions through BACnet Interface 1408 to override logic 1514 that will process the override information from the demand response. Override logic 1514 is in communication with BMS 1407 and network controller 1408 through the BACnet Interface 1408, and also in communication with sense logic 1516.

Override logic 1514 allows for certain types of overrides to disengage predictive control logic and use an override tint level based on another consideration. Some examples of types of overrides that may disengage predictive control logic include a high demand (or peak load) override, manual override, vacant room override, etc. A high demand (or peak load) override defines a tint level from the demand response.

For a manual override, an end user may enter the override value at a wall switch either manually or through a remote device. A vacant room override defines an override value based on a vacant room (i.e. no occupant in the room). In this case, the sense logic 1516 may receive sensor data from a sensor (e.g., motion sensor) indicating that the room is vacant and sense logic 1516 may determine an override value and relay the override value to override logic 1514. The override logic 1514 can receive an override value and determine whether to use the override value or use another value, such as another override value received from a source having higher priority (i.e., demand response). In some cases, the override logic 1514 may operate by steps similar to the override steps 630, 640, and 650 described with respect to FIG. 17.

The control logic employed by window controller 1410 also includes intelligence logic 1520 that can shut off one or more of Modules A 1550, B 1556 and C 1560. In one case, the intelligence logic 1520 may be used to shut off one or more Modules where the user has not paid for those Modules. Intelligence logic 1520 may prevent the use of certain more sophisticated features such as the penetration calculation made in Module A. In such cases, a basic logic is used that "short-circuits" the solar calculator information and uses it to calculate tint levels, possibly with the assistance of one or more sensors. This tint level from the basic logic is communicated to schedule logic 1518.

Intelligence logic 1520 can shut off one or more of the Modules (Module A 1550, Module B 1556 and Module C 1560) by diverting certain communications between the window controller 1410 and Module 1 1406. For example, the communication between the solar position calculator 1512 and Module A 1550 goes through intelligence logic 1520 and can be diverted to schedule logic 1518 by intelligence logic 1520 to shut off Module A 1550, Module B 1556 and Module C 1560. As another example, the communication of tint level from Module A at 1552 to the Clear Sky Irradiance calculations at 1554 goes through intelligence logic 1520 and can be diverted instead to schedule logic 1518 to shut off Module B 1556 and Module C 1560. In yet another example, the communication of tint level from Module B at 1556 to Module C 1560 goes through intelligence logic 1520 and can be diverted to schedule logic 1518 to shut off Module C 1560.

Module 1 1406 includes logic that determines and returns a tint level to the schedule logic 1518 of window controller 1410. The logic predicts a tint level that would be appropriate for the future time provided by the time of day portion 1510. The tint level is determined for a representative tintable window associated with each of the zones in the schedule.

In FIG. 25, Module 1 1406 includes Module A 1550, Module B 1556 and Module C 1560, which may have some steps that are similar in some respects to the steps performed in Modules A, B, and C as described with respect to FIGS. 18, 19, 22 and 23. In another embodiment, Module 1 1406 may be comprised of Modules A, B, and C as described with respect to FIGS. 18, 19, 20 and 23. In yet another embodiment, Module 1 1406 may be comprised of Modules A, B, and C described with respect to FIG. 24.

In FIG. 25, Module A 1550 determines the penetration depth through the representative tintable window. The penetration depth predicted by Module A 1550 is at the future time. Module A 1550 calculates the penetration depth based on the determined position of the sun (i.e. sun azimuth and sun altitude) received from the solar position calculator 1512 and based on the position of the representative tintable window, acceptance angle, dimensions of the window, orientation of the window (i.e. direction facing), and the details of any exterior shading retrieved from the zone/group data 1508.

Module A 1550 then determines the tint level that will provide occupant comfort for the calculated penetration depth. Module A 1550 uses the occupancy lookup table retrieved from the zone/group data 1508 to determine the desired tint level for the space type associated with the representative tintable window, for the calculated penetration depth, and for the acceptance angle of the window. Module A 1550 outputs a tint level at step 1552.

The maximum clear sky irradiance incident the representative tintable window is predicted for all times in the logic 1554. The clear sky irradiance at the future time is also predicted based on the latitude and longitude coordinates of the building and the representative window orientation (i.e. direction the window is facing) from the site data 1506 and the zone/group data 1508. These clear sky irradiance calculations can be performed by the sun position calculator 1512 in other embodiments.

Module B 1556 then calculates new tint levels by incrementally increasing the tint level. At each of these incremental steps, the Inside Irradiance in the room based on the new tint level is determined using the equation: Inside Irradiance=Tint level SHGC×Clear Sky Irradiance. Module B selects the tint level where Inside Irradiance is less than or equal to Datum Inside Irradiance (Datum SHGC×Max. Clear sky Irradiance) and the tint level is not lighter than Tint Level from A. Module B 1556 outputs the selected tint level from B. From the Tint level from B, logic 1558 calculates the outside irradiance and the calculated skylight irradiance.

Module C 1560 makes a determination of whether a sensor reading of irradiance is less than the clear sky irradiance. If the determination result is YES, then the tint level being calculated is made incrementally lighter (clearer) until the value matches or is less than a tint level calculated as Sensor Reading×Tint Level SHGC, but not to exceed datum inside Irradiance from B. If the determination result is NO, then the tint level being calculated is made darker in incremental steps as done in Module B 1556. Module C outputs the tint level. Logic 1562 determines that the tint level from Module C is the final tint level and returns this final tint level (Tint level from Module C) to the schedule logic 1518 of the window controller 1410.

In one aspect, Module 1 1406 may also include a fourth Module D that can predict the effects of the surrounding environment on the intensity and direction of sunlight through the tintable windows in the zone. For example, a neighboring building or other structure may shade the building and block some light from passing through the windows. As another example, reflective surfaces (e.g., surfaces having snow, water, etc.) from a neighboring building or other surfaces in the environment surrounding the building may reflect light into the tintable windows. This reflected light can increase the intensity of light into the tintable windows and cause glare in the occupant space. Depending on the values of the intensity and direction of sunlight predicted by Module D, Module D may modify the tint level determined from Modules A, B, and C or may modify certain determinations from Modules A, B, and C such as, for example, the penetration depth calculation or the acceptance angle of the representative window in the Zone/Group data.

In some cases, a site study may be conducted to determine the environment surrounding the building and/or one or more sensors may be used to determine the effects of the surrounding environment. Information from the site study may be static information based on predicting the reflectance and shading (surrounding) effects for a time period (e.g., a year), or may be dynamic information that can be updated on a periodic basis or other timed basis. In one case, Module D may use the site study to modify the standard acceptance angle and associated $\theta_1$ and $\theta_2$ of the representative window of each zone retrieved from the Zone/group data. Module D may communicate this modified information regarding the representative windows other modules of the predictive control logic. The one or more sensors employed by Module D to determine the effects of the surrounding environment may be the same sensors used by other modules (e.g., by Module C) or may be different sensors. These sensors may be specifically designed to determine the effects of the surrounding environment for Module D.

To operate the predictive control logic shown in FIG. 25, the user first prepares a schedule with details of the times and dates, zones, sensors, and programs used. Alternatively, a default schedule may be provided. Once the schedule is in place (stored), at certain time intervals (every 1 minute, 5 minutes, 10 minutes, etc.) the time of day portion 1510 determines a future time of day based on the current time and the transition time of the EC device(s) 400 in the representative window or each zone in the schedule. Using the zone/group data 1508 and site data 1506, the solar position calculator 1512 determines the solar position at the future (look ahead) time for each representative window of each zone in the schedule. Based on the schedule prepared by the user, the intelligence logic 1520 is used to determine which program to employ for each zone in the schedule. For each zone, the scheduled program is employed and predicts an appropriate tint level for that future time. If there is an override in place, an override value will be used. If there is no override in place, then the tint level determined by the program will be used. For each zone, the window controller 1410 will send control signals with the zone-specific tint level determined by the scheduled program to the associated EC device(s) 400 to transition the tint level of the tintable window(s) in that zone by the future time.

E. Filter(s) for Making Tinting Decisions Based on Rapidly Changing Conditions

In some systems, once a decision is made to tint a tintable window to a particular end state, the window is committed to complete that transition until reaching the end state. Such systems cannot adjust the final tint state during transition, and can only wait until transition is complete. If an unsuitable end tint state is selected by these systems, the window is committed to this unsuitable tint level during the transition cycle and additionally any time that it takes to transition the window to a more appropriate tint level. Since tint/clear times take 5 to 30 minutes, for example, an unsuitable selection could tie up a window in an inappropriate tint level for a substantial period of time which could make conditions uncomfortable for the occupant.

Rapidly changing conditions (e.g., weather change such as intermittent clouds on a sunny day, a fog bank moving in or out, fog burning off to sunshine, etc.) combined with long transition times can cause control methods to "bounce" between end tint states. In addition, such control methods can decide on an end tint state based on a condition that changes immediately after the method commits to the transition, in which case the window is locked into an unsuitable tint level until the transition is complete. For example, consider a mostly sunny day with dappled clouds. A control method may react to a drop in illumination values when a cloud passes by and when the values rebound, glare conditions could exist. Even though the cloud passes by quickly, the window is committed to transitioning to the inappropriately low end tint state for at least the duration of the transition cycle. During this time, solar radiation enters the room which could also make it uncomfortably warm for the occupant.

An example of a rapidly changing weather condition is a foggy morning that breaks into sunshine. Certain systems would determine a low tint level at the beginning of the day based on the low illumination readings during the morning fog. This low tint level would be inappropriately low during the period when the weather quickly transitions to clear sky after the fog burns off. In this example, a more appropriate higher tint level for the clear sky may not be determined for a substantial period of time (e.g., 35-45 minutes). Another example of a rapidly changing condition is the onset of a reflection from an object such as, for example, a parked car or an adjacent building's window.

Certain embodiments described herein include window control methods that use multiple filters to make tinting decisions that address rapidly changing conditions. In certain cases, these filters can be used to determine a more appropriate end tint state during a current transition cycle to adjust the tint level of the window to a level appropriate for current conditions. One type of filter is a box car filter (sometimes called a sliding window filter), which employs multiple sensor readings of illumination values running in time. A box car value is a calculated central tendency (e.g., mean, average, or median) of a number, n, of contiguous sensor samples (readings of illumination values over time). Typically, the sensor samples are measurements of external radiation (e.g., by a sensor located on the outside of a building). A single sensor can be used to take sensor samples for multiple windows such as windows in a particular zone of a building. The sensor readings generally take readings on a periodic basis at a uniform frequency (sampling rate). For example, the sensor may take samples at a rate in the range of about one sample every 30 seconds to one sample every twenty minutes. In one embodiment, a sensor takes samples at a rate of one sample every minute. In some cases, one or more timers may also be used to maintain the tint at a current setting determined using a box car value.

In certain aspects, control methods use a short box car and one or more long box cars (filters) to make tinting decisions. A short box car (e.g., one that employs sample values taken over 10 minutes, 20 minutes, 5 minutes, etc.) is based on a smaller number of sensor samples (e.g., n=1, 2, 3, . . . 10, etc.) relative to the larger number of sensor samples (e.g., n=10, 20, 30, 40, etc.) in a long box car (e.g., one that employs sample values taken over 1 hour, 2 hours, etc.). In one case, a short box car value is a median value of sensor samples and a long box car value is an average value of sensor samples. Since a short box car value is based on a smaller number of sensor samples, short box car values more closely follow the sensor readings than long box car values. Thus, short box car values respond to rapidly changing conditions more quickly and to a greater degree than the long box car values. Although both the calculated short and long box car values lag behind the sensor readings, the short box car will lag behind to a lesser extent than the long box car.

Short box cars react more quickly than long box cars to current conditions. A long box car filter smoothes the window controller response to frequent short duration weather fluctuations, while a short box car does not smooth so well but responds better to rapid and significant weather changes. In the case of a passing cloud, a control algorithm using the long box car illumination value will not react quickly to the current passing cloud condition. In this case, the long box car illumination value should be used in tinting decisions to determine an appropriate high tint level. In the case of fog burning off, it may be more appropriate to use the short term box car illumination value in tinting decisions. In this case, the short term box car reacts more quickly to the new sunny condition after the fog burns off. By using the short term box car value to make tinting decisions, the tintable window quickly adjusts to the sunny condition and keeps the occupant comfortable as the fog rapidly burns off.

In certain aspects, control methods evaluate the difference between the short and long term box car values to determine which illumination value to use in tinting decisions. When the difference (short term value minus long term value) is positive and exceeds a first (positive) threshold (e.g., 20 W/m$^2$), the value of the short term boxcar is used to calculate a tint value. Note that a positive value corresponds to a transition to brightening (a greater radiant intensity outside the window). In some implementations, a first timer is set when the positive threshold is exceeded, in which case a currently calculated tint value is maintained for a prescribed amount of time of the first timer. Using the first timer will favor glare control by holding the window in a more tinted state and preventing too many transitions that may annoy an occupant. On the other hand, when the difference between the short car and long car values is less than the threshold (or negative), the long term box value is used to calculate the next tint state. And if the difference is negative and greater than a second (negative) threshold, then a second timer may be set. The positive threshold values may be in the range of about 1 Watts/m$^2$ to 200 Watts/m$^2$ and the negative threshold values may be in the range of about −200 Watts/m$^2$ to −1 Watts/m$^2$. The calculated tint value based on the long box car is maintained during a prescribed amount of the time of the second timer. Once the control method determines which box car value to use, the method will make tinting decisions based on whether the box car value is above an upper limit, below a lower limit, or between the upper and lower limits. If above the upper limit, Modules A and B (or just B in some cases) are used to determine tint change. If above the lower limit and below the upper limit, Modules A, B, and C (or just B and C in some cases) are used to determine tint change. If below the lower limit, a defined tint level is applied (e.g., nominally clear). In certain cases, the lower limit may be in the range of 5 Watts/m$^2$ to 200 Watts/m$^2$ and the upper limit may be in the range of 50 Watts/m$^2$ to 400 Watts/m$^2$.

Figure 26A:
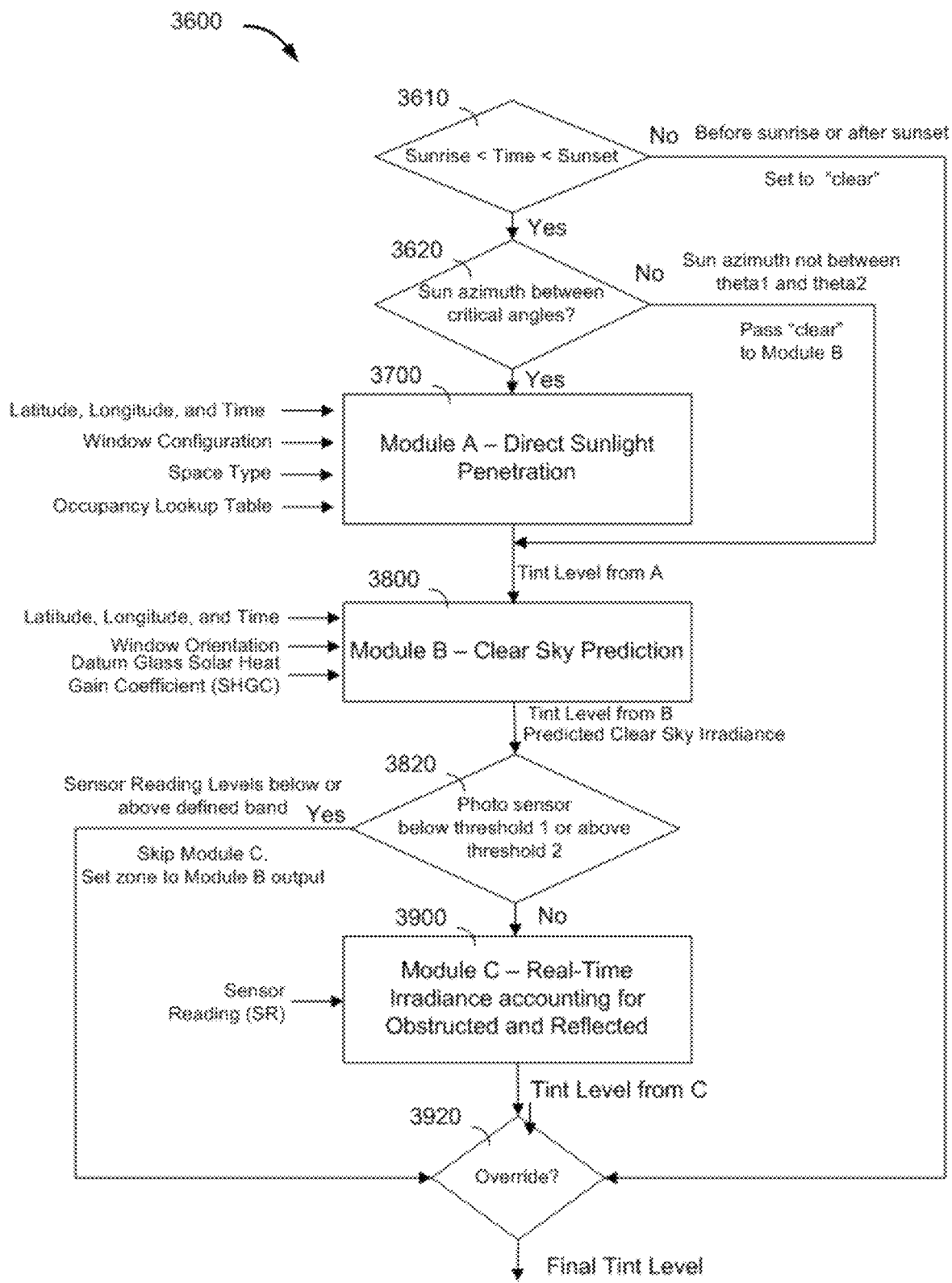
FIG. 26A is a flowchart showing a particular implementation of a portion of the control logic shown in FIG. 17.

FIG. 26A is a flowchart 3600 showing a particular implementation of the control logic shown in FIG. 17. At step 3610, the control method determines whether the time is between sunrise and sunset. If it is either before sunrise or after sunset at step 3610, the control method clears the tint in the window and proceeds to step 3620 to determine whether there is an override. If it is determined to be between sunrise and sunset at step 3610, the control method determines whether the sun azimuth is between critical angles (step 3620). FIG. 27B depicts a room having a desk and critical angles of the tintable window in the room. If the sun azimuth is within the critical angles, sun is shining onto an occupant sitting at the desk. In FIG. 27B, the sun azimuth is shown outside the illustrated critical angles. Returning to the flowchart in FIG. 26A, if it is determined at step 3620 that the sun azimuth outside the critical angles, Module A is not used and Module B is used at step 3800 is used. If it is determined that the sun azimuth between the critical angles, Module A is used at step 3700 and Module B is used at step 3800. At step 3820, the control method determines whether the sensor value is below a threshold 1 or above a threshold 2. If the sensor value is below threshold 1 or above threshold 2, Module C (step 3900) is not used. If the sensor value is above threshold 1 and below threshold 2, Module C is used. In either case, the control method proceeds to step 3920 to determine whether there is an override in place.

Figure 26B:
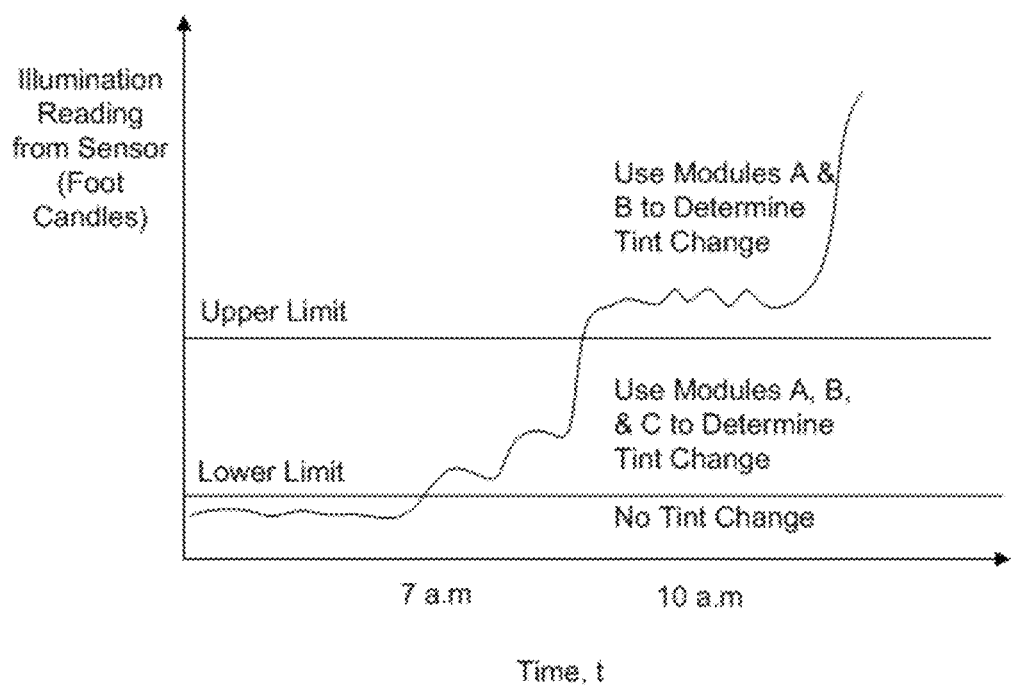
FIG. 26B is a graph of illumination readings during a day that is cloudy early in the day and then sunny later in the day and the corresponding upper and lower limits.

FIG. 26B is a graph of illumination readings from a sensor taken during a day that is cloudy (e.g., foggy) early in the day and sunny (clear sky) later in the day. As shown, the values of the illumination readings are below a lower limit before 7 a.m., rise above the lower limit and then above the upper limit, and then as the clouds burn off after 10 a.m. the illumination readings become much higher later in the day. While the sensor reads illumination levels below a lower limit (e.g., 10 Watts/m$^2$) before 7 a.m., the amount of radiation through the tintable window is not significant enough to affect occupant comfort. In this case, a re-evaluation of tint level does not need to be made and a defined tint level (e.g., maximum window transmissivity) is applied. While the sensor reads between the lower and upper limit (e.g., 100 Watts/m$^2$) after 7 a.m. and before 10 a.m., modules A, B, and C will be used to calculate an end tint state. While the sensor reads above the upper limit (e.g., 100 Watts/m2) after 10 a.m., modules A and B will be used to calculate an end tint state.

Figure 27A:
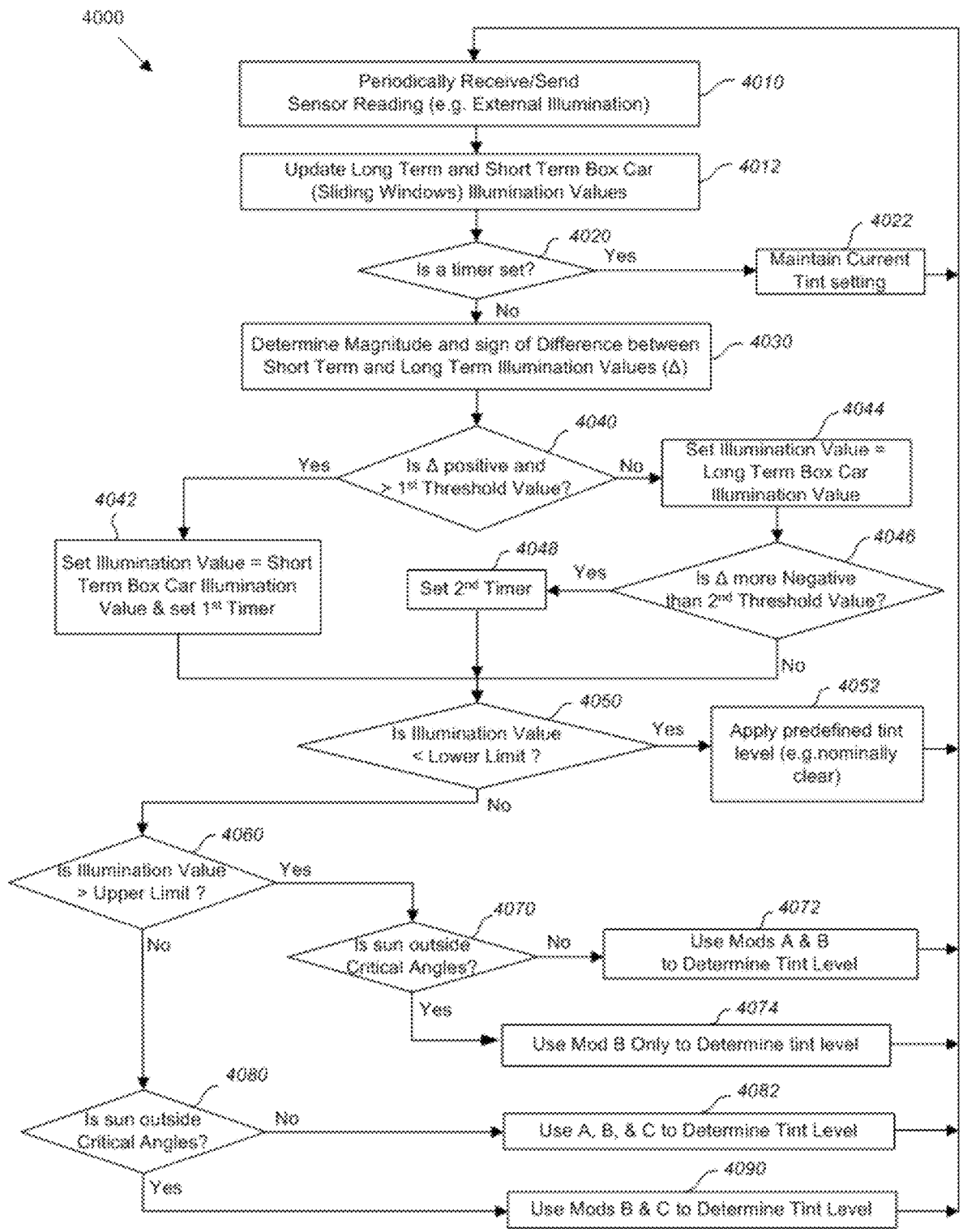
FIG. 27A is a flowchart of a control method that uses box car values to make tinting decisions, according to embodiments.
Figure 27B:
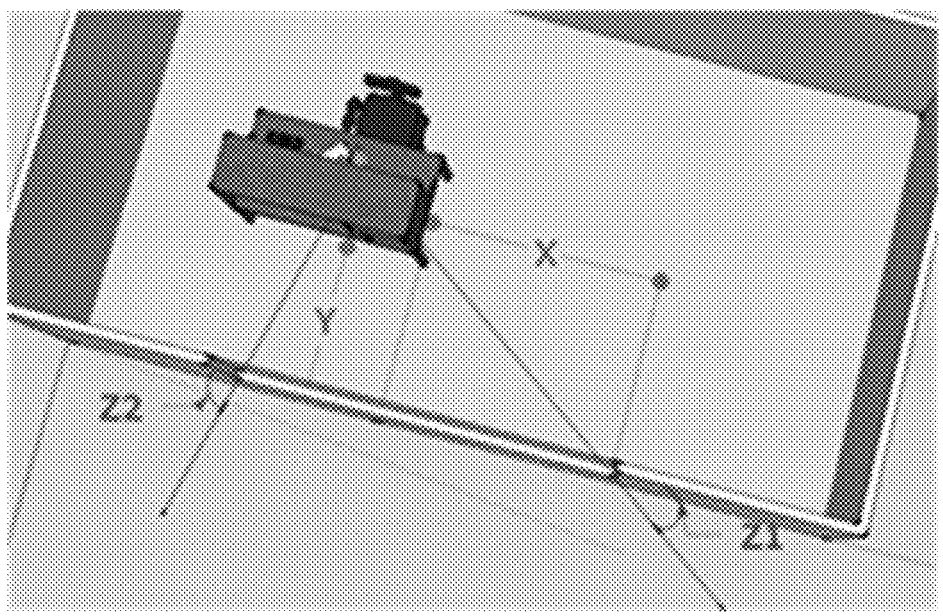
FIG. 27B depicts a room having a desk and the critical angle of the room within which the sun is shining onto an occupant sitting at the desk

FIG. 27A is a flowchart 4000 of a control method that uses short and long box car values to make tinting decisions, according to some embodiments. Although the flowchart is shown using one short term box car value and one long term box car value, other embodiments may include use more box car values such as, for example, a second long term box car value. The illustrated control method periodically receives sensor readings of illumination values and updates the long term and short term box car values. If a timer is set, then current tint level will be maintained at the current tint setting. The method evaluates the difference between the short and long term box car values to determine which box car value to use as an illumination value in tinting decisions. If the difference between the values is greater than a threshold value, the short term box car value is used and a timer is set during which the current tint setting will be maintained. If the difference between the values is lower than the threshold value, the long term box car value is used and a different timer may be set (depending on the magnitude of the difference). Using the previously determined box car value as the illumination level, the method determines whether the illumination value is below a lower tint level and if so, a defined tint level is applied (e.g., nominally clear). If the illumination value is above the upper limit, the method determines whether the sun is outside the critical angle. FIG. 24B depicts a room having a desk and the critical angle of the room within which the sun is shining onto an occupant sitting at the desk. In the illustration, the sun is outside the critical angle. If the method determines that the sun is outside the critical angle, only Module B is used to determine tint level. If within the critical angle, Modules A and B are used to determine tint level. If the illumination value is above the lower limit and below the upper limit, the method determines whether the sun is outside the critical angle. If outside the critical angle, Modules B and C are used to determine tint level. If within the critical angle, Modules A, B, and C are used to determine tint level.

More specifically with reference back to FIG. 27A, sensor readings of illumination values (e.g., external radiation readings) are sent by the sensor and received by the processor at step 4010. Generally, the sensor takes samples on a periodic basis at a uniform rate (e.g., one sample taken every minute). At step 4012, the long term and short term box car illumination values are updated with the received sensor readings. In other words, the oldest values in the box car filters are replaced with the newest value and new box car illumination values are calculated, usually as central tendencies of samples in the box cars. At step 4020, it is determined whether a timer is set. If a timer is set, then the current tint setting is maintained at step 4022 and the process returns to step 4010. In other words, the process does not calculate a new tint level. If a timer is not set, the magnitude and sign of the difference between the short term and long term box car illumination values (Δ) is determined at step 4030. That is, Δ=Short Term Box Car value−Long term Box Car value. At step 4040, it is determined whether Δ is positive and greater than a first threshold value. If Δ is positive and greater than a first threshold value, then the illumination value for the system is set to short term box car illumination value and a first timer is set at step 4042 and the method proceeds to step 4050. If Δ is not positive and greater than the first threshold value, then the illumination value for the system is set to the long term box car illumination value at step 4044. At step 4046, it is determined whether Δ is more negative than a second threshold value. If Δ is more negative than the second threshold value, then a second timer is set at 4048, and the method proceeds to step 4050. If not, the method directly proceeds to step 4050. At step 4050, it is determined whether the set illumination value for the system is less than a lower limit. If the set illumination value for the system is less than the lower limit, a defined tint level (e.g., nominally clear) is applied at step 4052 and the process returns to step 4010. If the set illumination value for the system is greater than a lower limit, it is determined whether the set illumination value for the system is greater than an upper limit at step 4060. If it is determined that the set illumination value for the system is greater than an upper limit, then it is determined whether the sun azimuth is outside the critical angles at 4070. If the sun is not outside the critical angles, Modules A and B are used to determine a final tint level applied to the tintable window and the process returns to step 4010. If the sun is outside the critical angles, only Module B is used to determine the final tint state at step 4074 and the process returns to step 4010. If it is determined that the set illumination value for the system is not greater than an upper limit at step 4060, then it is determined whether the sun is outside the critical angle at 4080. If the sun is not outside the critical angle, Modules A, B, and C are used to determine a final tint level at step 4082 applied to the tintable window and the process returns to step 4010. If the sun is outside the critical angles, only Modules B and C are used to determine the final tint level at step 4090 applied to the tintable window and the process returns to step 4010.

Figure 28A:
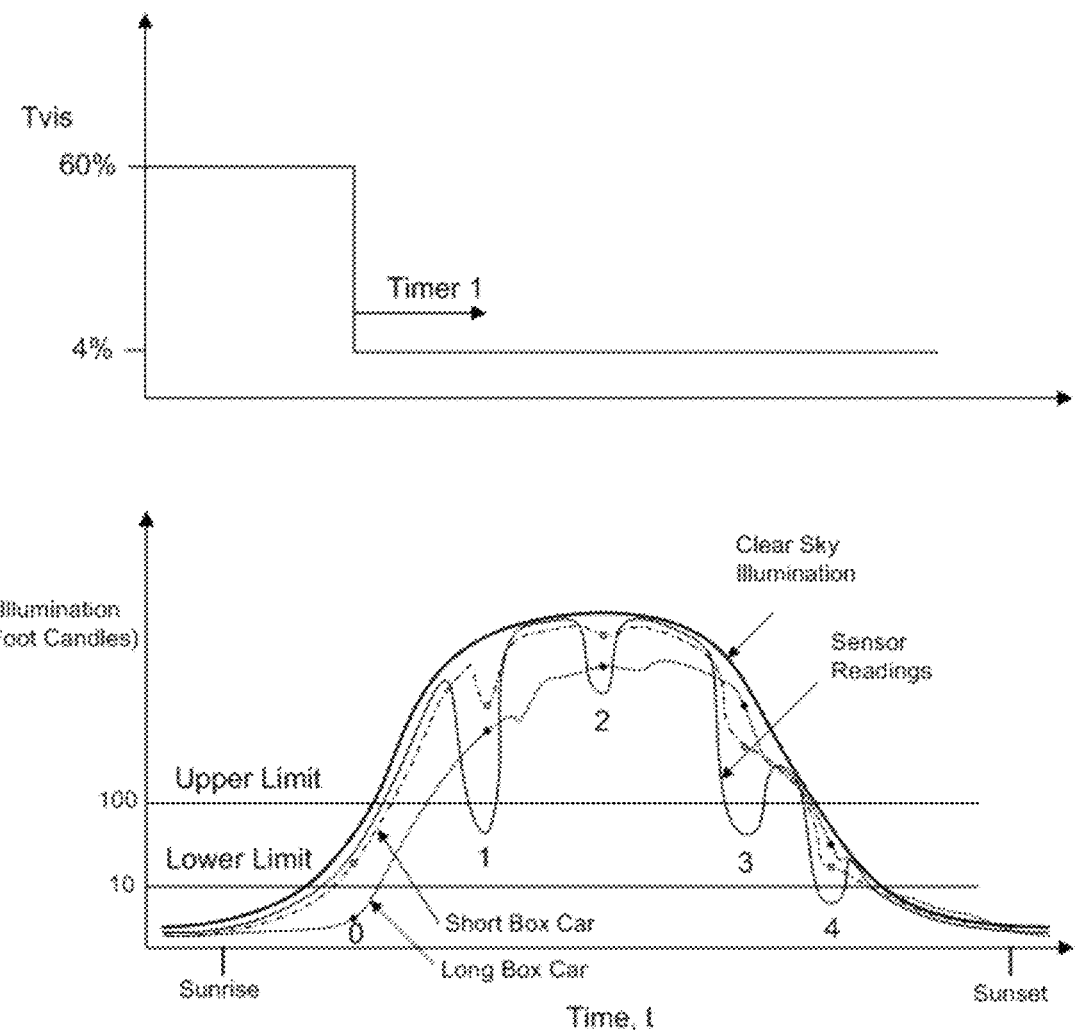
FIG. 28A depicts two graphs associated with sensor readings during a regular day and the associated determined tint states determined of a control method using box car filters, according to embodiments.

FIG. 28A depicts two graphs associated with sensor readings during a regular day and the associated tint states determined by the control method described with reference to FIG. 27A. The bottom graph shows sensor readings at time, t, over the day. The bottom graph also includes a bell-shaped curve of clear sky illumination values over time, t, for reference purposes. The particular bell-shaped curve would be an example of values at a south facing window (because the bell is roughly centered in the dawn to dusk time scale) with critical angles of 90 (East) to 270 (West). The bottom graph also includes a curve of sensor readings taken over time, t during a day when the weather periodically deviates from clear sky. The sensor readings are typically measurements of external radiation. The bottom graph also includes curves of updated short box car values and long box car values calculated at time, t. These values are usually calculated as central tendencies of the samples in the box cars updated at time, t. The curve of sensor readings also shows drops in illumination at the passing of four clouds 1, 2, 3, and 4, and then returning to sunshine after each of the clouds pass. The short box car curve follows the sensor reading curve and reacts quickly to the drops in illumination from the four clouds. The long box car values lag behind the sensor readings and do not react to the same extent to the drops in illumination from the clouds. The top graph shows the tint state transmission ($T_{vis}$) through the tintable window calculated by the control method at time, t. Until just before event 0, the positive difference between the short term box car value and the long term box car value is less than a (positive) threshold value (e.g., 20 Watts/m²), and the illumination value is set to the updated long box car value. Since the illumination value is below the lower limit, a defined tint level (nominally clear state) associated with a $T_{vis}$ of 60% is applied. As shown, the control method applies $T_{vis}$ of 60% until the positive difference between the short term box car value and the long term box car value is greater than a (positive) threshold value (e.g., 20 Watts/m²), and then the illumination value is set to the short box car value (event 0). At this time, Timer 1 is set and the tint state calculated at event 0 is maintained until Timer 1 expires just after cloud 1 passes. Since the illumination value (based on the short box car value) is greater than the lower limit and less than the high limit and the sun is within the critical angles, Modules A, B, and C are used to determine a tint level at event 0 corresponding to $T_{vis}$ of 20%. Thereafter, the value of the short box car passes the upper level, triggering a calculation based on Modules A and B only. No change in tint level occurs since Timer 1 is set. Just after the time Cloud 1 passes, Timer 1 expires. From this time until just before cloud 3, the positive difference between the short term box car value and the long term box car value is greater than the positive threshold value and the illumination value is set to the updated short term box car value. During this time, the illumination values (based on the updated short term box car values) remain above the upper limit and the sun remains within the critical angles, and so Modules A and B are again used to determine a tint level and they calculate a tint level corresponding to $T_{vis}$ of 4%. At Cloud 3, the long box car value is greater than the short box car value and the difference is now negative and so the illumination value is set to the long box car value. Since the difference is less negative than the (negative) threshold value, no timer is set. Since the illumination value is greater than the upper limit and the sun is outside the critical angles, Modules A and B are again used to determine tint level. At Cloud 4, the long box car value is again greater than the short box car value, and the difference is less negative than the (negative) threshold value. At this time, the illumination value is set to the updated long box car value, but no timer is set. Since the illumination value is greater than the low limit and less than the high limit and the sun is outside the critical angles, Modules A, B, and C are used to determine a tint level and they calculate a tint level corresponding to a $T_{vis}$ of 40%.

Figure 28B:
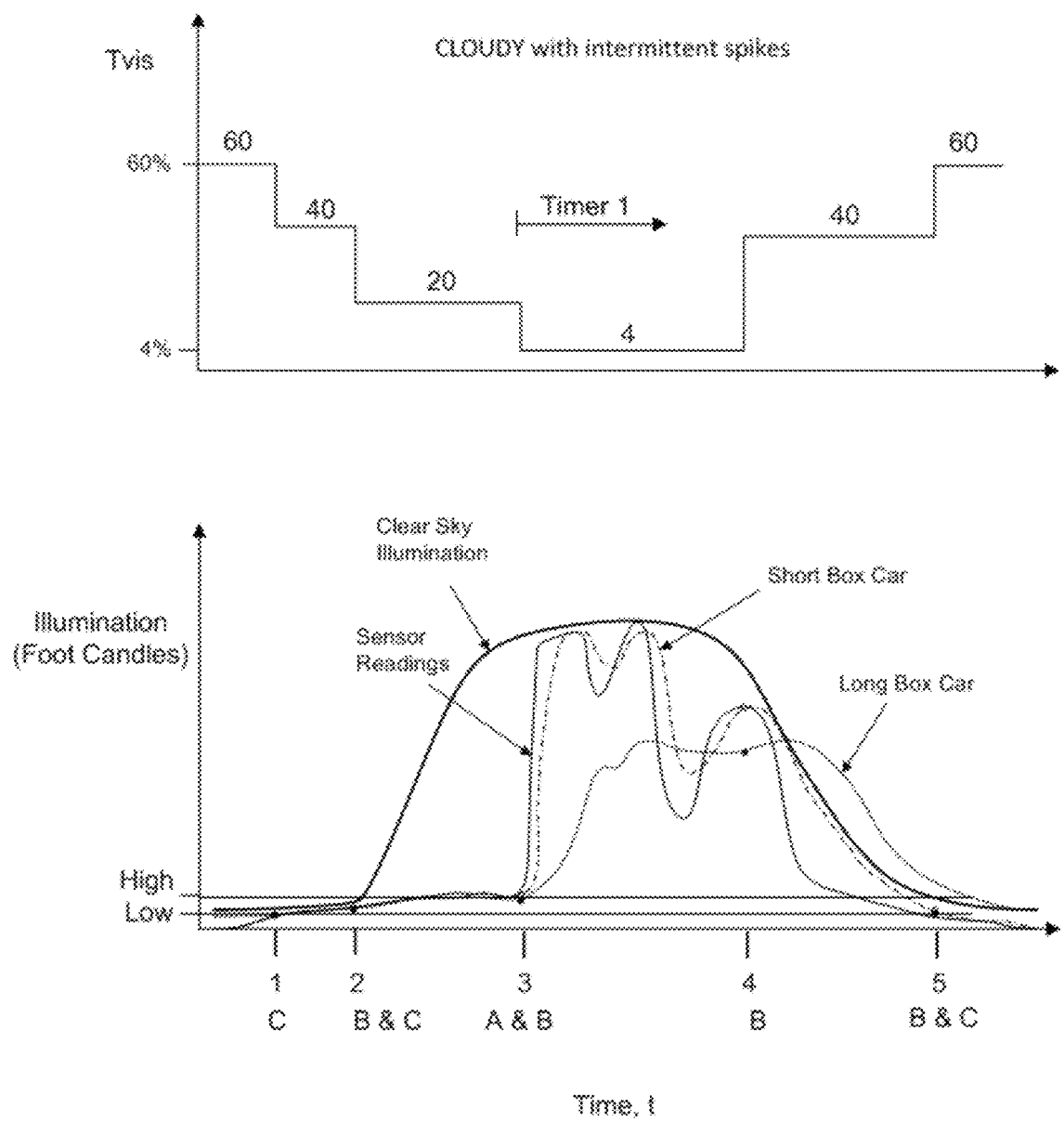
FIG. 28B depicts two graphs associated with sensor readings during a cloud day with intermittent spikes and the associated determined tint states determined of a control method using box car filters, according to embodiments.

FIG. 28B depicts two graphs associated with sensor readings during a cloudy day with intermittent spikes and the associated tint states determined by the control method described with reference to FIG. 27A. The bottom graph shows sensor readings at time, t, over the cloudy day. The bottom graph also includes a bell-shaped curve of clear sky illumination values over time, t, for reference purposes. The bottom graph also includes curves of updated short box car values and long box car values calculated at time, t. The curve of sensor readings shows that conditions are cloudy in the morning until point 3 when it becomes sunny for a short period with two drops before becoming cloudy again. The top graph shows the tint state transmission $T_{vis}$ through the tintable window calculated by the control method at time, t. Before point 1, the positive difference between the short term box car value and the long term box car value is less than the threshold value, and illumination value is set to the long box car value. Since the illumination value is below the lower limit, a defined tint level (nominally clear) associated with a $T_{vis}$ of 60% is applied. At point 1, the difference between the short term and long term box car values is positive and less than a threshold value, and the illumination value is set to the updated long box car value. In this case, the illumination value is between the lower and upper limit and it is early in the day so that the sun is outside the critical angles so that Module A does not need to be used to determine penetration depth. In this case, only Modules B and C are used and they calculate the tint level at $T_{vis}$ of 40% to darken the window. At point 2, the difference between the short term and long term box car values is positive and less than a threshold value, and the illumination value is set to the updated long box car value. At this point, it is still early in the day and the sun is outside the critical angles. The illumination value is higher than it was at point 1, but still between the upper and lower limit, and Modules B and C determine a tint level at $T_{vis}$ of 20% to darken the window further. At point 3, the difference between the short term and long term box car values is positive and greater than a threshold value, and so the illumination value is set to the updated short box car value and Timer 1 is set. Since the illumination value is above the upper limit and the sun is within the critical angles, Modules A and B are used to determine increase the tint to a tint level corresponding to $T_{vis}$ of 4%. During the timer's length, the tint state will be maintained. Just before point 4, Timer 1 expires. At point 4, the positive difference between the short term and long term box car values is greater than a (positive) threshold value, and the illumination value is set to the updated short box car value. The illumination value is above the lower limit and the sun is outside the critical angles at this time of day so that only Module B is used to determine a tint level corresponding to $T_{vis}$ of 40%. At point 5, the positive difference between the short term and long term box car values is less than the threshold value, and the illumination value is set to the updated long box car value. No timer is set. At this point late in the day, the illumination value is below the lower limit and Modules B and C are used to determine a tint level corresponding to $T_{vis}$ of 60%.

Figure 29A:
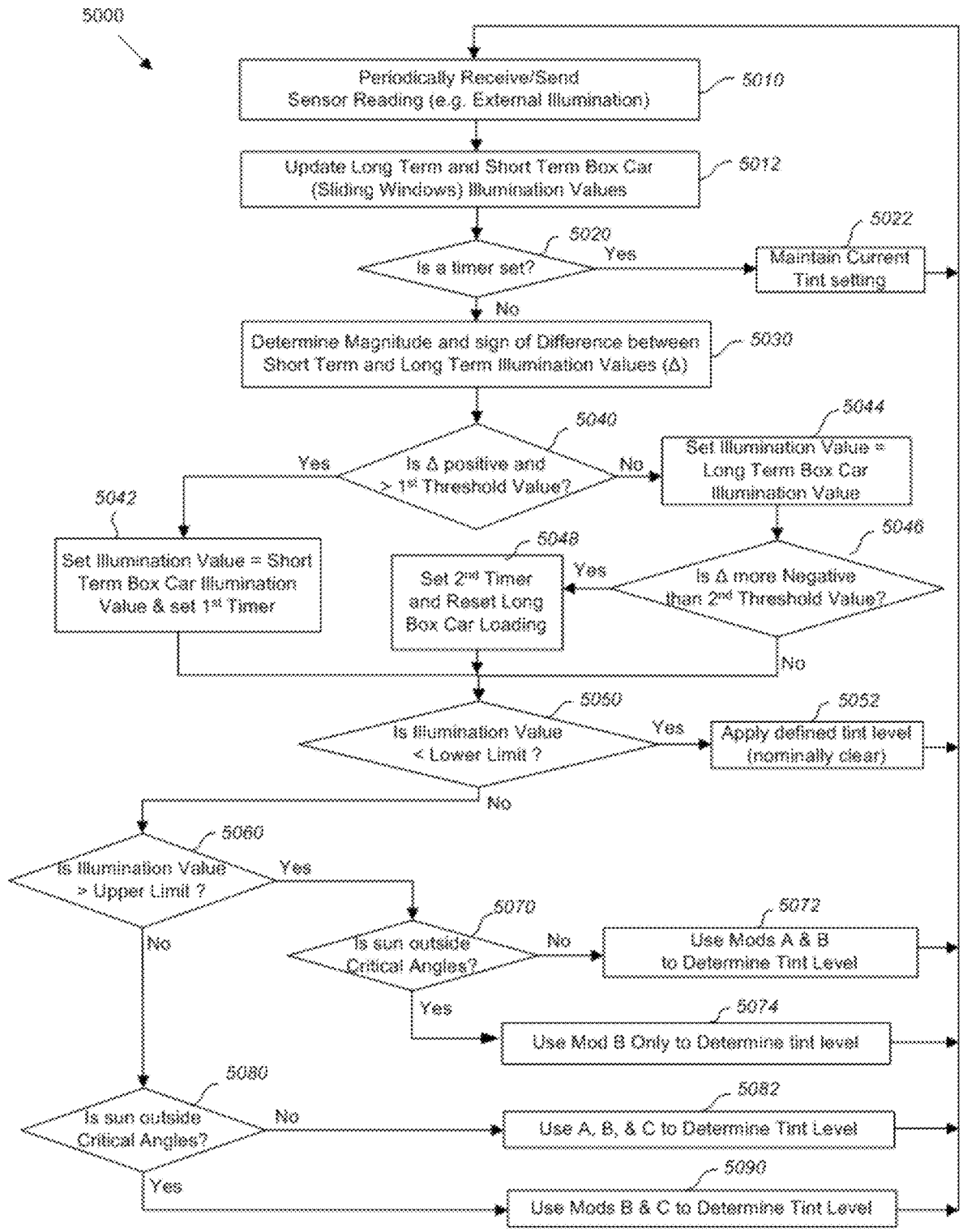
FIG. 29A is a flowchart of a control method that uses box car values to make tinting decisions, according to embodiments.
Figure 29B:
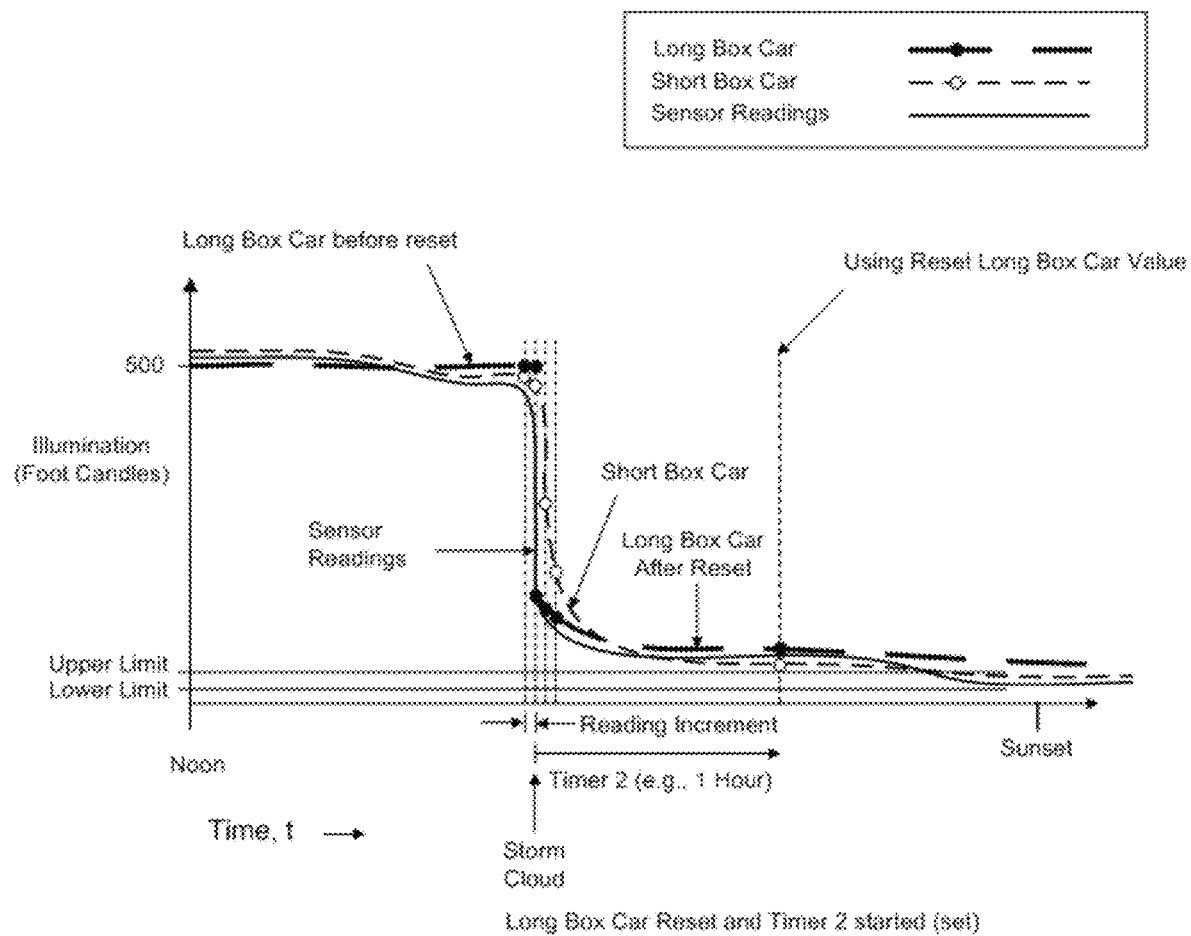
FIG. 29B is a plot of illumination values including sensor readings, short box car values, and long box car values determined during time, t, during a day.
Figure 30A:
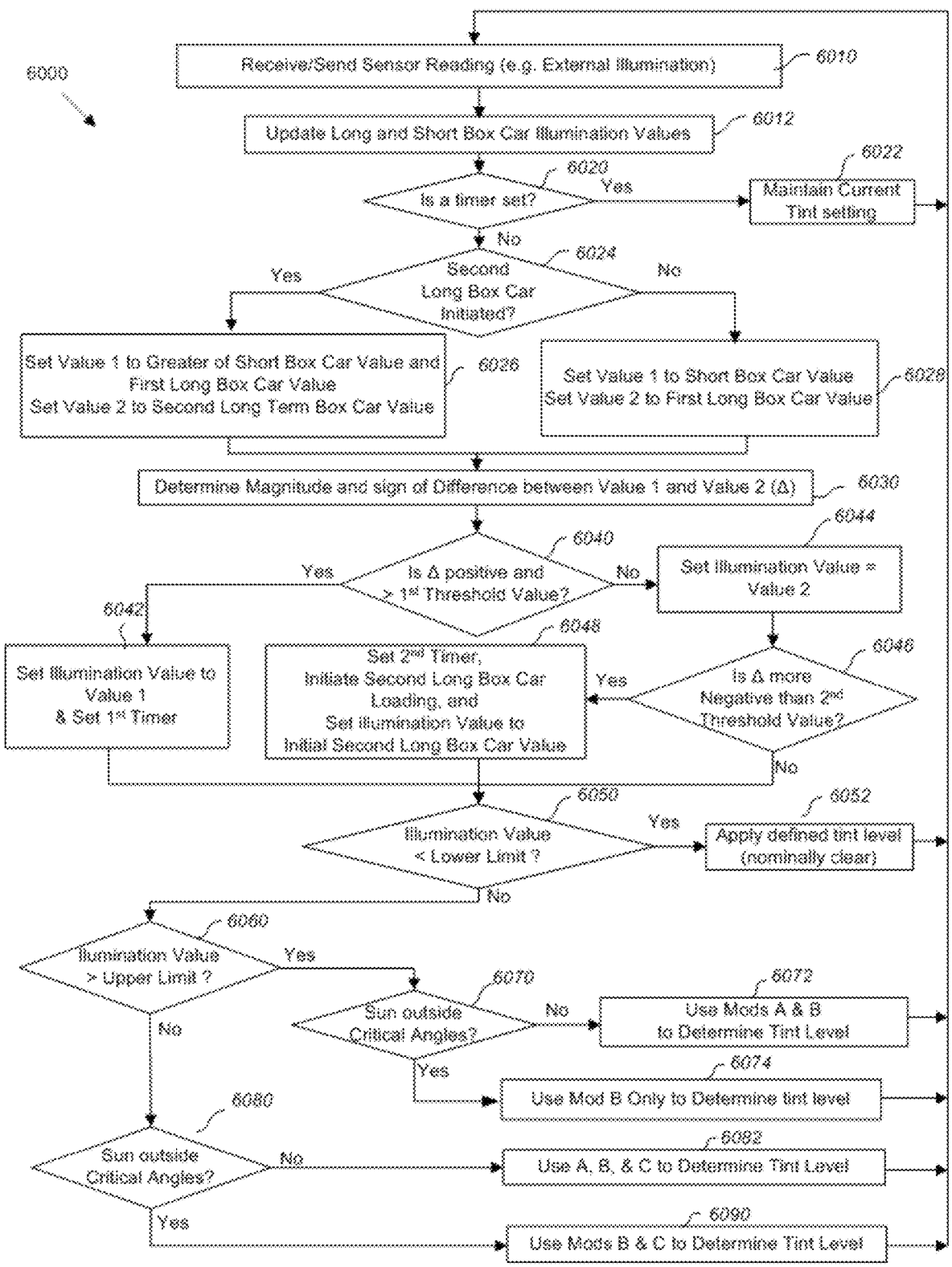
FIG. 30A is a flowchart of a control method that uses box car values to make tinting decisions, according to embodiments.
Figure 30B:
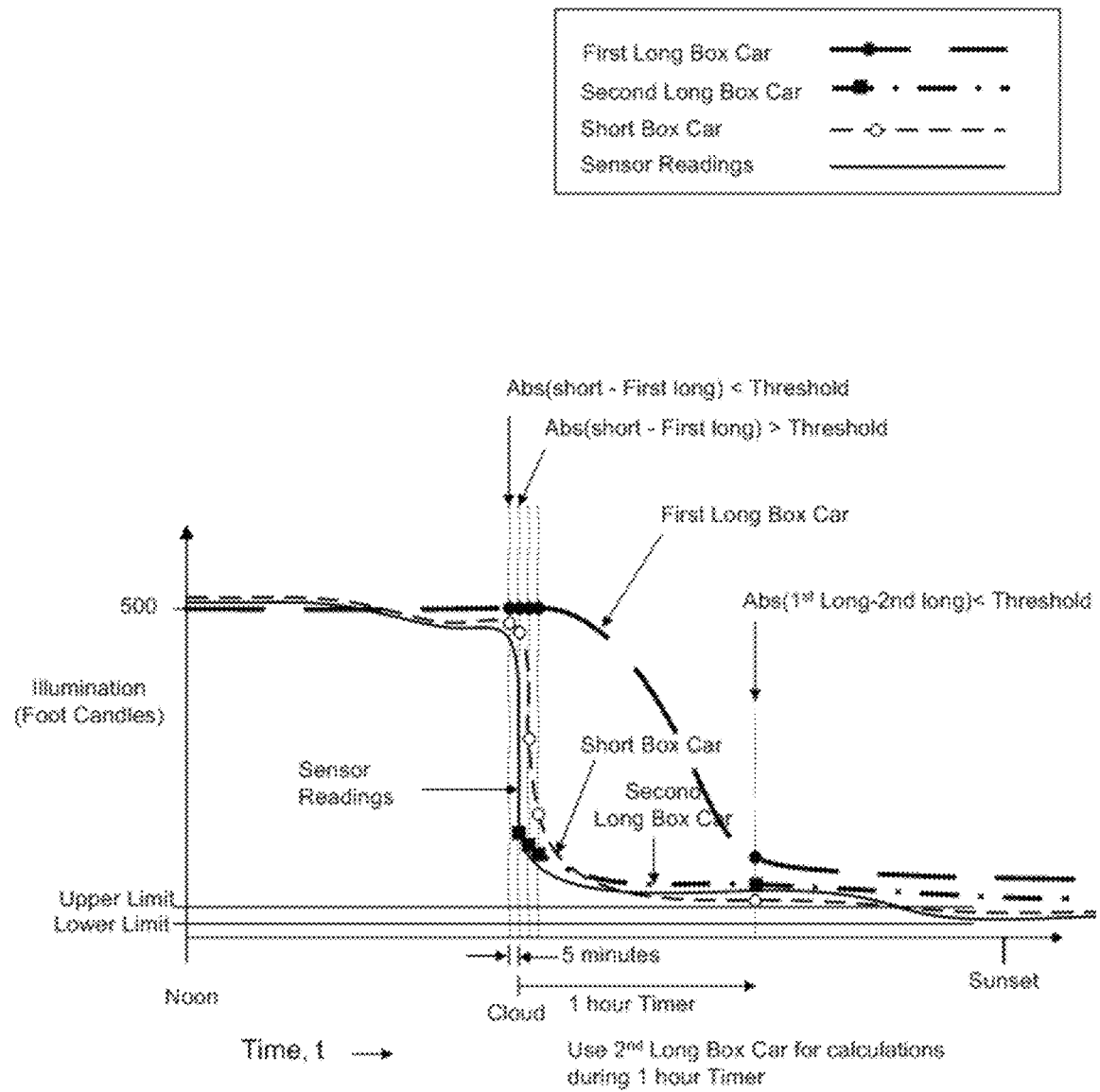
FIG. 30B is a plot of illumination values including sensor readings, short box car values, and long box car values determined during time, t, during a day.

In some control methods, the long box car value is updated with sensor readings and is never reset during the day. If sensor readings were to change significantly during the day (e.g., when a storm front arrived), these long box car values would lag substantially behind the rapid change in sensor readings and would not reflect the rapid change. For example, the long box car values are significantly higher than the sensor readings after a substantial drop in external illumination. If these high long box car values are used to calculate a tint level, the windows may be over-tinted until the long box cars had time to load with more current sensor readings. In certain aspects, control methods reset the long box car after a rapid change in illumination so that the long box car can be loaded with more current sensor readings. FIGS. 29A-29B are illustrations of control methods that reset loading of the long box car. In other aspects, control methods use a second long box car that is initiated with a significant change in illumination condition. FIGS. 30A-30B are illustrations of control methods that have a second long box car. In these cases, the control methods can use long box car values that are closer to the current sensor readings and may avoid overtinting the windows after a rapid drop in illumination.

FIG. 29A is a flowchart 5000 of a control method that resets loading of a long box car, according to embodiments. The long box car is reset and starts reloading current sensor readings after a rapid change in sensor readings. The long box car is reset when the negative difference between the short box car value and long box car value is greater than a threshold value. That is, a negative difference greater than the threshold value indicates a rapid change in sensor readings. At the same time, the control method starts a second timer. The control method uses the reset long box car value to calculate tint level that will be maintained during the second timer. Since the long box car starts reloads with new sensor readings when the conditions change, the long box car value closely follows sensor readings for a time and the control method will determine tint levels that closely correspond to the rapidly changing sensor readings.

More specifically with reference back to FIG. 29A, sensor readings of illumination values are sent by the sensor and received by the processor at step 5010. At step 5012, the long term and short term box car illumination values are updated with the received sensor readings. If it is determined at step 5020 that a timer is set, then the current tint setting is maintained (i.e. no calculation of a new tint level) at step 5022 and the process returns to step 5010. If is determined that a timer is not set at step 5020, then the magnitude and sign of the difference between the short term and long term box car illumination values ($\Delta$) is determined at step 5030. That is, $\Delta$=Short Term Box Car value−Long Term Box Car value. If it is determined at step 5030 that $\Delta$ is positive and greater than a first threshold value, then the illumination value is set to the short term box car illumination value, a first timer is set at step 5042, and the method proceeds to step 5050. If it is determined at step 5030 that $\Delta$ is positive and less than the threshold value or a negative value, then the illumination value is set to the long term box car illumination value at step 5044. At step 5046, it is determined whether $\Delta$ is more negative than a second threshold value. If $\Delta$ is more negative than the second threshold value, then there has been a significant drop in illumination. In this case, a second timer is set and the long box car is reset at step 5048 to start loading again, and the method proceeds to step 5050. If $\Delta$ is not more negative than the second threshold value, the method directly proceeds to step 5050. At step 5050, it is determined whether the set illumination value is less than a lower limit. If less than the lower limit, a defined tint level (e.g., nominally clear) is applied at step 5052 and the process returns to step 5010. If the set illumination value for the system is greater than a lower limit, it is determined whether the set illumination value for the system is greater than an upper limit at step 5060. If it is determined that the set illumination value for the system is greater than an upper limit, then it is determined whether the sun azimuth is outside the critical angles at 5070. If the sun is not outside the critical angles, Modules A and B are used to determine a final tint level applied to the tintable window and the process returns to step 5010. If the sun is outside the critical angles, only Module B is used to determine the final tint state at step 5074 and the process returns to step 5010. If it is determined that the set illumination value for the system is not greater than an upper limit at step 5060, then it is determined whether the sun is outside the critical angle at 5080. If the sun is not outside the critical angle, Modules A, B, and C are used to determine a final tint level at step 5082 applied to the tintable window and the process returns to step 5010. If the sun is outside the critical angles, only Modules B and C are used to determine the final tint level at step 5090 applied to the tintable window and the process returns to step 5010.

FIG. 29B illustrates a scenario of sensor readings and box car values during time, t, during a portion of a day. This scenario assumes a bright sunny day (500 W/m$^2$) at noon and the box car curves are tracking together for the most part at this time, with calculations going on every 5 minutes. At the first vertical black line (regular 5 min interval calculations) there has been a slight drop in sensor readings and the short term box car value is slightly higher than the long term box car value, which lags behind the sensor readings. Since the negative difference between the short term and long term values is below the threshold value, the long term box car value is used to determine tint level. At the very next calculation, the sensor readings are showing a large drop in external illumination (e.g., storm front arrived). The negative difference is greater than the threshold value and the control method triggers a 1 hour timer (changing condition has caused this event, made delta sufficient to trigger the timer) and the long box car is reset. The control method sets the illumination value to the reset long box car value to determine a tint level to use during the timer period. Since the long term box car value is above the upper limit and the sun is within the critical angles, Modules A and B are used to determine the tint level based on the reset long box car value. At the end of the second timer period, the negative difference between short box car and long box car values is less than the threshold value so that the illumination is set to the reset long term box car values.

At the end of the second timer period, if we were to simply use the logic without resetting the long box car, the second timer would again be implemented and the long box car values would be used during the time period (as before). As you can see, this would be the wrong result, as the actual sensor readings (and the short box car) data show it is a dull day and the window doesn't need to be tinted according to the long box car data (it's still way off from reality). In this scenario, a long term box car is reset at the timer start period. In other words, once the timer is triggered, this simultaneously triggers resetting the long box car to start loading with sensor data. Under this logic, at the end of the second timer, the short term box car's value is compared with the reset long box car and the delta now would more closely reflect actual sensor readings.

FIG. 30A is a flowchart 6000 of a control method that initiates a second long box car when there is a rapid change in sensor readings. The values of the newly-initiated second long box car closely track the sensor readings during the rapid change. The first long box car lags behind the sensor readings.

With reference back to FIG. 30A, sensor readings of illumination values are sent by the sensor and received by the processor at step 6010. At step 6012, box car illumination values are updated with the received sensor readings. If it is determined at step 6020 that a timer is set, then the current tint setting is maintained (i.e. no calculation of new tint level) at step 6022 and the process returns to step 6010. If is determined that a timer is not set at step 6020, it is determined whether a second long box car has been initiated at step 6024. If a second long box car is determined to be initiated at step 6024, Value 1 is set to the greater of the short box car and the first long box car illumination values and Value 2 is set to the second long box car illumination value. If a second long box car has not been initiated, Value 1 is set to the short box car illumination value and Value 2 is set to the second long box car illumination value. At step 6030, the magnitude and sign of the difference between Value 1 and Value 2 (Δ) is determined. If it is determined at step 6030 that Δ is positive and greater than a first threshold value, then at step 6042, the illumination value is set to Value 1 and a first timer is set, and then the method proceeds to step 6050. If it is determined at step 6030 that Δ is positive and less than the threshold value or Δ is a negative value, then the illumination value is set to Value 2 at step 6044. At step 6046, it is determined whether Δ is more negative than a second threshold value. If Δ is more negative than the second threshold value, then there has been a significant drop in illumination. In this case, a second timer is set, a second long box car is initiated, and the illumination value is set to the initial value of the second long box car at step 6048, and the method proceeds to step 6050. If Δ is not more negative than the second threshold value, the method directly proceeds to step 6050. At step 6050, it is determined whether the set illumination value is less than a lower limit. If less than the lower limit, a defined tint level (e.g., nominally clear) is applied at step 6052 and the process returns to step 6010. If the set illumination value for the system is greater than a lower limit, it is determined whether the set illumination value for the system is greater than an upper limit at step 6060. If it is determined that the set illumination value for the system is greater than an upper limit, then it is determined whether the sun azimuth is outside the critical angles at 6070. If the sun is not outside the critical angles, Modules A and B are used to determine a final tint level applied to the tintable window and the process returns to step 6010. If the sun is outside the critical angles, only Module B is used to determine the final tint state at step 6074 and the process returns to step 6010. If it is determined that the set illumination value for the system is not greater than an upper limit at step 6060, then it is determined whether the sun is outside the critical angle at 6080. If the sun is not outside the critical angle, Modules A, B, and C are used to determine a final tint level at step 6082 applied to the tintable window and the process returns to step 6010. If the sun is outside the critical angles, only Modules B and C are used to determine the final tint level at step 6090 applied to the tintable window and the process returns to step 6010.

FIG. 30B illustrates a scenario of sensor readings and box car values during time, t, during a portion of a day. This scenario assumes a bright sunny day (500 W/m²) at noon and the box car curves are tracking together for the most part at this time, with calculations going on every 5 minutes. At the first vertical black line (regular 5 min interval calculations) there has been a slight drop in sensor readings and the short term box car value is slightly higher than the first long term box car value, which lags behind the sensor readings. Since the negative difference between the short and first long box car values is below the threshold value, the first long box car value is used to determine tint level. At the very next calculation, the sensor readings are showing a larger drop in external illumination. In this case, the negative difference is greater than the threshold value and the control method triggers a 1 hour timer (changing condition has caused this event, made delta sufficient to trigger the timer) and a second long box car is initiated. In addition, the illumination value is set to the initial second long box car value. Since this initial second long term box car value is above the upper limit and the sun is within the critical angles, Modules A and B are used to determine the tint level based on the initial second long box car value. At the end of the second timer period, the first long box car value is greater than the short box car value and the positive difference between the second long box car value and first long box car value is below the first threshold value. The control method uses the first long box car illumination value to determine a tint level that will be used during the first timer.

Modifications, additions, or omissions may be made to any of the above-described predictive control logic, other control logic and their associated control methods (e.g., logic described with respect to FIG. 25, logic described with respect to FIGS. 12, 13, 14, and 15, and logic described with respect to FIG. 24) without departing from the scope of the disclosure. Any of the logic described above may include more, fewer, or other logic components without departing from the scope of the disclosure. Additionally, the steps of the described logic may be performed in any suitable order without departing from the scope of the disclosure.

Also, modifications, additions, or omissions may be made to the above-described systems or components of a system without departing from the scope of the disclosure. The components of the may be integrated or separated according to particular needs. For example, the master network controller 1403 and intermediate network controller 1408 may be integrated into a single window controller. Moreover, the operations of the systems can be performed by more, fewer, or other components. Additionally, operations of the systems may be performed using any suitable logic comprising software, hardware, other logic, or any suitable combination of the preceding.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A method of controlling one or more components of a building, the method comprising:
controlling the one or more components of the building based, at least in part, on a plurality of radiation values determined at a plurality of positions of the building, wherein the plurality of positions include a first subset of positions and a second subset of positions, and each position of the first subset:
lacks a physical sensor, and
faces a corresponding direction toward which no physical sensor is directed;
wherein each position of the second subset is associated with a corresponding physical sensor.

2. The method of claim 1, wherein the positions of the building comprise a facade of the building.

3. The method of claim 1, wherein controlling the one or more components of the building is performed at least in part by a Building Management System (BMS).

4. The method of claim 1, wherein the one or more components of the building comprise: a fire system, an elevator system, a power system, a security system, a lighting system, a ventilation system, a heating system, a cooling system, or a heating ventilation and air conditioning (HVAC) system.

5. The method of claim 1, wherein:
the controlling is further based, at least in part, on a second radiation value determined at a second position of the building, and
the second position lacks a physical sensor, and is facing towards a direction to which no physical sensor is directed.

6. The method of claim 1, further comprising determining the plurality of radiation values based, at least in part, on one or more clear sky irradiance values and data from a plurality of physical sensors.

7. The method of claim 6, further comprising adjusting at least one of the one or more clear sky irradiance values based, at least in part, on data from one or more physical sensors and/or a virtual sensor corresponding to the plurality of radiation values determined at the plurality of positions of the building.

8. The method of claim 6, wherein the plurality of radiation values are based, at least in part, on a virtual sensor that is based, at least in part, on the data from the plurality of physical sensors.

9. The method of claim 1, wherein:
the one or more components of the building comprise a tintable window disposed in the building, and
the method further comprises adjusting a tint of the tintable window to adjust an amount of light passing through the tintable window.

10. The method of claim 9, wherein the tint is adjusted to a tint value that is determined based on at least one of the plurality of radiation values and a space type associated with a region of the building in which the tintable window is disposed.

11. An apparatus for controlling one or more components of a building, the apparatus comprising at least one controller configured to:
control, or direct control of, the one or more components of the building based, at least in part, on a plurality of radiation values determined at a plurality of positions of the building, wherein the plurality of positions include a first subset of positions and a second subset of positions, and each position of the first subset:
lacks a physical sensor, and
faces a corresponding direction toward which no physical sensor is directed;
wherein each position of the second subset is associated with a corresponding physical sensor.

12. The apparatus of claim 11, wherein the one or more components of the building comprise: a fire system, an elevator system, a power system, a security system, a lighting system, a ventilation system, a heating system, a cooling system, or a heating ventilation and air conditioning (HVAC) system.

13. The apparatus of claim 11, wherein:
to control, or direct control of, the one or more components of the building, the at least one controller is configured to consider a second radiation value determined at a second position of the building, wherein the second position lacks a physical sensor, and is facing towards a direction to which no physical sensor is directed.

14. The apparatus of claim 11, wherein:
the one or more components of the building comprise a tintable window disposed in the building, and
the at least one controller is further configured to adjust, or direct adjustment of, a tint of the tintable window to adjust an amount of light passing through the tintable window.

15. The apparatus of claim 14, wherein the tint is adjusted to a tint value determined based on at least one of the plurality of radiation values and a space type associated with a region of the building in which the tintable window is disposed.

16. A non-transitory computer-readable medium comprising computer-executable instructions, wherein the computer-executable instructions, when executed by one or more processors, cause the one or more processors to execute operations comprising:
controlling, or directing control of, one or more components of a building based, at least in part, on a plurality of radiation values determined at a plurality of positions of the building, wherein the plurality of positions include a first subset of positions and a second subset of positions, and each position of the first subset:
lacks a physical sensor, and
faces a corresponding direction toward which no physical sensor is directed;
wherein each position of the second subset is associated with a corresponding physical sensor.

17. The non-transitory computer-readable medium of claim 16, wherein the operations further comprise determining, or directing determination of, the plurality of radiation values based, at least in part, on one or more clear sky irradiance values and data from a plurality of physical sensors.

18. The non-transitory computer-readable medium of claim 17, wherein the operations further comprise adjusting, or directing adjustment of, at least one of the one or more clear sky irradiance values based, at least in part, on data from one or more physical sensors and/or a virtual sensor corresponding to the plurality of radiation values determined at the plurality of positions of the building.

19. The non-transitory computer-readable medium of claim 17, wherein the plurality of radiation values are based, at least in part, on a virtual sensor that is based, at least in part, on the data from the plurality of physical sensors.

20. The non-transitory computer-readable medium of claim 16, wherein:

the one or more components of the building comprise a tintable window disposed in the building, and the operations further comprise adjusting, or directing adjustment of, a tint of the tintable window to adjust an amount of light passing through the tintable window.

21. The non-transitory computer-readable medium of claim 20, wherein the tint is adjusted to a tint value determined based on a predicted occupant comfort level due to penetrating sunlight through the tintable window.

* * * * *